United States Patent
Kishi et al.

(12)

(10) Patent No.: US 6,639,580 B1
(45) Date of Patent: Oct. 28, 2003

(54) ELECTROPHORETIC DISPLAY DEVICE AND METHOD FOR ADDRESSING DISPLAY DEVICE

(75) Inventors: Etsuro Kishi, Kanagawa (JP); Yojiro Matsuda, Kanagawa (JP); Yoshinori Uno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 09/707,775

(22) Filed: Nov. 8, 2000

(30) Foreign Application Priority Data

| Nov. 8, 1999 | (JP) | 11-317142 |
| Nov. 8, 1999 | (JP) | 11-317143 |
| Mar. 3, 2000 | (JP) | 2000-058466 |
| Nov. 7, 2000 | (JP) | 2000-338930 |
| Nov. 7, 2000 | (JP) | 2000-338931 |

(51) Int. Cl.[7] ................................................. G09G 3/34
(52) U.S. Cl. .................... 345/107; 345/105; 359/296; 359/297
(58) Field of Search ....................... 345/105, 107; 359/296, 297

(56) References Cited

U.S. PATENT DOCUMENTS

| 3,612,758 A | 10/1971 | Evans | 178/5.4 R |
| 4,203,106 A | 5/1980 | Dalisa et al. | 340/787 |
| 4,695,528 A | 9/1987 | Dabisch et al. | 430/290 |
| 5,053,763 A | * 10/1991 | DiSanto et al. | 340/787 |
| 5,345,251 A | * 9/1994 | DiSanto et al. | 345/107 |
| 6,232,950 B1 | * 5/2001 | Albert et al. | 345/107 |

FOREIGN PATENT DOCUMENTS

| JP | 49-5598 | 2/1974 |
| JP | 54-85699 | 7/1979 |
| JP | 55-154198 | 12/1980 |
| JP | 57-82086 | 5/1982 |
| JP | 9-185087 | 7/1997 |
| JP | 2000066248 A | * 3/2000 | G02F/1/167 |

* cited by examiner

*Primary Examiner*—Kent Chang
*Assistant Examiner*—Tom Sheng
(74) *Attorney, Agent, or Firm*—Fitzpatrick, Cella, Harper & Scinto

(57) ABSTRACT

The present invention provides a horizontally transfer type electrophoretic display device that can suppress occurrence of cross-talk and is capable of passive matrix addressing that can obtain a good display. The display device includes a fist display electrode and a second display electrode disposed on a first substrate, a second substrate being disposed in opposed relation to the first substrate via a barrier wall, a first control electrode as one of the two control electrodes disposed on the second substrate, and a second control electrode disposed at the boundary between the first display electrode and the second display electrode on the first electrode. A voltage can be independently applied to each control electrode, a transparent insulation liquid is filled in the space formed by the both substrates and the barrier wall, and colored and charged particles are dispersed in the transparent insulation liquid.

23 Claims, 66 Drawing Sheets

- 4 FIRST DISPLAY ELECTRODE
- 13 SECOND CONTROL ELECTRODE
- 3 SECOND DISPLAY ELECTRODE
- 10 DIVIDING WALL

INITIAL RESET (OVERALL)

SELECTED SCANNING LINE

SIGNAL ON,
BLACK STATE WRITING

SIGNAL OFF, HOLD OF
WHITE STATE DISPLAY

UN-SELECTED SCANNING LINE

SIGNAL ON, HOLD OF
WHITE STATE DISPLAY

SIGNAL OFF, HOLD OF
WHITE STATE DISPLAY

SIGNAL ON,
BLACK STATE HOLD

SIGNAL OFF,
BLACK STATE HOLD

SELECTED SCANNING LINE

BLACK STATE WRITING

WHITE STATE WRITING

UN-SELECTED SCANNING LINE

BLACK STATE SIGNAL, WHITE STATE DISPLAY HOLD

BLACK STATE SIGNAL, BLACK DISPLAY HOLD

UN-SELECTED SCANNING LINE.
FIG. 10E
WHITE STATE SIGNAL, WHITE STATE DISPLAY HOLD
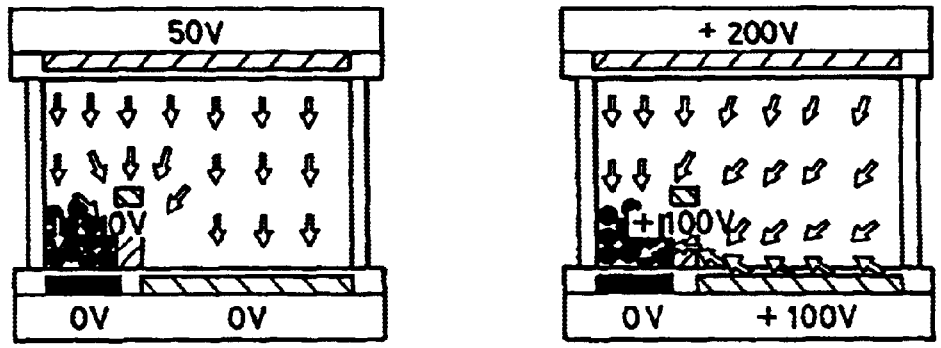
FIG. 10F
WHITE STATE SIGNAL, WHITE DISPLAY HOLD
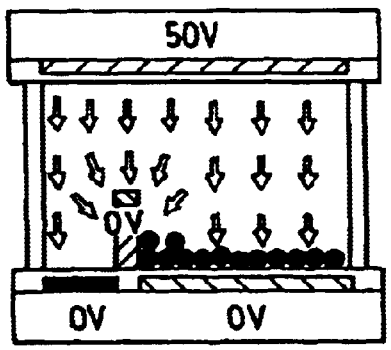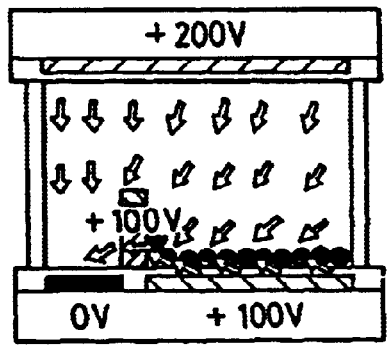

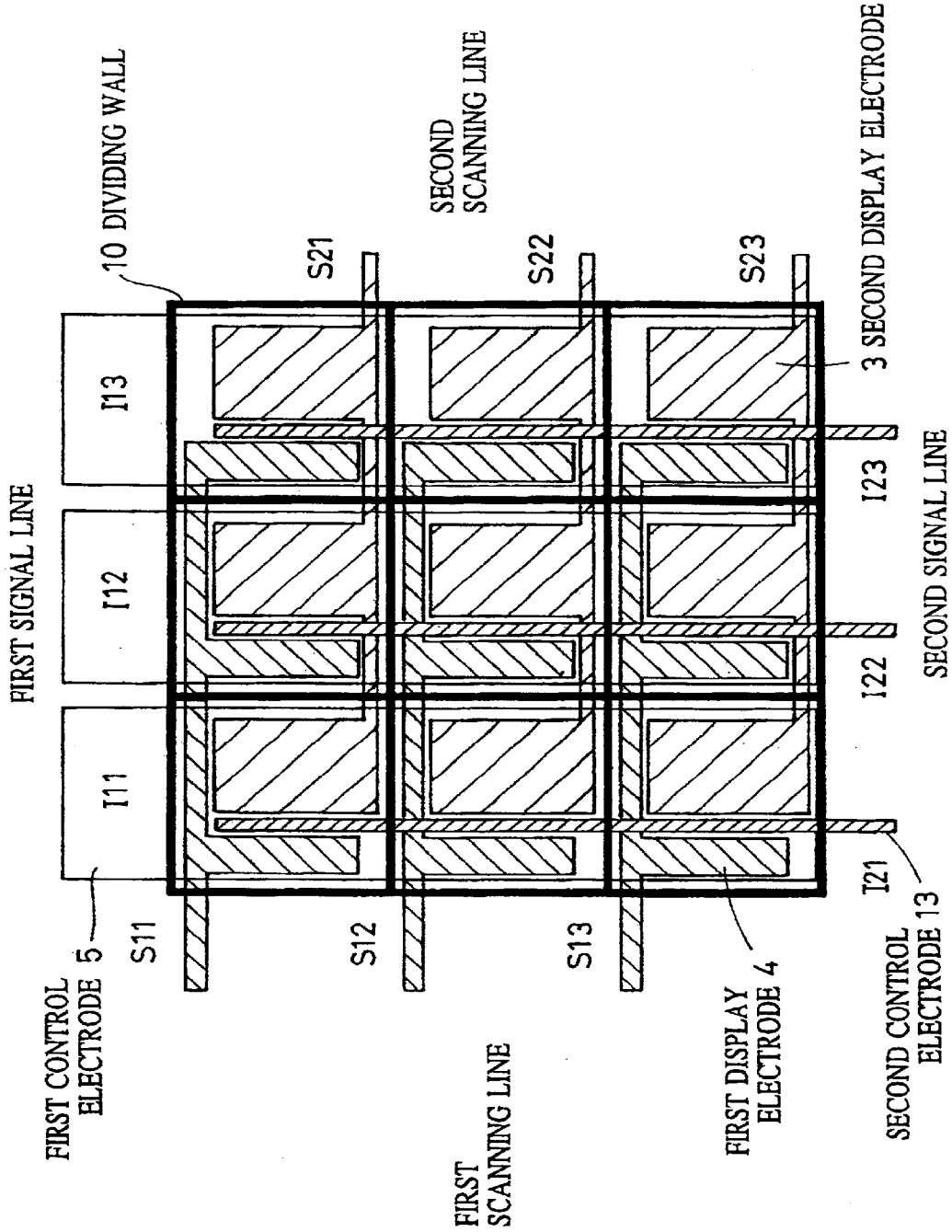

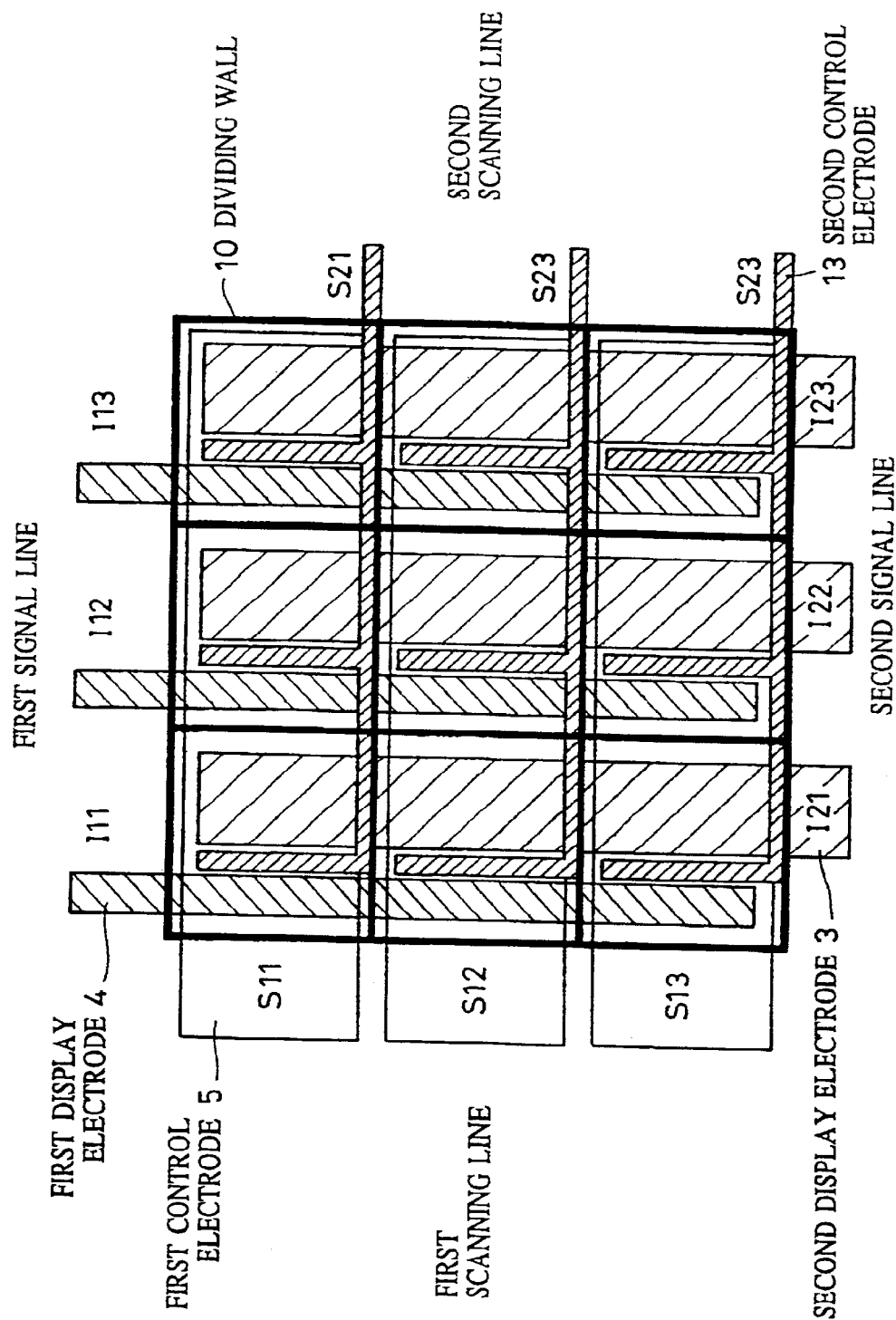

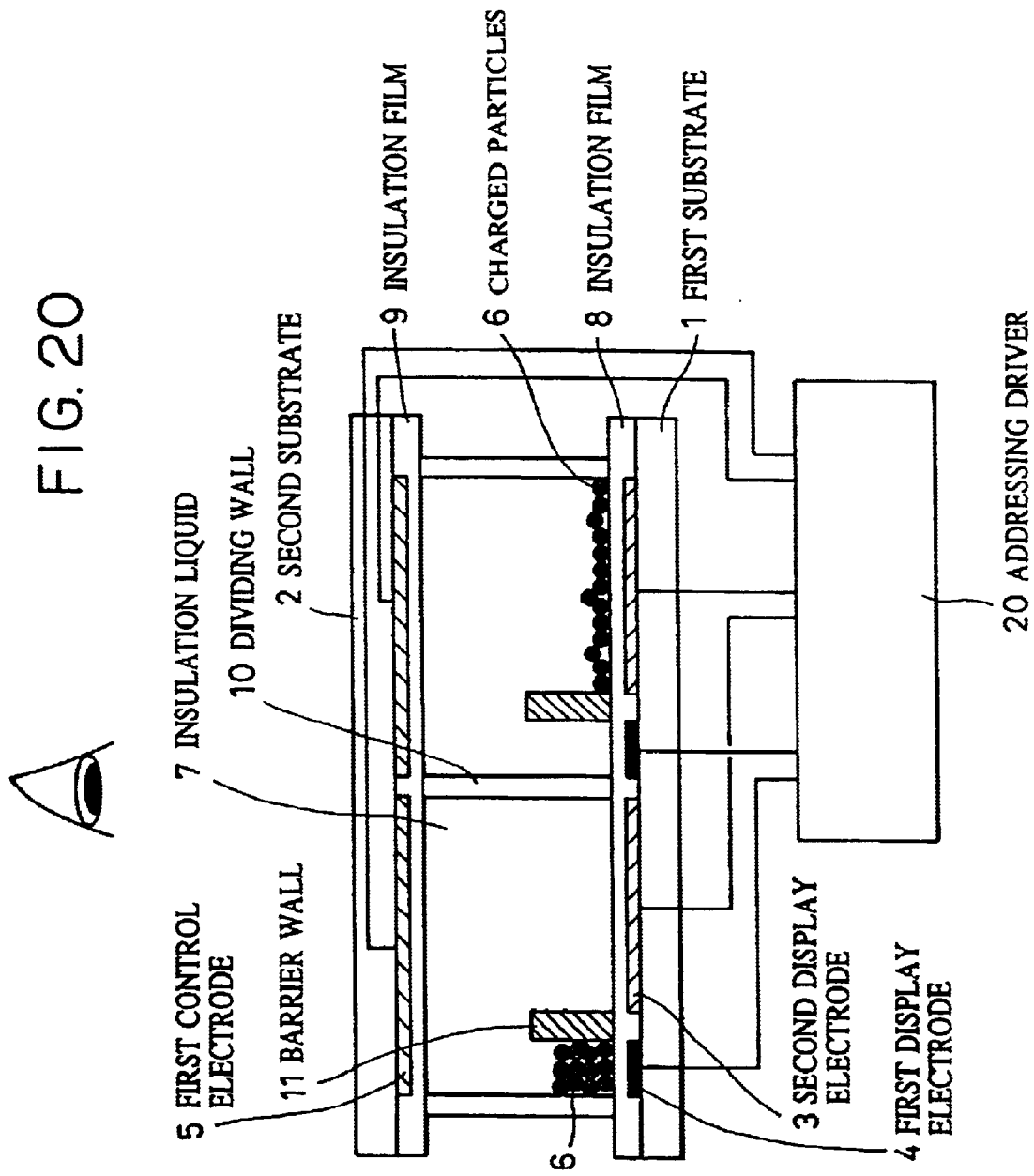

INITIAL RESET (OVERALL)

SELECTED SCANNING LINE

SIGNAL LINE ON

SIGNAL LINE OFF

UN-SELECTED SCANNING LINE

SIGNAL LINE ON   SIGNAL LINE OFF

3 SECOND DISPLAY ELECTRODE
4 FIRST DISPLAY ELECTRODE
12 STEP
15 SHIELDING SPACE

12 STEP
15 SHIELDING SPACE

13 BARRIER ELECTRODE

14 CHARGED CONSTRUCTION

WHITE STATE
BLACK STATE

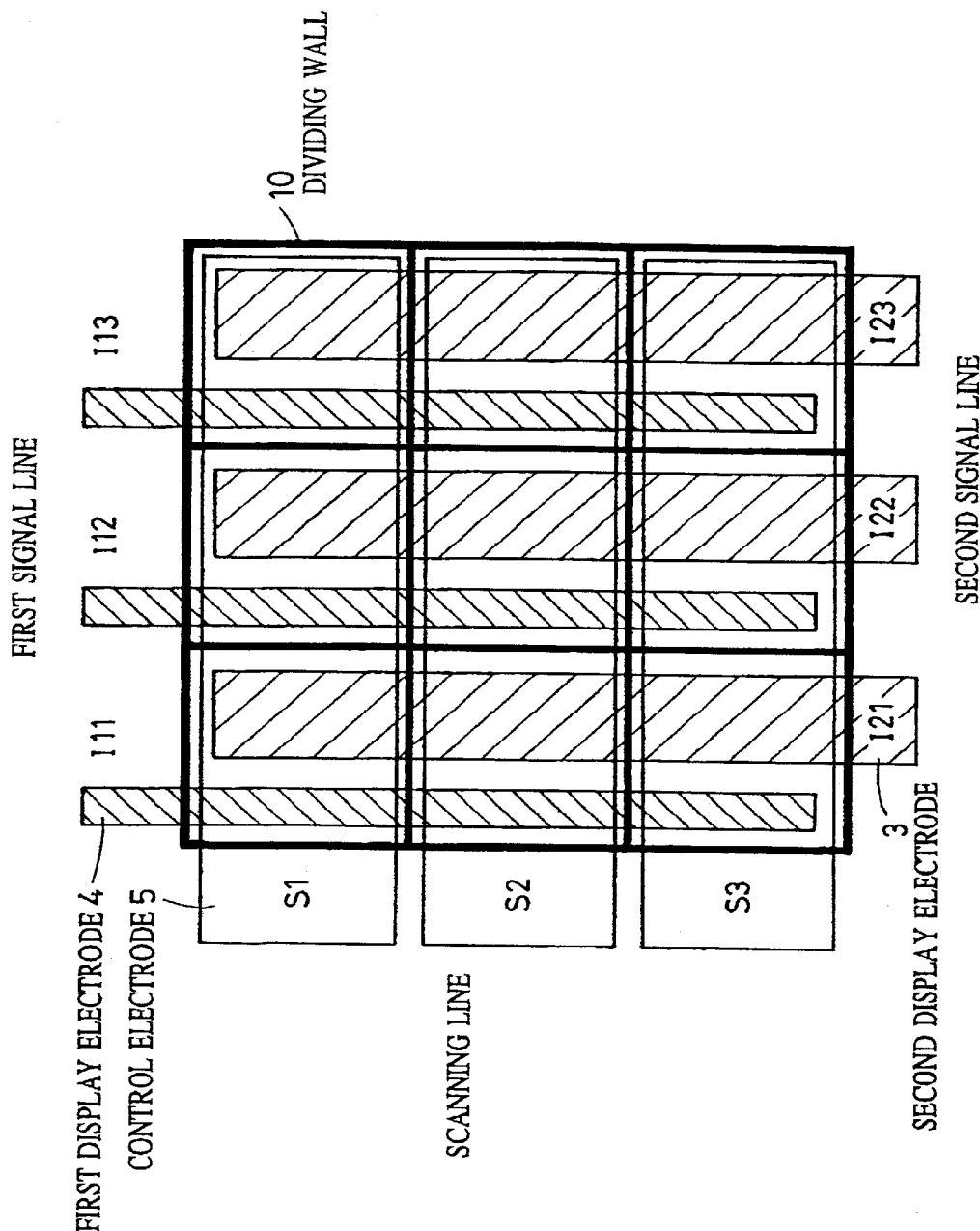

FIG. 42
Ta
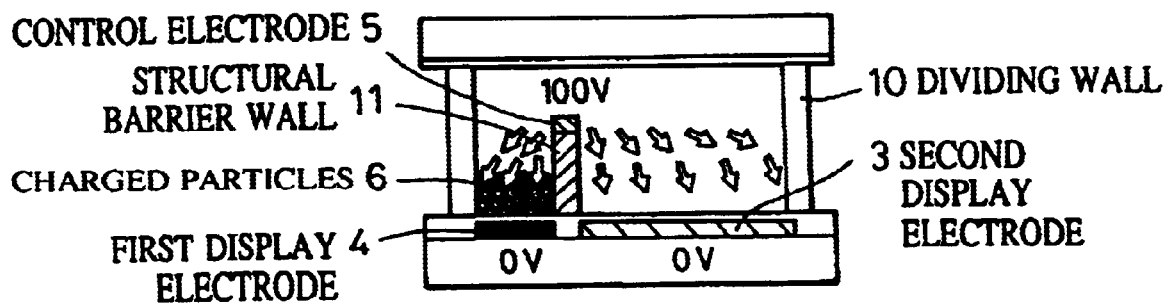
Tb
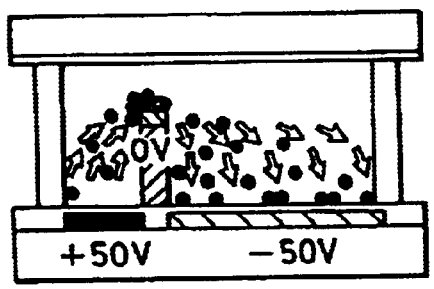
Tc
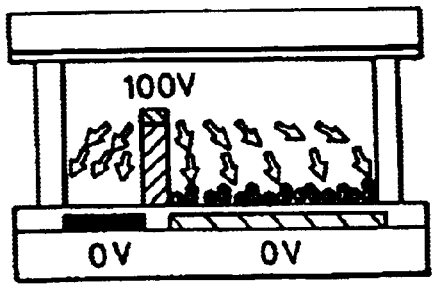

SELECTED SCANNING LINE

BLACK STATE WRITING SIGNAL

WHITE STATE WRITING SIGNAL

UN-SELECTED SCANNING LINE
BLACK STATE WRITING SIGNAL
WHITE STATE WRITING SIGNAL
FIG. 45C
FIG. 45D
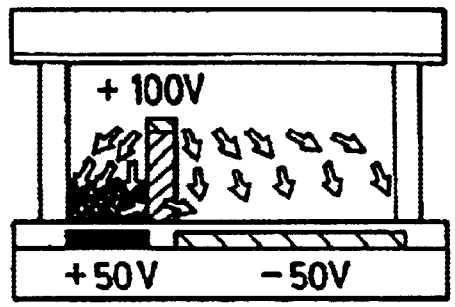
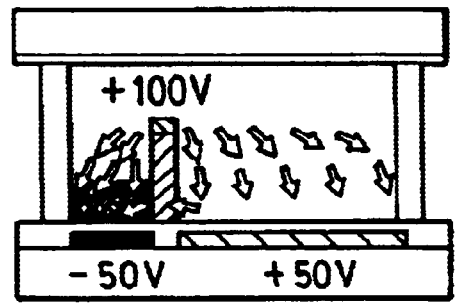
FIG. 45E
FIG. 45F
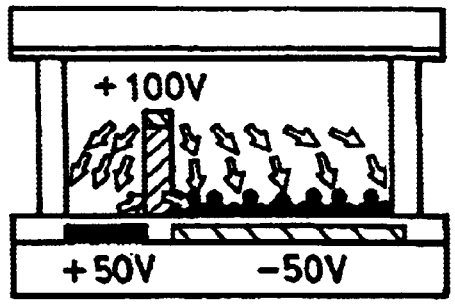
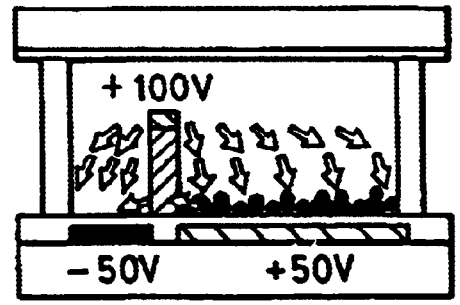

INITIAL OVERALL RESET

WHITE CONTRAST WRITING SIGNAL

CONTROL ELECTRODE 5
STRUCTURAL BARRIER WALL 11
CHARGED PARTICLES 6
FIRST DISPLAY ELECTRODE 4
10 DIVIDING WALL
3 SECOND DISPLAY ELECTRODE

SELECTED SCANNING LINE

BLACK STATE WRITING SIGNAL

WRITING SIGNAL OFF

UN-SELECTED SCANNING LINE

BLACK STATE
WRITING SIGNAL

WRITING SIGNAL OFF

INITIAL OVERALL RESET

WHITE STATE WRITING SIGNAL ON

CONTROL ELECTRODE 5
STRUCTURAL BARRIER WALL 11
CHARGED PARTICLES 6
FIRST DISPLAY ELECTRODE 4
10 DIVIDING WALL
3 SECOND DISPLAY ELECTRODE

SELECTED SCANNING LINE

HOLDING SIGNAL OFF

HOLDING SIGNAL ON

UN-SELECTED SCANNING LINE (BLACK STATE WRITING SIGNAL OFF)
HOLDING SIGNAL OFF　　　　　　HOLDING SIGNAL ON
FIG. 49D　　　　　　FIG. 49E
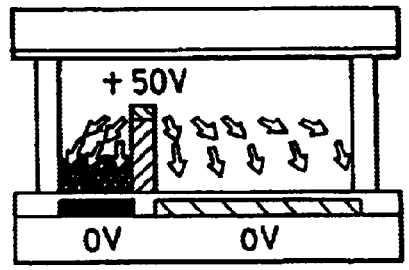
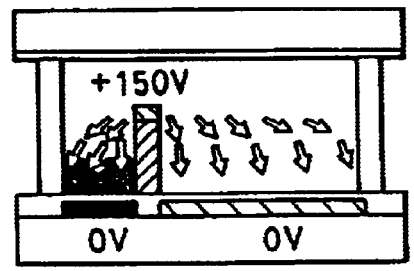
FIG. 49F　　　　　　FIG. 49G
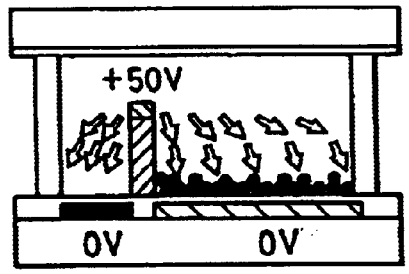
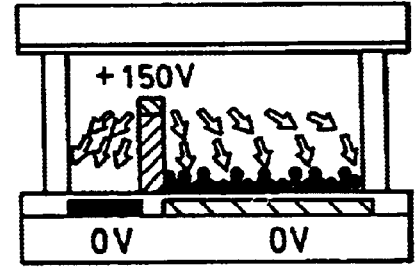

FIG. 50
Ta
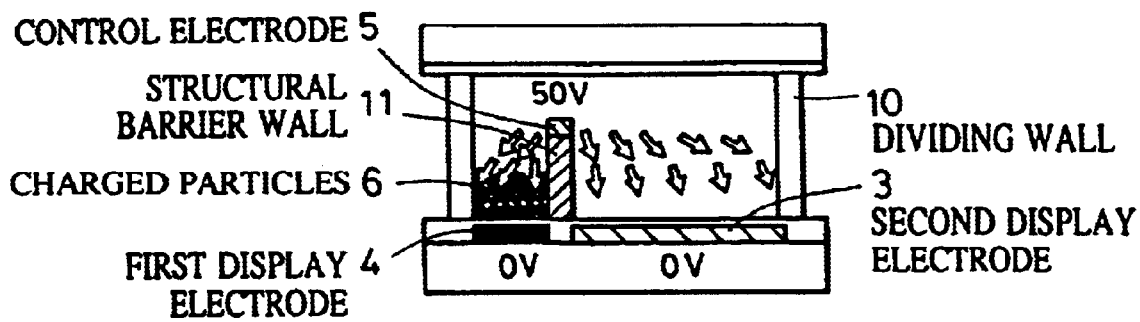
- CONTROL ELECTRODE 5
- STRUCTURAL BARRIER WALL 11
- CHARGED PARTICLES 6
- FIRST DISPLAY ELECTRODE 4
- 10 DIVIDING WALL
- 3 SECOND DISPLAY ELECTRODE
Tb1
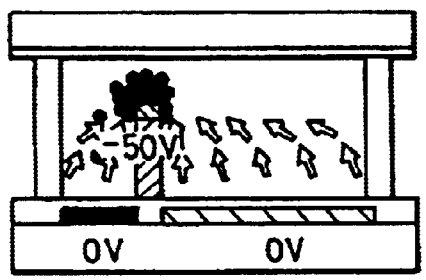
Tb2
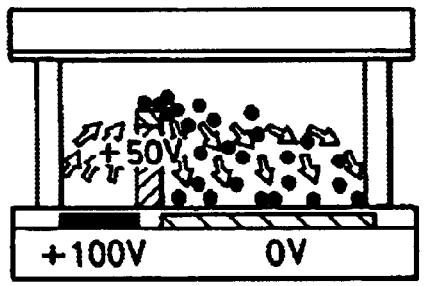
Tc
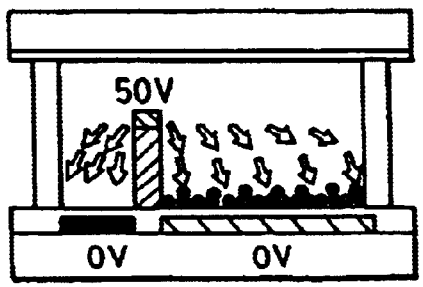

SELECTED SCANNING LINE
FIG. 52A
BLACK STATE WRITING
PERIOD Tb1
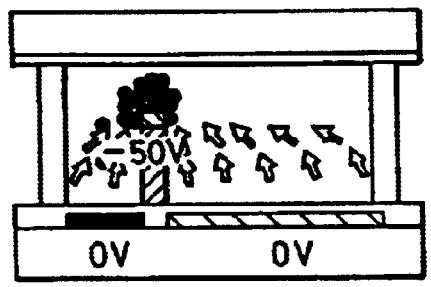
PERIOD Tb2
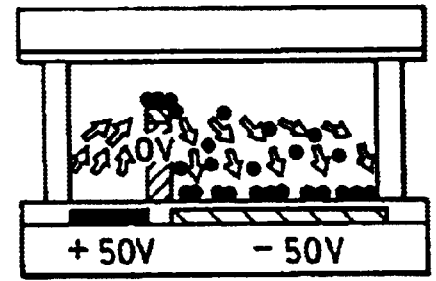
FIG. 52B
WHITE STATE WRITING
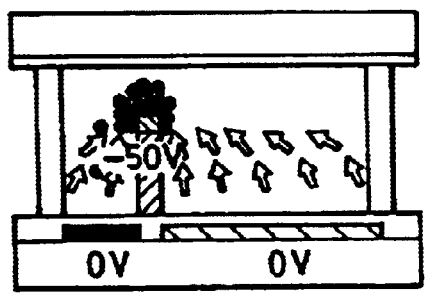
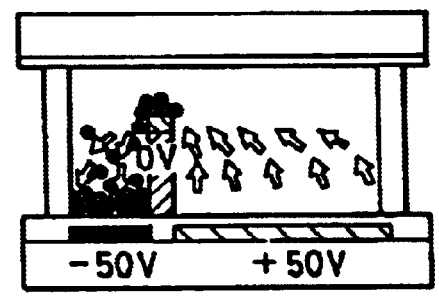

UN-SELECTED SCANNING LINE
FIG. 53D
BLACK STATE DISPLAY SIGNAL, WHITE STATE DISPLAY HOLD
PERIOD Tb1
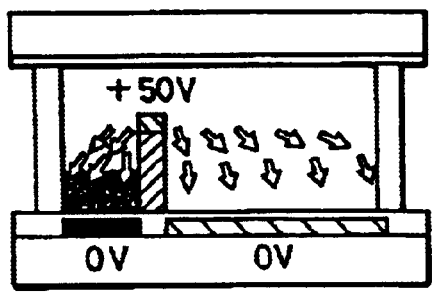
PERIOD Tb2
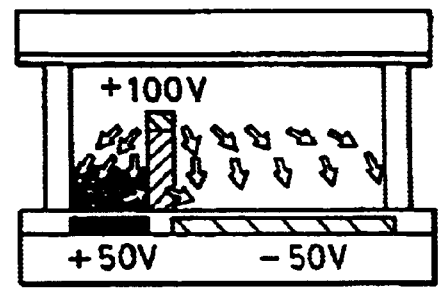
FIG. 53E
BLACK STATE DISPLAY SIGNAL, BLACK STATE DISPLAY HOLD
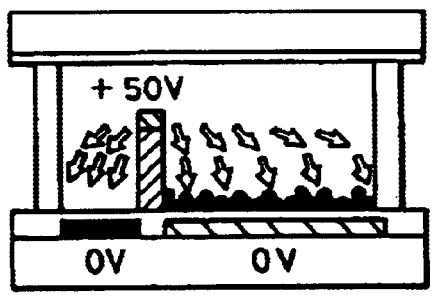
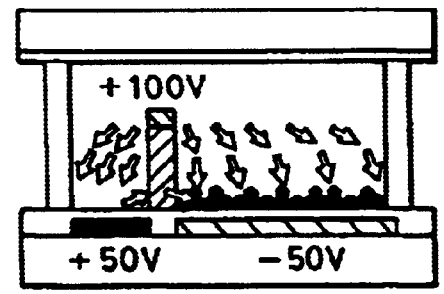

WHITE STATE DISPLAY SIGNAL, WHITE STATE DISPLAY HOLD

WHITE STATE DISPLAY SIGNAL, BLACK STATE DISPLAY HOLD

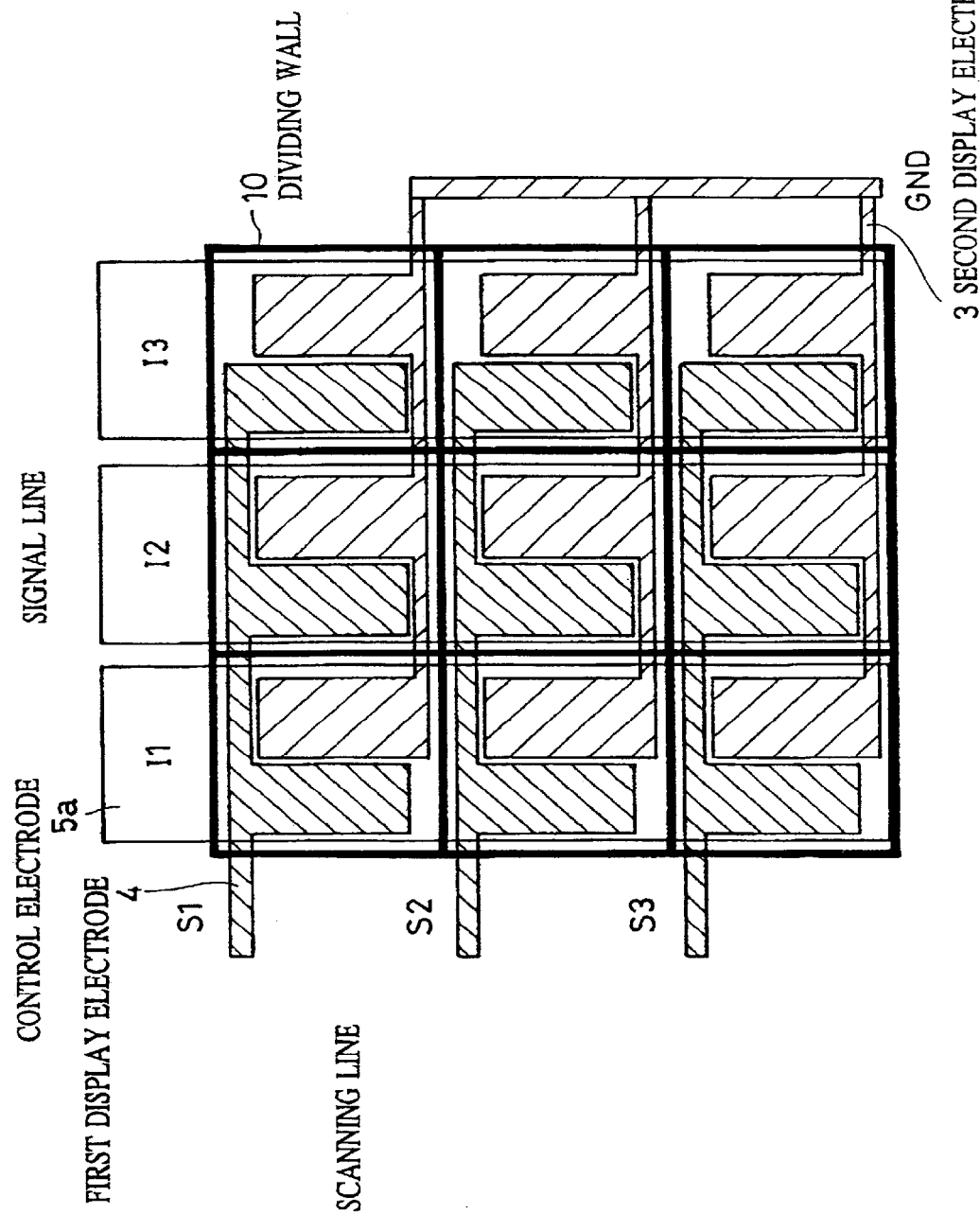

FIG. 66
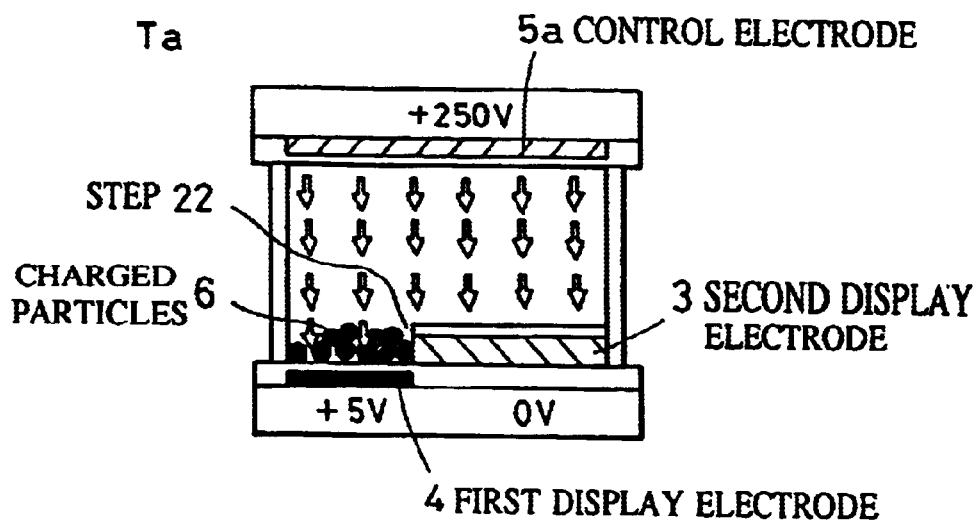
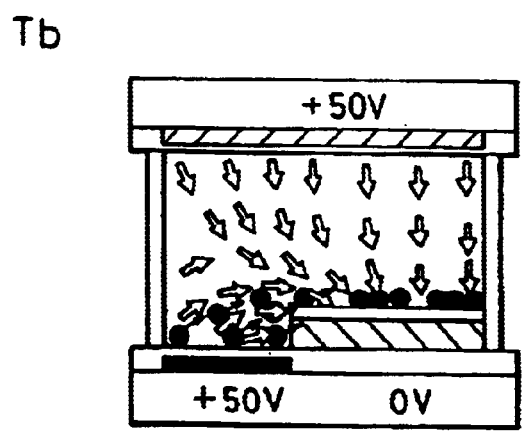
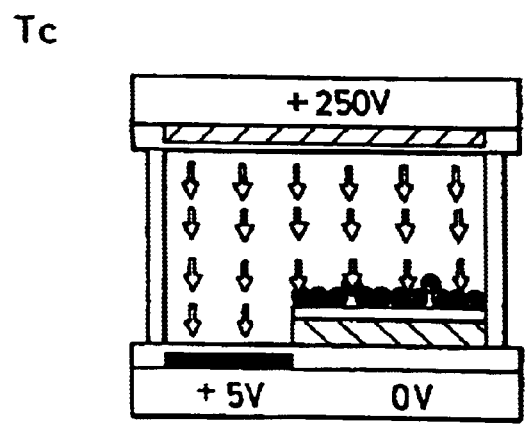

INITIAL RESET

SELECTED SCANNING LINE

SIGNAL LINE ON

SIGNAL LINE OFF

UN-SELECTED SCANNING LINE

SIGNAL LINE ON

SIGNAL LINE OFF

ELECTROPHORETIC DISPLAY DEVICE AND METHOD FOR ADDRESSING DISPLAY DEVICE

BACKGROUND OF THE INVENTION

1. Field of the Invention

The present invention relates to an electrophoretic display device for displaying migrated charged particles, and a method for addressing the display device.

2. Related Background Art

Various methods are used for output of a line of information since data volume of various information is being expanded in recent years as a result of development of information instruments. In general, output of information is roughly categorized into two groups of display on a cathode ray picture tube or a liquid crystal panel, and hard copy display on a sheet of paper using a printer. Needs of a thin type display device with low power consumption has been increasingly required, and the display device that can correspond to these needs has been aggressively developed and put into the market. However, images such as letters on the screen become hardly distinguishable depending on the view angle of the screen or by the reflection light, or the problem of burden on the vision caused by flickering or low brightness of the light source has not been sufficiently solved. Although the display device using the cathode ray picture tube has more sufficient contrast and brightness as compared with the liquid crystal display device, the display quality of the former is not so sufficient yet in the appearance of flickering as compared with the hard copy display to be described hereinafter. The display device using the cathode ray picture tube has also another problem that it has such a large size that it is not suitable as a portable device.

While the hard copy display has been considered to be of no use by utilizing electronic information, a vast amount of hard copy outputs are actually used. This is because, in addition to the problem of the image quality of information on the screen, resolution of the screen is substantially as low as about 120 dpi as compared with resolution of print-out on a sheet of paper (usually 300 dpi or more). Accordingly, display image on a panel gives a larger burden on the vision as compared with the hard copy display. As a result, a line of information is often output as a hard copy, even when the image is distinguishable on the display. It is also the reason why the hard copy display is used together even when the panel display is possible, that a number of the hard copy information can be arranged with no restriction of the display area depending on the display size contrary to the panel display, the information lines can be rearranged without any complicated hard ware operation, or the information lines can be sequentially confirmed. In addition, the hard copy display requires no energy, and is so excellent in handiness that the lines of information can be reconfirmed anytime and anywhere, so long as the information size is not extremely large.

While the hard copy display has many advantages over the panel display except moving images or provided that hazardous rewriting is not required, the hard copy display has a drawback that a lot of paper is consumed. Accordingly, development of recording media capable of rewriting (recording media capable of many recording and erase cycles of the images that are high recognizable by the vision, and requires no energy for holding of display images) has been actively carried out. The third display method capable of rewriting that succeeds the characteristics of the hard-copy is called herein as a paper-like display.

The essential conditions of the paper-like display are being capable of rewriting, requiring no or small energy for retaining display images (memory characteristics), and being excellent in handiness and display image quality. Display methods that are currently considered to be the paper-like display include reversible display media using matrix systems of low molecular weight organic molecule and polymer resins (disclosed in, for example, Japanese Patent Laid-Open Nos. 55-154198 and 57-82086) in which images are recorded and erased with a thermal printer head. While this system is partly utilized as display portions of a prepaid card, it involves some problems that contrast is not so high and the repeating number of recording and erasing is relatively as small as about 150 to 500 times.

Another display method that can be utilized as the paper-like display include an electrophoretic display device (U.S. Pat. No. 3,612,758). The electrophoretic display device is also disclosed in Japanese Patent Laid-Open No. 9-185087.

This display device comprises a dispersion system composed of colored and charged particles dispersed in an insulation liquid and a pair of electrodes opposed across this dispersion system. When a voltage is applied to the dispersion system through the electrodes, a Coulomb force allows the colored and charged particles to be absorbed to the electrode at the side having an opposite electric charge to the charge of the colored and charged particles themselves, by taking advantage of the electrophoretic property of the colored and charged particles. Images are displayed by taking advantage of the color difference between the colored and charged particles and dyed insulation liquid. In other words, the color of the colored and charged particles is observed when the colored and charged particles are absorbed on the surface of the first light-permeable electrodes proximal to an observer. When the particles are absorbed on the surface of the second electrode distal to the observer, on the contrary, the color of the insulation liquid, which has been colored to have optical characteristics different from the colored and charged particles, is observed.

However, no dyes or ions should be mixed with the insulation liquid in such an electrophoretic display device. Presence of these chromatic substances tends to act as instability factors in electrophoretic operations due to exchange of additional charges, to cause deterioration of the performance, service life and stability as the display device.

For solving these problems, Japanese Patent Laid-Open No. 49-5598 and Japanese Patent Publication No. 10-005727 have disclosed a display device in which a pair of electrodes comprising first and second display electrodes are arranged on the same substrate, and the colored and charged migration particles are made to transfer toward the horizontal direction as viewed by an observer. A voltage is applied through a transparent insulation liquid, and the images are displayed by allowing the colored and charged particles to horizontally transfer toward the direction parallel to the surface of the substrate between the first and second display electrodes by taking advantage of the electrophoretic property of the particles.

The insulation liquid is transparent in this in-plane (transfer) type electrophoretic display device, and the first display electrode has a color different from the color of the second display electrodes when viewed from the observer's side. The color of one of the electrodes is made to coincide with the color of the charged particles. For example, when the first electrode, the second electrode and the charged particles are colored black, white and black, respectively, the second electrode is exposed with white color when the charged particles are distributed on the first electrode, and the second electrode is colored black when the charged particles are distributed on the second electrode.

The methods for electrically addressing the display device on which pixels are arranged in a matrix are roughly classified into an active matrix method and a passive matrix method.

In the active matrix method, switching elements such as thin film transistors are formed for every pixel, and the voltage applied for each pixel is independently controlled to one another. This method enables the in-plane (transfer) type electrophoretic display element to be addressed with high display contrast. However, this active matrix method involves the problems that the process cost is high in this method, and forming the thin film transistors on the polymer substrate is difficult due to high process temperature of the thin film transistor. This problem is particularly crucial in the paper-like display since the object is to manufacture a flexible display with low cost. Although a process for forming the thin film transistor on a polymer material to which a printing process is applicable is proposed for solving these problems, possibility of practical use of this technology has not been made clear yet.

The passive matrix method affords a low cost process since the constituting elements required for addressing is only X-Y electrode lines, which can be readily formed on the polymer substrate. A voltage corresponding to a writing voltage may be applied to X-electrode lines and Y-electrode lines crossing to one another at selected pixels, when the writing voltage is applied to the selected pixels. However, image signals are written on a part of peripheral pixels of the selected pixel, or a so-called cross talk phenomenon arises, when one attempts to address the in-plane (transfer) type electrophoretic display device by the passive matrix method, causing very poor display contrast. This is inevitable since the in-plane (transfer) type electrophoretic display device has no definite threshold against the writing voltage.

It is proposed for solving these problems in the electrophoretic display method having in principle no threshold to add a control electrode to the display electrodes in order to realize addressing of the passive matrix using a three electrode construction. Most of the proposals on the three electrode construction are made with respect to vertical transfer electrode type electrophoretic display including those disclosed in Japanese Patent Laid-Open No. 54-085699 (U.S. Pat. No. 4,203,106).

The proposal on the three electrode construction of the in-plane (transfer) type electrophoretic display device is only found in Japanese Patent Publication No. 8-507154 (U.S. Pat. No. 5,345,251). However, the dispersion solution is not transparent but is colored in Japanese Patent Publication No. 8-507154 (U.S. Pat. No. 5,345,251), which is different from the transparent transfer type electrophoretic display device in which the dispersion solution is transparent as the objects of foregoing Japanese Patent Laid-Open No. 49-5598 and Japanese Patent Application Publication No. 10-005727, and the present invention.

Two constructions are disclosed in Japanese Patent Publication No. 8-507154 with respect to the disposition of the control electrodes. FIGS. 41A and 41B show cross sections of the display devices having the two constructions. In the first construction, a control electrode 5a as a third electrode is provided at the second substrate side 2 of the in-plane (transfer) type electrophoretic device (see FIG. 40A). In the second construction, a control electrode 13a is provided as a third electrode between the first display electrode 4 at the first substrate 1 side and a second display electrode 3 (see FIG. 41B).

A fork-shaped first display electrode. In which plural line electrodes are assembled in one pixel, and a fork-shaped second display electrode, in which plural line electrodes aligned between respective lines of the first display electrode, are placed on a first substrate in both of the first and second constructions. A thick film of chromium is coated on the second display electrode 3, leaving a step 22 with a height of about 0.3 $\mu$m at the boundary between the first display electrode 4 and the second display electrode 3. The control electrode 5a is formed over the entire surface within the pixel formed on the second substrate 2 opposed to the first substrate 1 with a space of 25 to 116 $\mu$m in the first construction. In the second construction, the control electrode 13a is disposed between respective lines of the first display electrode 4 and second display electrode 3 on the first substrate. In FIGS. 41A and 41B, the first and second display electrodes are composed of a single line, respectively, for the convenience of explanation.

The writing operation in Japanese Patent Publication No. 8-507154 will be described using FIGS. 42 and 43. FIG. 42 shows transfer of charged particles, and FIG. 43 shows an applied pulse and change of reflectivity. The cell construction is the same as described in FIG. 41A (1 pixel).

The applied voltage level to be described hereinafter was determined by the experiment actually carried out by the inventors of the present invention, and the experimental is not always coincide with that described in Japanese Patent Publication No. 8-507154. This is mainly because the conditions depend on the physical properties such as polarity and the amount of charge of the charged particles used. Accordingly, the applied voltage in the experimental results of the charged particles used by the inventors of the present invention will be described hereinafter for easy comparison with the description of operations in the present invention.

While a colored liquid may be used as the insulation liquid in the Japanese Patent Publication No. 8-507154, a transparent insulation liquid is used in the description hereinafter for easy comparison with the description of operation according to the present invention. The method for obtaining the display contrast is also described in the same construction as used in the embodiment of the present invention, wherein the migration particles are colored black, the first display electrode is colored black, and the second display electrode are colored white.

The charged particles are positively charged, and the second display electrode 3 is used as a common electrode. An addressing voltage Vd is applied to the first display electrode 4, and a control voltage Vc is applied to the control electrode 5a with reference to an earth potential of the second display electrode 3 as a reference.

The time period Ta corresponds to a white holding state. The arrow in FIG. 43 shows a vector of an electric field in the cell. Transfer of the charged particles 6 collected on the first display electrode 4 toward the second display electrode 3 is suppressed by a step 22 provided between the first display electrode 4 and the second display electrode 3. The particles are stabilized by being compressed at the display electrode side by applying a holding voltage Vc (=+250V) applied between the first display electrode 4 and the control electrode 5a, thereby maintaining a white display state having a reflectivity (R) of about 70%. The addressing voltage Vd (=5V) applied in the holding state serves for suppressing the tendency of the charged particles in the vicinity of the step to be transferred toward the first display electrode in the black display state.

An addressing voltage (Vd) of +50V and a control voltage (Vc) of +50V are applied during the writing period Tb.

Suppression of the charged particles by the control voltage is released by setting the potential of the first display electrode 4 to be the same as the potential of the control electrode 5a, and all the charged particles 6 are horizontally transferred toward the second display electrode along the display electrode face by jumping over the step, thereby rapidly reducing the reflectivity R.

The charged particles are compressed toward the display electrode side during holding period Tc of the black state display by applying a holding voltage (Vc) of +250V, thereby holding the black display state having a reflectivity of about 5%.

The passive matrix addressing method disclosed in Japanese Patent Publication No. 8-507154 will be then described with reference to FIGS. 68A to 68C, and FIGS. 69D to 69G. A in-plane (transfer) type electrophoretic display device in which the pixels are arranged in a m×n matrix with a column and row numbers of m and n, respectively. Signal electrode lines (m) are aligned along the column direction, and scanning electrode lines (n) are aligned along the row direction of the pixel array, respectively, so as to cross at right angles to one another. Each signal electrode line is connected to the control electrode 5a of each pixel, and each scanning electrode line is connected to the first display electrode 4 within each pixel at each crossing point. The second display electrode 3 is fixed to an earth potential as a common electrode.

Firstly, all the charged particles 6 are collected on the first display electrode by applying an addressing voltage (Vd) of −50V on all the scanning lines, and a control voltage (Vc) of 0V on all the signal lines (FIG. 68A, overall erase). Then, the scanning lines are sequentially selected along the Y-direction from the upper side for writing. An addressing voltage (Vd) of +50V is applied to the scanning lines during the selected period (writing period), and a control voltage (Vc) of +250V is applied to the signal line corresponding to selected pixels The charged particles are transferred toward the second electrode side by climbing up the step for writing (FIG. 68B) in the selected pixels, by applying an addressing voltage (Vd) of +50V between the display electrodes. While an addressing voltage (vd) of +50V is applied in the un-selected pixels, the charged particles are compressed toward the first display electrode by applying a control voltage (Vc) of +250V to prevent transfer (writing) of the charged particles (FIG. 68C).

An addressing voltage (Vd) of +5V is applied, on the other hand, to the scanning line during the un-selected period, and a control voltage (Vc) of +50V or +250V is applied to the signal line (FIGS. 69D to 69G). The display state does not change in either case since the charged particles are compressed onto the display electrode face by the control voltage.

Writing using the passive matrix type addressing method can be executed as described above in the in-plane (transfer) type electrophoretic display device having no thresholds.

However, the in-plane (transfer) type electrophoretic display device disclosed in Japanese Patent Publication No. 8-507154 has involved the following problems. The problems will be described hereinafter with reference to FIG. 70.

The step height is restricted to be not so high in the first construction. When the step height is too high, a part of the charged particles cannot climb over the step and remain at the bottom of the step when the charged particles are transferred during the selected period, thereby decreasing the display contrast (FIG. 70A). The step height should be restricted to be approximately the same as the particle size of the charged particles, in order to prevent the particles from being remained behind.

The effect of the step for suppressing transfer of the charged particles by the step becomes insufficient since the step height is restricted. Consequently, a part of the charged particles are transferred by jumping over the step because the step height is low (FIG. 68C), when transfer of the charged particles should be suppressed by applying a control voltage Vc while an addressing voltage Vd is applied during the selected period. As a result, a cross-talk phenomenon is caused to arise a crucial problem that the display contrast becomes poor (FIG. 70B).

Although the charged particles can be suppressed to a certain extent by sufficiently increasing the control voltage Vc, an ill effect of increase of the applied voltage is caused, besides arising an another problem that electrons injected into the insulation material in the elements by the applied high voltage is left behind after releasing the voltage, and the operation state of the charged particles turns out to be unstable by the unexpected electric field caused by the residual charge.

Another problem of the ill effect of restricted step height is that the area difference between the first display electrode and the second display electrode cannot be determined to be so large due to insufficient step height. This is because the charged particles overflow from the surface of the electrode having a smaller surface area (FIG. 70C) when one attempts to collect the charged particles on the electrode having a smaller surface area, by setting the area difference to be large. Since the display contrast is determined by the area ratio between the first display electrode and the second display electrode, the smaller surface area ratio results in a poor display contrast.

Moreover, restriction effect for transfer of the particles by the step is only effective to the direction from the lower side to the upper side of the step, and transfer from the upper side to the lower side of the step is rather accelerated. Accordingly, writing is only possible toward one direction, or the addressing method is restricted to a unidirectional writing after an overall reset process in which the charged particles on the entire surface are at first collected to the lower side of the step. Bidirectional writing is impossible, or an addressing for rewriting a part of the screen is also impossible.

It is possible in the second construction to prevent bidirectional transfer of the charged particles during the selected period, by applying a voltage between the display electrode and control electrode for the un-selected pixels. It is also possible to allow the charged particles to be smoothly transferred, by setting the voltage between the display electrode and control electrode to zero for the selected pixels. The step height is not an essential constitution element in these cases.

However, the control electrodes only enables transfer between the display electrodes to be prevented, transfer within the display electrode is uncontrollable.

Accordingly, the charged particles evenly distributed within the display electrode transfers toward the direction repelled by the control electrode by the control voltage applied between the display electrode and control electrode during the un-selected period As a result, the display contrast is remarkably decreased due to partial distribution of the charged particles within the display electrode face as shown in FIGS. 71A and 71B.

SUMMARY OF THE INVENTION

Accordingly, it is an object of the present invention for solving the foregoing problems to provide an in-plane (transfer) type electrophoretic display device and a method for addressing the display device, wherein occurrence of cross-talk is suppressed, a passive matrix addressing that enables a good display contrast to be obtained is made possible, and the control voltage required for holding the colored and charged charged particles is largely reduced.

Another object of the present invention is to provide an electrophoretic display device that realizes improvement of contrast, and a method for addressing the display device, wherein the ratio between the area of the first display electrode and the area of the second display electrode can be determined to be larger than that in the conventional display device.

Another object of the present invention is to provide an electrophoretic display device, and a method for addressing the display device, wherein a bidirectional writing is possible besides enabling rewrite of a part of the screen.

The inventors of the present invention have found, as a result of analysis of the foregoing problems and intensive studies, that (a) the first and second constructions involve different sorts of problems to one another, and (b) the problem in one construction can be solved by introducing the construction of the counterpart.

Accordingly, the present invention for solving the foregoing problems proposes an electrophoretic display device having novel constructions to be described hereinafter, and a method for addressing the display devise.

The present invention provides an electrophoretic display device comprising a first substrate; a first display electrode and a second display electrode disposed on the first substrate; a second substrate disposed in opposed relation to the first substrate; a voltage applying means for applying a desired voltage on each electrode; a transparent insulation liquid filled between the first substrate and the second substrate; and a plurality of colored and charged fine particles dispersed in the insulation liquid; the display modes being switched by allowing the colored and charged particles to transfer between the first and second display electrodes, wherein a first control electrode disposed on the second substrate, and a second control electrode disposed at the boundary between the first display electrode and the second display electrode on the first substrate, are provided as the electrodes for controlling transfer of the charged particles.

Also, the present invention provides a method for addressing an electrophoretic display device comprising a first substrate; a first display electrode and a second display electrode disposed on the first substrate; a second substrate to be disposed in opposed relation to the first substrate; means for applying a desired voltage on each electrode; a transparent insulation liquid filled between the first substrate and the second substrate; a plurality of colored and charged fine particles dispersed in the insulation liquid; a barrier wall or a step disposed at the boundary between the first display electrode and the second display electrode; a first control electrode disposed on the second substrate as an electrode for controlling transfer of the charged particles; and a second control electrode disposed at the tip of the barrier wall or at the edge of the step on the first substrate, display modes being switched by allowing the colored and charged particles to transfer between the first and second display electrode, wherein transfer of the charged particles comprises a first process for allowing the charged particles to transfer from one of the display electrodes to the vicinity of the second control electrode, and a second process for allowing the charged particles to transfer from the second control electrode to the other display electrode side by jumping over the barrier wall or the step.

Preferably, the boundary between the first display electrode and the second display electrode comprises a barrier wall or a step, and the second control electrode is disposed at the tip of the barrier or at the edge of the step.

Preferably, a shielding space in which the charged particles are able to enter and exit and which is invisible to an observer of the screen is provided under the display electrode face adjoining to the step and located at the upper side of the step.

Preferably, the voltage signal applied on the first display electrode and the second display electrode, and on the first control electrode and the second control electrode for allowing the charged particles to transfer between the display electrodes is a composite signal comprising a first period for allowing the migrating particles to transfer to the second control electrode, and a second period for allowing the migrating particles concentrated on the second control electrode to transfer to the objective display electrode.

It is preferable that a voltage is applied to the first display electrode, second display electrode and control electrode so that the first process satisfies the relation of (the potential of both display electrodes and the potential of the first control electrode)>(the potential of the control electrode), and the second process satisfies the relation of (the potential of the display electrode before transfer and the potential of the first control electrode)≧(the potential of the second control electrode)>(the potential of the display electrode as a destination of transfer) for transfer of the positively charged particles, and the first process satisfies the relation of (the potential of both display electrodes and the potential of the first control electrode)<(the potential of the second control electrode), and the second process satisfies the relation of (the potential of the display electrode before transfer and the potential of the first electrode)≦(the potential of the second control electrode)≦(the potential of the display electrode as a destination of transfer), for transfer of the negatively charged particles in order to induce transfer of the charged particles.

Also, the present invention provides an electrophoretic display device comprising a first substrate; a first display electrode and a second display electrode disposed on the first electrode; a second substrate disposed in opposed relation to the first substrate; a control electrode disposed on the second electrode; means for applying a desired voltage on each electrode; a transparent insulation liquid filled between the first substrate and the second substrate; and a plurality of colored and charged fine particles dispersed in the transparent insulation liquid, display modes being switched by allowing the colored and charged particles to horizontally transfer between the first and second display electrodes, wherein a barrier wall having a function for almost prohibiting direct in-plane transfer of the charged particles at least toward one direction between the first display electrode and the second display electrode is provided between the first display electrode and the second display electrode.

Also, the present invention provides A method for addressing an electrophoretic display device comprising a first substrate; a first display electrode and a second display electrode disposed on the first substrate; a second substrate disposed in opposed relation to the first substrate; a control electrode disposed on the second electrode; means for applying a desired voltage on each electrode; a transparent insulation liquid filled between the first substrate and the second substrate; a plurality of colored and charged fine particles dispersed in the insulation liquid; and a barrier wall disposed between the first display electrode and the second display electrode and having a function for almost prohibiting direct in-plane transfer of the charged particles at least toward one direction between the first display electrode and the second display electrode, display modes being switched by allowing the colored and charged particles to transfer between the first and second display electrodes using the control electrode, wherein the method for transferring the charged particles toward the direction almost prohibited by the barrier wall is carried out by an indirect transfer comprising a first process for allowing the charged particles to transfer from one of the display electrodes to the control electrode side and, succeeding the first process, a second process for allowing the charged particles to transfer from the control electrode side to the other display electrode side by jumping over the barrier wall in-plane transfer Preferably, the barrier wall protrudes out of at least one face of the first display electrode face and the second display electrode face, and is constructed of a geometrical step having a height several to several tens times as large as the particle size of the charged particles.

Preferably, the barrier wall is a charged assembly applying an electrostatic repulsion force to the charged particles.

Preferably, the barrier wall is also a charged assembly applying an electrostatic repulsion force to the charged particles.

It is preferable that a shielding space in which the charged particles are able to enter and exit and which is invisible to an observer of the screen is provided under the display electrode face adjoining to the step and located at the upper side of either the first display electrode or the second display electrode.

It is also preferable that a voltage is applied to the first display electrode, second display electrode and control electrode so that transfer of the positively charged particles involves the period satisfying the relation of (the potential of the display electrode that is not a destination of transfer)≧(the potential of the control electrode)>(the potential of the display electrode as a destination of transfer), and transfer of the negatively charged particles involves the period satisfying the relation of (the potential of the display electrode that is not a destination of transfer)≦(the potential of the control electrode)<(the potential of the display electrode as a destination of transfer), in order to induce transfer of the charged particles.

Also, the present invention provides an electrophoretic display device comprising a first substrate; a first display electrode and a second display electrode disposed on the first substrate; a second substrate disposed in opposed relation to the first substrate; means for applying a desired voltage on each electrode; a transparent insulation liquid filled between the first substrate and the second substrate; and a plurality of colored and charged fine particles dispersed in the transparent insulation electrode, display modes being switched by allowing the colored and charged particles between the first and second display electrodes, wherein a control electrode is disposed between the first display electrode and the second display electrode on the first substrate, and the space between the upper face of the control electrode and the surface of the first substrate is larger than the spaces between the upper face of the first display electrode and the surface of the first substrate, and between the upper face of the second display electrode and the surface of the first substrate.

Also, the present invention provides a method for addressing an electrophoretic display device comprising a first substrate; a first display electrode and a second display electrode disposed on the first substrate; a second substrate disposed in opposed relation to the first substrate; a means for applying a desired voltage on each electrode; a transparent insulation liquid filled between the first substrate and the second substrate; a plurality of colored and charged fine particles dispersed in the insulation liquid; a barrier wall or a step disposed at the boundary between the first display electrode and the second display electrode; and a control electrode disposed above the structural barrier wall, display modes being switched by allowing the colored and charged particles to transfer between the first and second display electrode, besides being able to control transfer of the colored and charged particles by a synergetic effect between a physical barrier effect by the structural wall and an electrical barrier effect by the control electrode, wherein transfer of the charged particles comprises a first process for allowing the charged particles to transfer from one of the display electrodes to the vicinity of the second control electrode and, succeeding the first process, a second process for allowing the charged particles to transfer from the second control electrode to the other display electrode side by jumping over the barrier wall or the step.

More practically, a structural barrier wall comprising a wall structure or a step structure is disposed at the boundary between the first display electrode and the second display electrode on the first substrate, and the control electrode is disposed above the structural barrier wall.

The Preferable construction comprises a shielding space In which the charged particles are able to enter and exit and which is invisible to an observer of the screen provided under the display electrode face adjoining to the step and located at the upper side of the step.

More practically, a voltage is applied to the first display electrode, the second display electrode and control electrode so that the periods satisfying the relation of (the potential of the display electrode that is not a destination of transfer)≧(the potential of the control electrode)>(the potential of the display electrode as a destination of transfer) in transfer of the positively charged particles, and satisfying the relation of (the potential of the display electrode that is not a destination of transfer)<(the potential of the display electrode as a destination of transfer) in transfer of the negatively charged particles are involved in order to induce transfer of the charged electrode; and so that the first process satisfies the relation of (the potential of both display electrodes)>(the potential of the control electrode), and the second process satisfies the relation of (the potential of the display electrode before transfer)>(the potential of the display electrode as the destination of transfer) in transfer of the positively charged particles, and the first process satisfies the relation of (the potential of both electrodes)<(the potential of the control electrode), and the second process satisfies the relation of (the potential of the display electrode before transfer)≦(the potential of the control electrode)<(the potential of the display electrode as a destination of transfer) in transfer of the negatively charged particles, in order to induce transfer of the charged particles comprising the two processes.

Further objects, features and advantages of the present invention will become apparent from the following descriptions of the preferred embodiments with reference to the attached drawings.

BRIEF DESCRIPTION OF THE DRAWINGS

FIG. 10E shows another part of the passive matrix driving method of the display device shown in FIGS. 8A and FIG. 8B;

FIG. 10F shows another part of the passive matrix driving method of the display device shown in FIGS. 8A and 8B;

FIG. 14 shows a plane construction of a 3×3 matrix prepared in Example 1 according to the present invention;

FIG. 16 shows a plane construction of a 3×3 matrix prepared in Example 2 according to the present invention;

FIG. 20 shows a cross section of a representative example of the display device according to the present invention;

FIG. 36 shows a plane construction of a 3×3 matrix prepared in Example 4 according to the present invention

FIG. 42 shows a representative example of the addressing method and operation state of the display device according to the present invention;

FIG. 45C shows another part of the passive matrix addressing method of the display device shown in FIGS. 44A and 44B;

FIG. 45D shows another part of the passive matrix addressing method of the display device shown in FIGS. 44A and 44B;

FIG. 45E shows an another part of the passive matrix addressing method of the display device shown in FIGS. 44A and 44B;

FIG. 45F shows an another part of the passive matrix addressing method of the display device shown in FIGS. 44A and 44B;

FIG. 49D shows another part of the passive matrix addressing method of the display device shown in FIGS. 48A to 48C;

FIG. 49E shows another part of the passive matrix addressing method of the display device shown in FIGS. 48A to 46C;

FIG. 49F shows another part of the passive matrix addressing method of the display device shown in FIGS. 48A to 48C;

FIG. 49G shows another part of the passive matrix addressing method of the display device shown in FIGS. 48A to 48C;

FIG. 50 shows another representative example of the addressing method and operation state of the display device according to the present invention;

FIG. 52A shows an another representative example of the passive matrix addressing method of the display device according to the present invention;

FIG. 52B shows another representative example of the passive matrix addressing method of the display device according to the present invention;

FIG. 53D shows another part of the passive matrix addressing method of the display device shown in FIGS. 52A and 52B;

FIG. 53E shows another part of the passive matrix addressing method of the display device shown in FIGS. 52A and 52B;

FIG. 63 shows a plane construction of a 3×3 matrix prepared in Comparative Example 3;

FIG. 66 shows an addressing method and operation state of the conventional display device;

FIG. 70A shows a problem of the conventional display device;

FIG. 70B shows a problem of the conventional display device;

FIG. 70C shows a problem of the conventional display device;

FIG. 71A shows another problem of the conventional display device; and

FIG. 71B shows another problem of the conventional display device.

DESCRIPTION OF THE PREFERRED EMBODIMENTS

First Embodiment (Basic Construction and Operation of Representative Embodiment)

Figure 1:
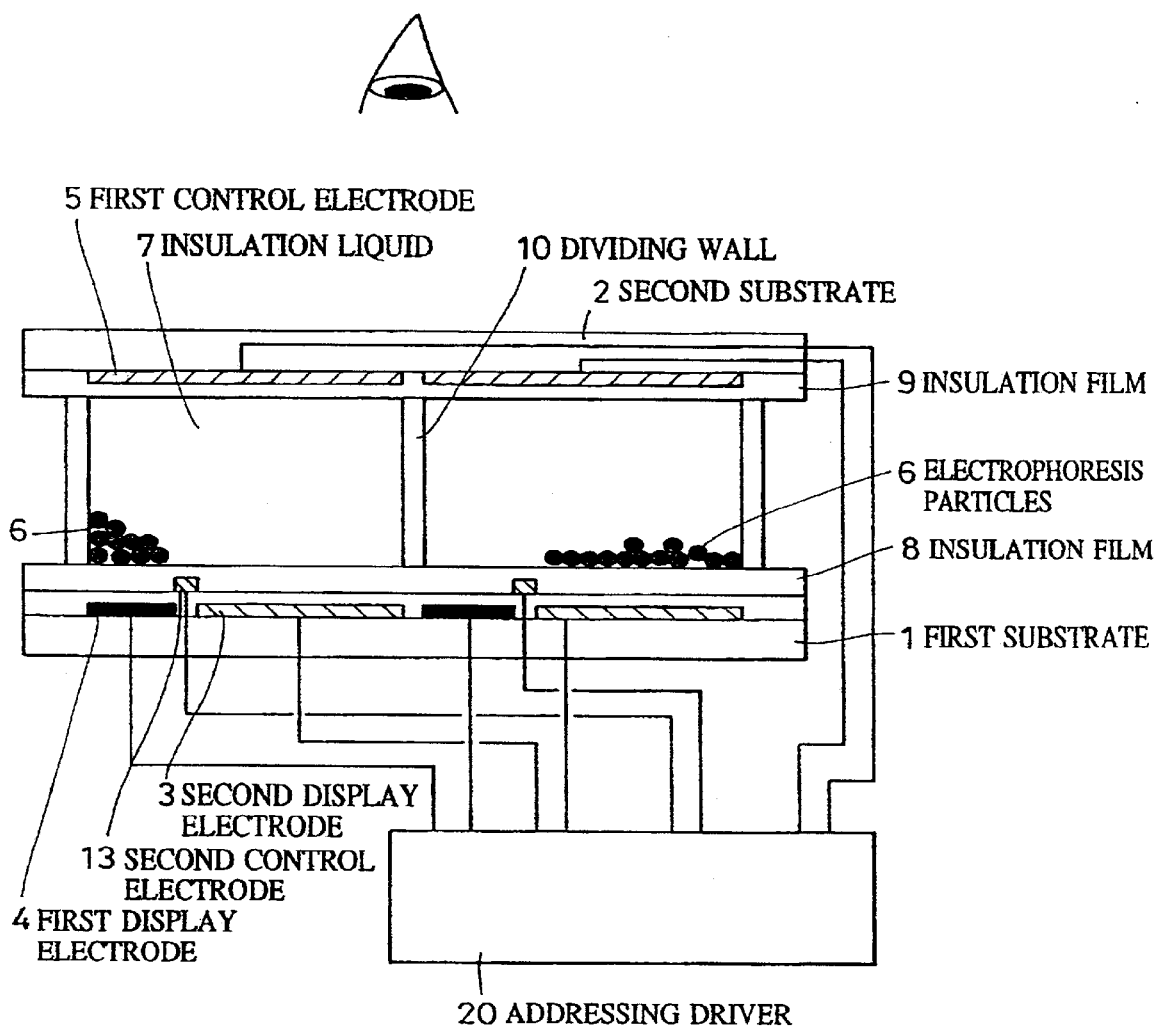
FIG. 1 is a cross section showing a representative example of one example of the display device according to the present invention.

FIG. 1 is a cross section showing a representative example of the display device according to tho present invention. A construction comprising two pixels is shown in FIG. 1 for the convenience of explanation. The first display electrode 4 and the second display electrode 3 are disposed on the first substrate 1, and the second substrate 2 is disposed in opposed relation to the first substrate via a dividing wall 10. The remarkable feature of the construction of the present invention is to provide two control electrodes. The first control electrode 5 is disposed on the second substrate, and the second control electrode 13 is disposed at the boundary between the first display electrode 4 and the second display electrode 3 on the first substrate. A Voltage can be independently applied on each control electrode. The transparent insulation liquid 7 is filled in the space (an area where particles, or charged particles, are accommodated by being sandwiched between the substrates) formed by both substrates and the dividing wall, and colored and charged particles 6 are dispersed in the transparent insulation liquid. The reference numeral 20 denotes an addressing driver.

Figure 2A:
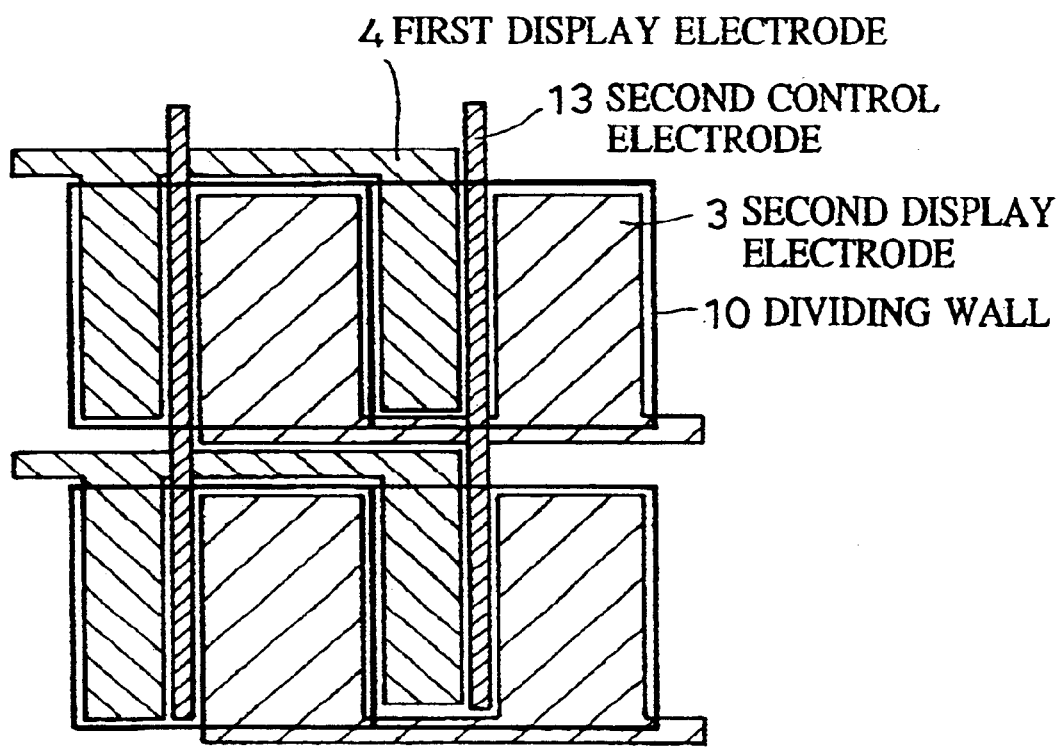
FIG. 2A is a plane view showing a representative example of one example of the display device according to the present invention.
Figure 2B:
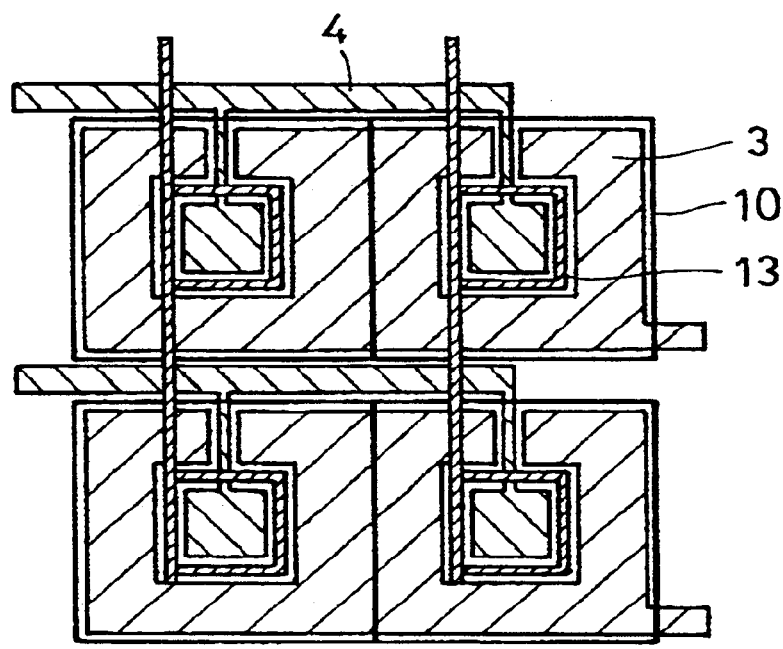
FIG. 2B is another plane view showing a representative example of one example of the display device according to the present invention.

The plane configuration of the display electrode is not particularly limited, but representative stripe shape (FIG. 2A) as well as any shapes such as a rectangle (FIG. 2B) and a closed loop such as a circle may be used. The second control electrode 13 is formed at the boundary area between the first display electrode 4 and the second display electrode 3, irrespective of the shape of the display electrodes.

In the construction shown in FIG. 1, the particle size of the charged particles of 5 $\mu$m, the distance between the first substrate and the second substrate of 70 $\mu$m, and the area ratios of the first display electrode, the second display electrode and the second control electrode of about 25%, 70% and 5%, respectively, are suitable relative to the pixel size of 100 $\mu$m×100 $\mu$m.

Any combinations of colors are possible for the constitution members of the cell. For example, switching of display between the white state and the black state is possible in the combination of the black charged particles 6, black first display electrode 4, white second display electrode 3, white second control electrode 13 and transparent first control electrode 5. Colored display is also possible by aligning RGB colors of the second display electrode 3 and second control electrode 13.

Features of the present invention will be described hereinafter by means of the explanation of the passive matrix addressing method in the constitution of the present invention.

The charged particles 6 are negatively charged, while an addressing voltage Vd1 is applied to the first display electrode 4, an addressing voltage VD2 is applied to the second display electrode 3, a control voltage Vc1 is applied to the first control electrode 5 and a control voltage Vc2 is applied to the second control voltage 13 in the description hereinafter. The arrow in the drawing denoted approximate directions of electric field vectors in the cell.

An in-plane (transfer) type electrophoretic display device comprising a m×n matrix with m rows along the x-direction and n columns along the Y-direction will be considered. Signal lines (m) along the raw direction and signal lines (n) along the column directions are aligned to be perpendicular to one another forming a pixel arrangement. The signal electrode line is connected to the control electrodes of each pixel, the first scanning line is connected to the first display electrode in each pixel, and the second scanning line is connected to the second display electrode in each pixel.

Figure 3A:
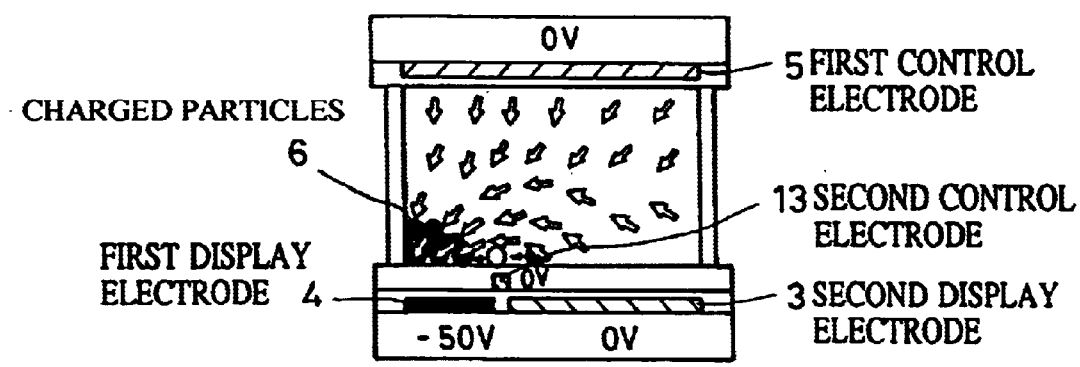
FIG. 3A shows one example of the passive matrix addressing method of the display device according to the present invention.

At first, all the charged particles 6 are collected on the first display electrode 4 by applying a voltage of Fd1 (−50V) on the first display electrode, a voltage of Vd2 (0V) on the first control electrode and a voltage of Vc2 (0V) on the second control electrode to reset the entire screen into white state (FIG. 3A).

Figure 3B:
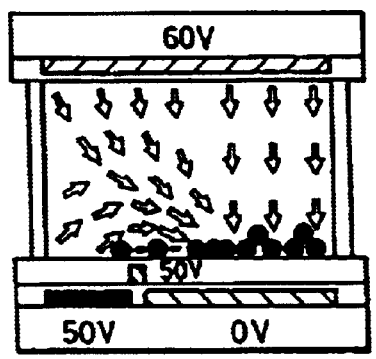
FIG. 3B shows one ample of the passive matrix addressing method of the display device according to the present invention.
Figure 71A:
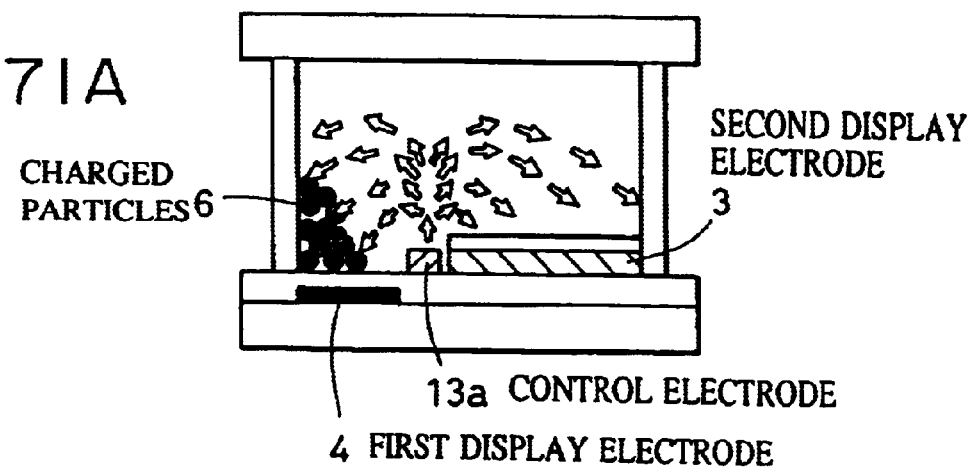
Figure 71B:
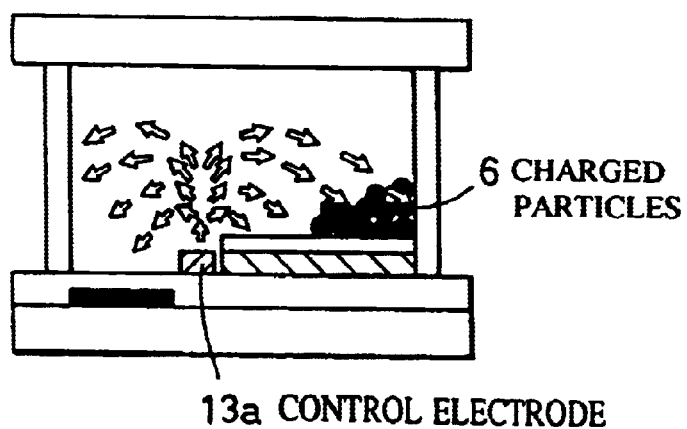

Then, The scanning lines are sequentially selected from above for writing. A voltage of Fd1 (+50V) and a voltage of Vd2 (0V) are applied to the first and second scanning lines, respectively, during the selected period, followed by applying a voltage of Vc1 (+60V) to the first signal line and a voltage of Vc2(50V) to the second signal line corresponding to the selected pixel to be switched into a black state display (FIG. 3B) while allowing an addressing bias to generate between the display electrode. The charged particles 6 are transferred to the second display electrode following the addressing bias as in the conventional example (FIG. 71B) by making the potential of the second control electrode 13 to be equal to the potential of the first display electrode 4. While a voltage of Vc1 (+60V) by +10V larger than Vd1 and Vd2 is applied to the first control electrode for holding in the un-selected lines, this control bias (+10V) only provide a little influence on transfer of the charged particles by the addressing bias.

A voltage of Vc1 (+120V) is applied to the first signal line and a voltage of Vc2 (+70V) is applied to the second signal line corresponding to the un-selected pixel. Since Vd1 is smaller than Vc2, the charged particles 6 do not experience an addressing bias that causes transfer to the second display electrode, which has been a problem in the first construction of Japanese Patent Publication No. 8-507154. While the charged particles 6 tend to be transferred toward the direction remote from the second control electrode by applying a bias (Vd1−Vc2=−20V), on the contrary, as has been a problem in the second construction of Japanese Patent Publication No. 8-507154, the white state display can be securely maintained with no transfer of the charged particles 6 in the present invention, because an electric field vector component is generated to compress the particles toward the display electrode face by applying a voltage of Vc1 (+120V) to the first control electrode.

Figure 4D:
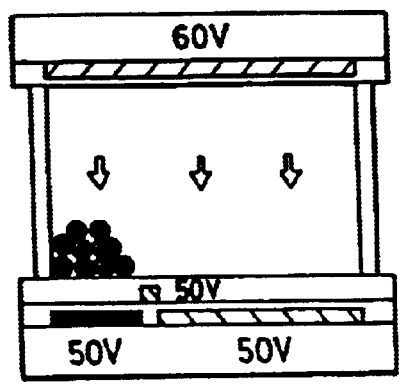
FIG. 4D shows another part of the passive matrix addressing method of the display device shown in FIG. 3A to FIG. 3C.

The voltages of Vd1 and Vd2 (+50V each) are applied to the first and second scanning lines, respectively, during the un-selected period. The voltages of Vc1 (+60V) and Vc2 (+50V) are applied to the first and second signal lines, respectively, corresponding to the selected pixel (FIGS. 4D and 4F). The display state is maintained by gently compressing the charged particles 6 onto the display electrode face by a control bias generated between the first control electrode 5 and each electrode between the first substrate.

Figure 3C:
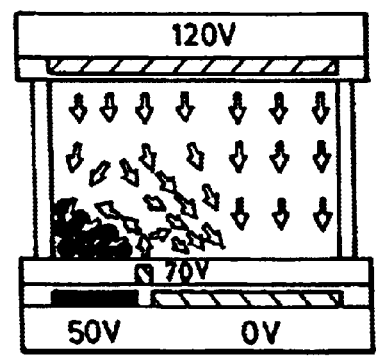
FIG. 3C shows one example of the passive matrix addressing method of the display device according to the present invention.
Figure 4E:
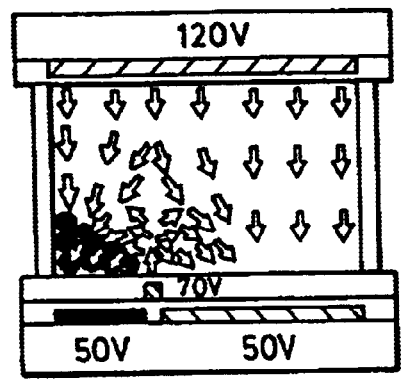
FIG. 4E shows another part of the passive matrix addressing method of the display device shown in FIG. 3A to FIG. 3C.
Figure 4F:
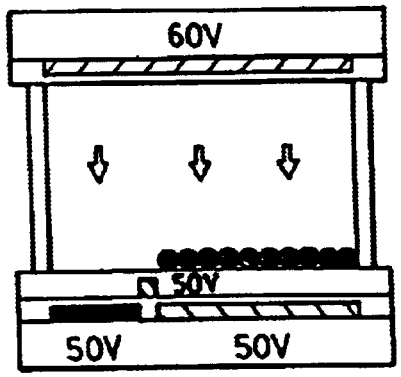
FIG. 4F shows another part of the passive matrix addressing method of the display device shown in FIG. 3A to FIG. 3C.
Figure 4G:
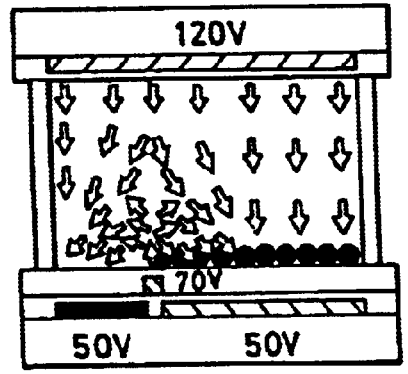
FIG. 4G shows another part of the passive matrix addressing method of the display device shown in FIG. 3A to FIG. 3C.

Voltages of Vc1 (+120V) and Vc2 (+70V) are applied to the first and second signal lines, respectively, corresponding to the un-selected pixel line (FIGS. 4E and 4G). While the charged particles 6 tend to transfer toward the direction remote from the second control electrode on each display electrode by applying a bias (Vd1−Vd2=−20V) as in FIG. 3C, the charged particles 6 do not transfer to maintain stable display state, since an electric field vector component for compressing the particles onto the display electrode face is generated by applying a voltage of Vc1 (+120V) on the first control electrode in the present invention.

The different kind of problems involved in the first and second constructions disclosed in Japanese Patent Publication No. 8-507154 with respect to the display holding operation of the un-selected pixels are effectively solved in the present invention, by introducing two control electrodes offset to one another.

It is made possible in the present invention to largely reduce the control voltage required for holding the charged particles. While a control voltage Vc of +250V has been insufficient in the first construction of Japanese Patent Publication No. 8-507154, a sufficient effect can be exhibited with control voltages of Vc1(+120V) and Vc2 (+70V) in this embodiment.

The passive matrix addressing enables a high contrast display to be achieved with no cross-talk in the in-plane (transfer) type electrophoretic display device according to the present invention.

(Construction and Operation of Other Representative Embodiment)

Figure 5:
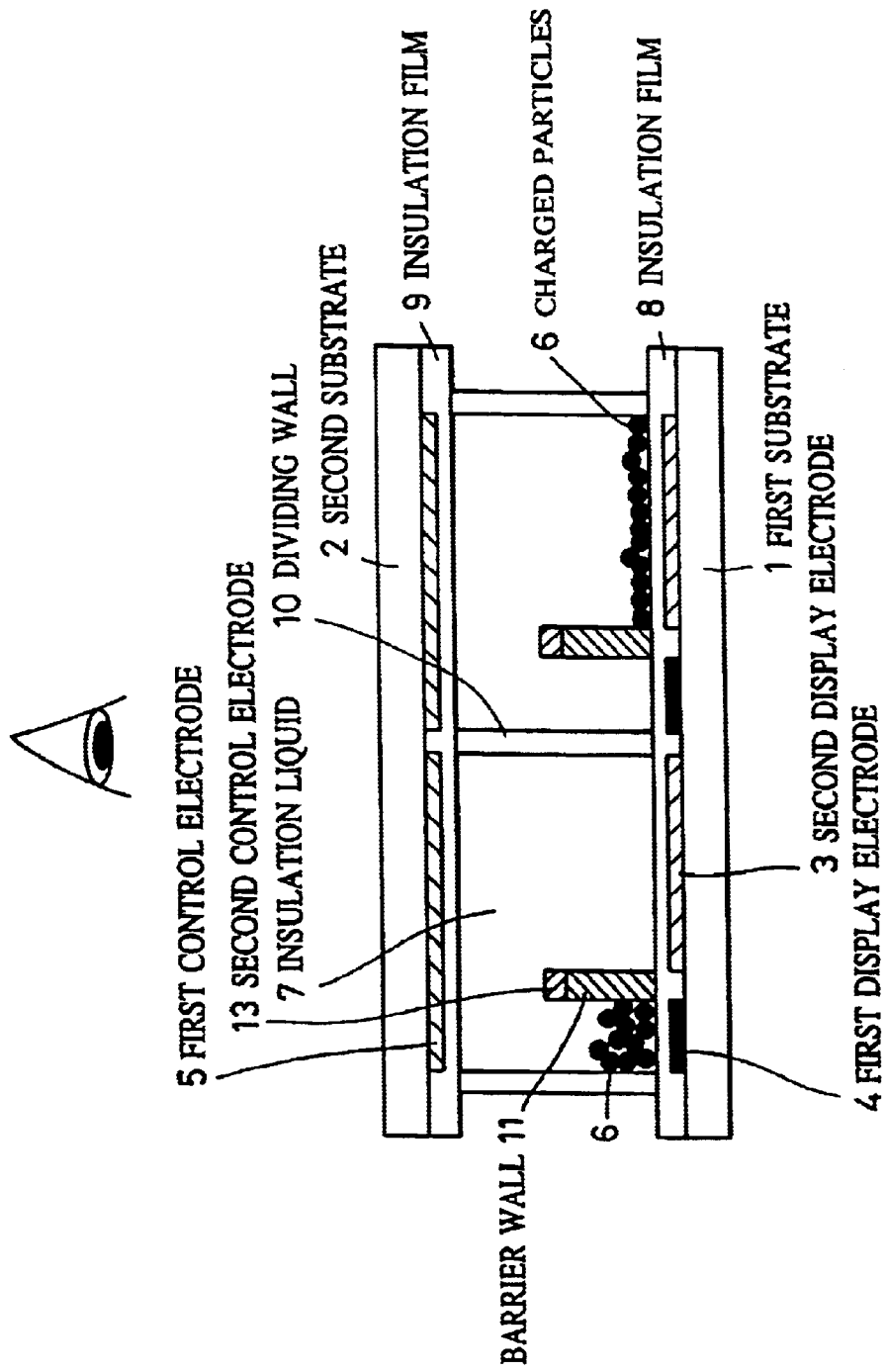
FIG. 5 is a cross section showing another example of the display device according to the present invention.

FIG. 5 shows a cross section of another representative construction of the present invention. FIG. 5 shows a construction comprising two pixels for the convenience of explanations. The first and second display electrodes are arranged on the first substrate, the second substrate 2 is disposed in opposed relation to the first substrate via a dividing wall 10, and the first control electrode 5 is formed on the second substrate 2 in FIG. 5A barrier wall 11 as a feature of this construction is disposed between the first display electrode 4 and the second display electrode 3, and the second control electrode is placed at the tip of the barrier wall 11. A transparent insulation liquid 7 is filled in the space formed by both substrates and the dividing wall, and the colored and charged particles 6 are dispersed in the transparent insulation liquid 7. Colors of the cell constituting members are the same as described in FIG. 1.

A remarkable feature in this embodiment comprises the barrier wall 11 having a height several to several tens times, preferably 3 to 10 times, as large as the particle size of the charged particles. Providing a sufficiently high barrier wall permits direct transfer of the charged particles 6 along the electrode face to be almost prohibited. Since the charged particles can be retained by the high barrier wall without overflow even when the display electrode has a small surface area, a large difference in the surface area can be given between the first and second display electrodes, enabling display contrast to be largely improved.

The particle size of the charged particles is desirably 0.1 to 20 $\mu$m, preferably 0.5 to 10 $\mu$m.

While a larger area ratio between the first display electrode 4 and second display electrode 3 is desirable, it is also required that all the charged particles in all the pixels are housed in the space surrounded by the display electrode having the smaller area (the first display electrode 4 in FIG. 5), the barrier wall 11 and the dividing wall 10. Accordingly, the area ratio and display contrast can be made high as the barrier wall 11 is higher.

Advantageous examples of the sizes of the constitution in FIG. 5 comprise the particle size of the charged particles of 5 $\mu$m, the distance between the first and second substrates of 80 $\mu$m, the height of the barrier wall of 40 $\mu$m, as well as the area ratios of the first display electrode of 15%, second display electrode of 80% and barrier wall of 5% against the total pixel area ratio, relative to the pixel size of 100 $\mu$m×100 $\mu$m.

Figure 6:
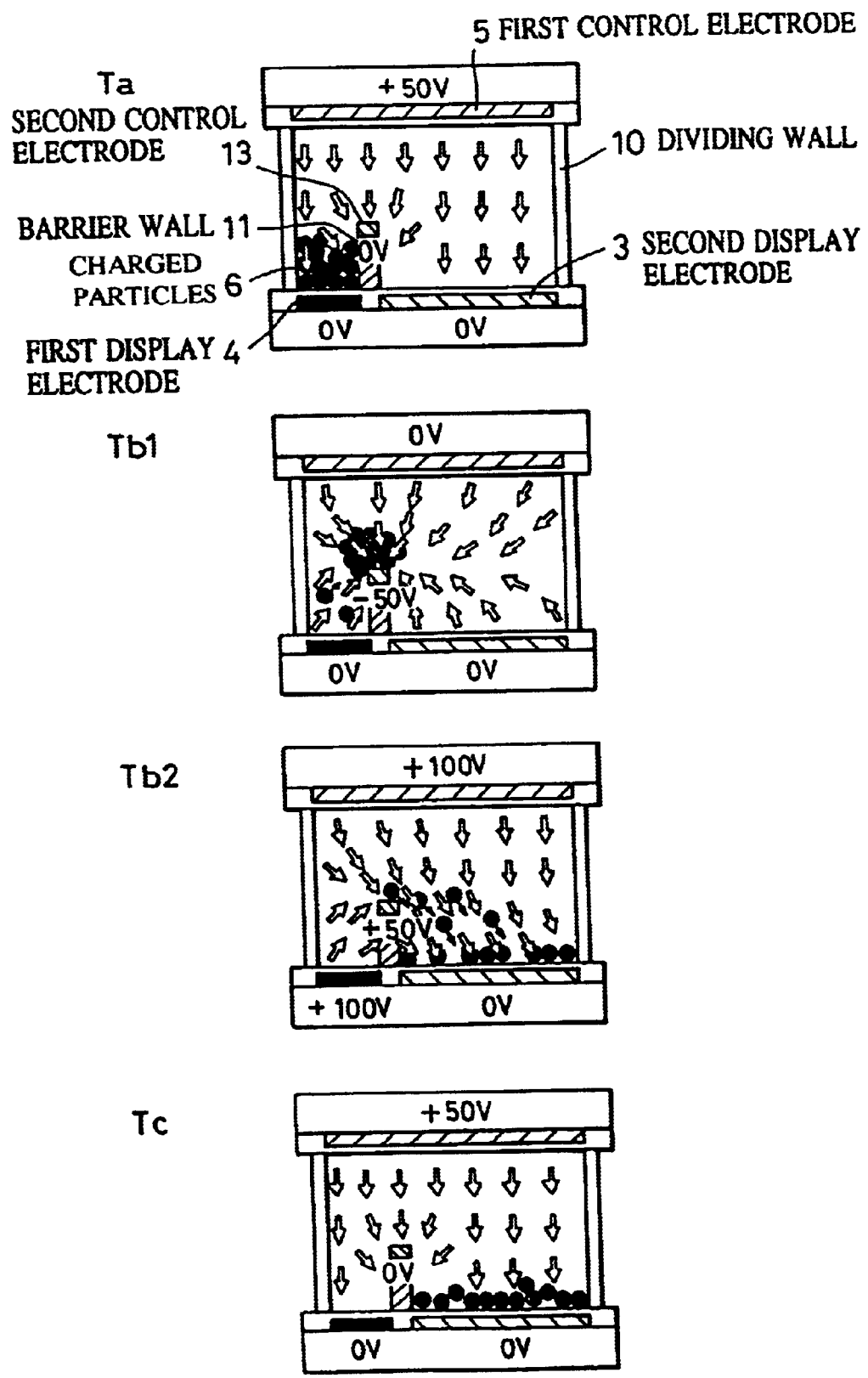
FIG. 6 shows one example or the addressing method and operation state of the display device according to the present invention.
Figure 7:
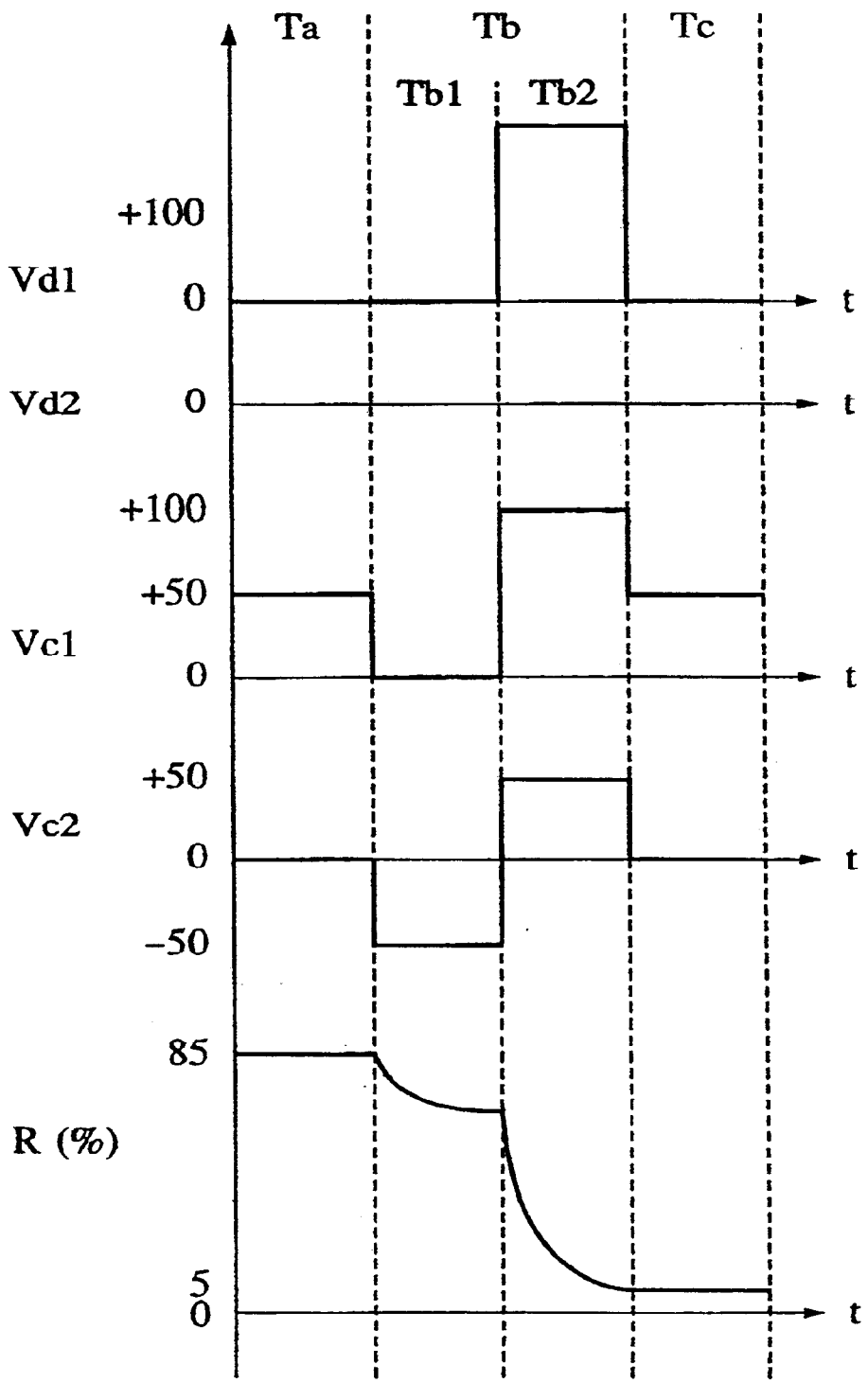
FIG. 7 shows another part of the addressing method and operation state shown in FIG. 6.

The writing operation as a remarkable feature of the addressing method according to the present invention will be then described with reference to FIGS 6 and 7. FIG. 6 shows the operation state of the charged particles in each process, and FIG. 7 shows the applied pulse and reflectivity for every process. The cell construction is the same as shown in FIG. 5 (one pixel).

The charged particles 6 are positively charged in the following descriptions, and an addressing voltage Vd1 is applied on the first display electrode 4, an addressing voltage Vd2 is applied on the second display electrode 3, a control voltage Vc1 is applied on the first control electrode 5, and a control voltage Vc2 is applied on the second control electrode 13.

The period Ta means a white holding state. The arrow in FIG. 6 shows approximate electric field vectors. All the charged particles 6 are housed in a space surrounded by the first display electrode 4, barrier wall 11 and dividing wall 10, and are compressed toward the display electrode side by the hold voltage applied between the first display electrode 4 and the first control electrode 5, thereby the white display state with a reflectivity of about 85% is securely maintained.

Since direct in-plane transfer of the charged particles toward the second display electrode side 3 is almost entirely prohibited by the barrier wall 11, the control voltage for prohibiting transfer of the charged particles and maintaining the display state can be largely reduced as compared with that in Japanese Patent Publication No. 8-507154.

Writing is carried out at the period of Tb1 and Tb2 Zero volt of Vd1, Vd2 and Vc1, and −50V of Vc2 are applied at the period of Tb1 at first to allow all the charged particles 6 to transfer toward the second control electrode disposed at the tip of the barrier wall 11.

Then, +100V of Vd1 and Vd2. +50V of Vc2 and 0V of Vd2 are applied at the period of Tb2, to allow the charged particles 6 collected on the second control electrode at the period of Tb1 to transfer to the second display electrode. Since a bias voltage of +50V relative to the second control electrode is applied to the first display electrode 4, all the charged particles 6 are transferred toward the second display electrode side by jumping over the barrier wall 11 without returning back to the first display electrode, rapidly reducing the reflectivity R.

The period Tc corresponds to a black display holding state. The charged particles 6 transferred toward the second display electrode side are compressed onto the display electrode side by the holding voltage applied between the second display electrode 3 and first control electrode 5, securely maintaining the black display state with a reflectivity of about 10%.

Figure 8A:
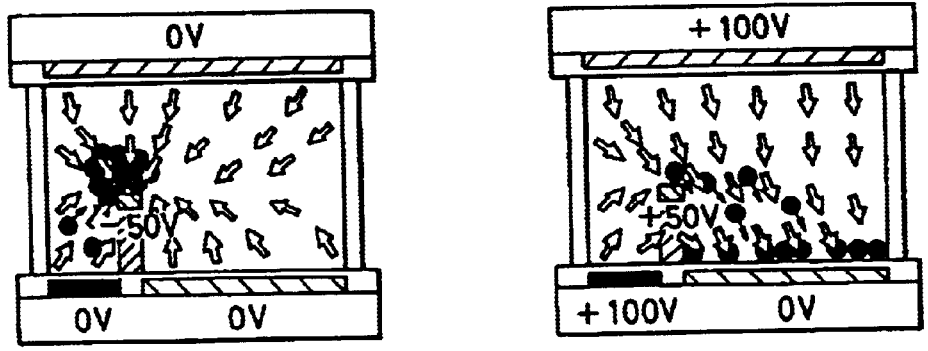
FIG. 8A shows another example of the passive matrix driving method of the display device according to the present invention.
Figure 8B:
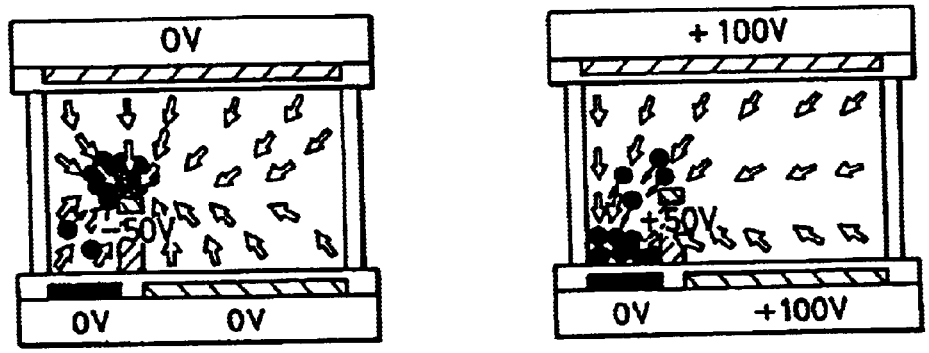
FIG. 8B shows another ample of the passive matrix driving method of the display device according to the present invention.

Subsequently, the passive matrix addressing method in this embodiment is described with reference to FIGS. 8 to 10. An in-plane (transfer) type electrophoretic display device with a m×n matrix as in FIGS. 3 and 4 will be considered. While the scanning lines were connected to the display electrode, the signal lines were connected to the control electrode, the overall screen was initially reset, and writing in each line was carried out toward one direction in FIGS. 3 and 4, the first scanning line is connected to the first control electrode, the second scanning line is connected to the second control electrode, the first signal line is connected to the first display electrode, and the second signal line is connected to the second display line in this embodiment, and writing in each line is bidirectionally carried out. No initial reset is required in this case.

The scanning lines are sequentially selected from above along the Y-direction, and white state or black state signal voltages are applied in accordance with display data for writing.

A voltage of Vc1 (0V at Tb1/+100V at Tb2) is applied on the first scanning line, and a voltage of Vc2 (−50V/+50V) is applied on the second scanning line at the selected period. Voltages of Vd1 (0V/100V) and Vd2 (0V/0V) are simultaneously applied on the first and second signal lines, respectively, corresponding to the pixels for black state writing (FIG.8A). Voltages of Vd1 (0V/0V) and Vd2 (0V/+100V) are also applied on the first and second signal lines, respectively, corresponding to the pixels for white state writing (FIG. 8A). Description of the writing operation is omitted since it has been already explained in FIGS. 6 and 7.

Figure 9C:
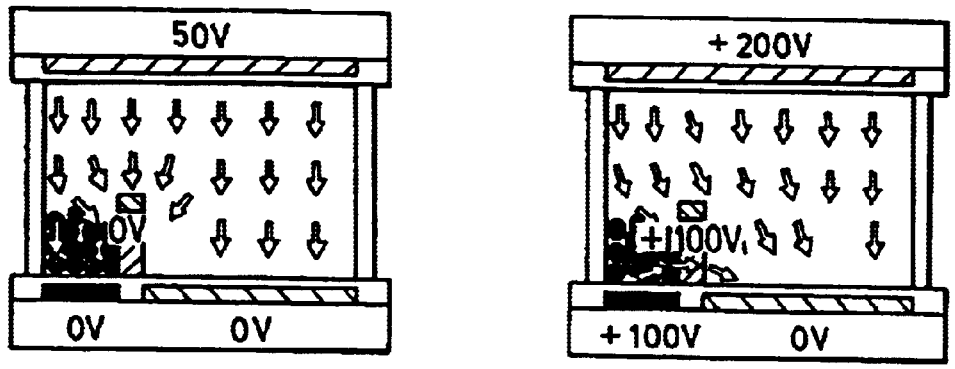
FIG. 9C shows another part of the passive matrix driving method of the display device shown in FIGS. 8A
Figure 9D:
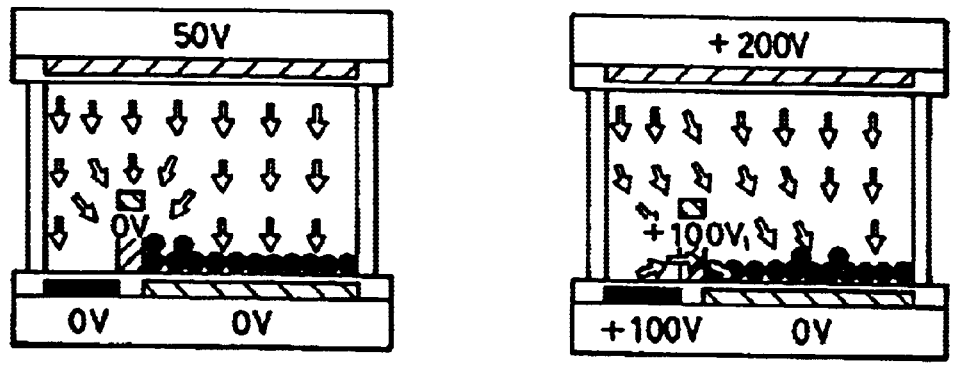
FIG. 9D shows another part of the passive matrix driving method of the display device shown in FIGS. 8A and 8B.

A voltage of Vc1 (+50V/+150V) is applied on the first scanning line and a voltage Vc2 (0V/+100V) is applied on the second scanning line at the un-selected period. With respect to the signal lines, a voltage of Vd1 (0V/+100V) is applied on the first signal line and a voltage of Vd2 (0V/0V) is applied on the second signal line as black state writing signals as in the selected period (FIGS. 9C and 9D). A voltage of Vd1 (0V/0V) and a voltage of Vd1 (0V/+100V) are applied on the first and second signal lines, respectively, as white state writing signals (FIGS. 10E and 10F). Display state of the charged particles 6 are securely retained by the holding voltage as a bias between the first control electrode and each display electrode.

(Variation of Construction)

The construction of the present invention is not restricted to the type shown in FIG. 1. Effective constructions in the present invention will be sequentially described with reference to the drawings.

Figure 11A:
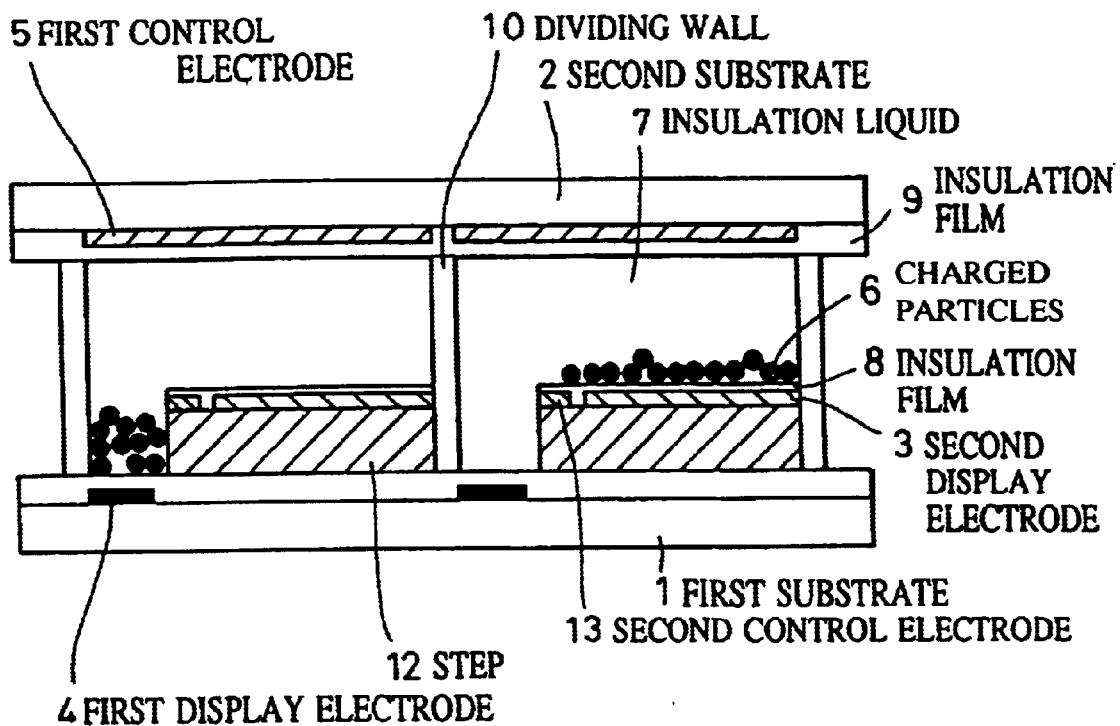
FIG. 11A is a cross section showing another example of the display device according to the present invention.

FIG. 11A shows a type having a step as a barrier wall. The second control electrode is placed at the edge of the step. While the addressing method is the same as that in FIG. 5, writing is restricted to one direction. The height of the step 12 is several to several tens times, actually 3 to 10 times, as large as the particle size of the charged particles, and in-plane transfer of the charged particles are almost totally prohibited. The step in this embodiment differs from the step disclosed in Japanese Patent Publication No. 8-507154 in its height and function.

Figure 11B:
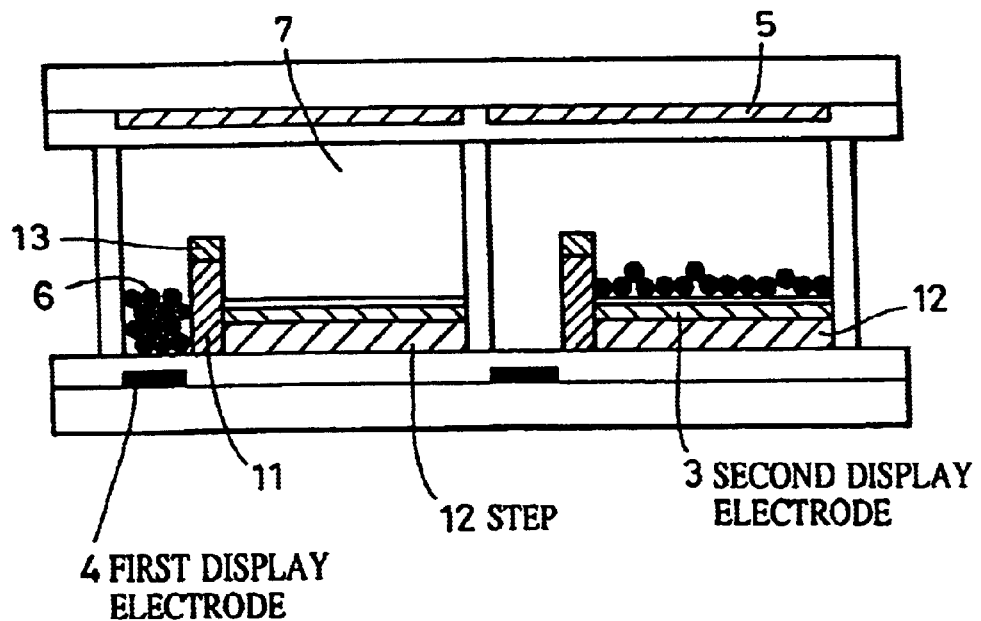
FIG. 11B is a cross section showing another example of the display device according to the present invention.

FIG. 11B shows a variation of FIG. 5, in which the second display electrode 3 having a larger area is disposed at a higher position than the first display electrode 4. In the perspective view of the display electrode in the construction in FIG. 5, an area where the barrier wall 11 interferes the field of vision appears on the face of the display electrode. This interference is particularly evident on the second display electrode face 3 where the distance between the tip of the barrier wall 11 on which the second control electrode is disposed, and the top end of the fill-up face of charged particles 6 is large, thereby view angle characteristics of the screen are slightly affected even when the barrier wall 11 and the second control electrode are made of a transparent material, however, it is possible to align the distance between the top end of the fill-up face in the second display electrode face and the tip of the barrier wall to the same extent in the first display electrode, by disposing the second display electrode face 3 having a larger area to be higher than the first display electrode face 4. This construction also exhibits an effect for making the degree of difficulty of transfer of the charged particles 6, located at the uppermost surface of the first display electrode face 4 and the second display electrode face 3, toward the horizontal direction equal.

Figure 12A:
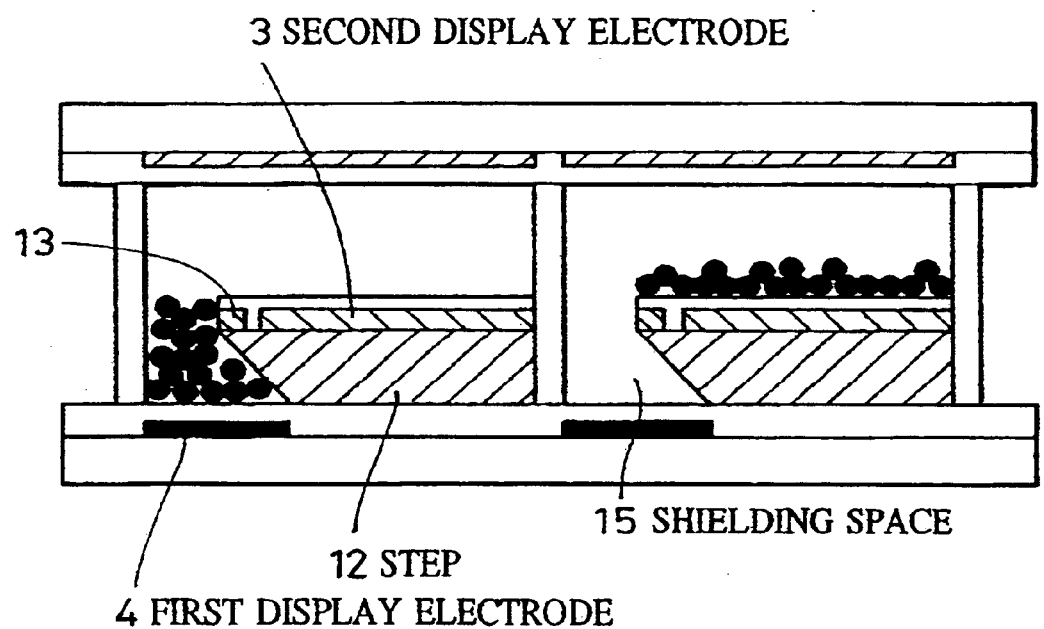
FIG. 12A is a cross section showing another example of the display device according to the present invention.
Figure 12B:
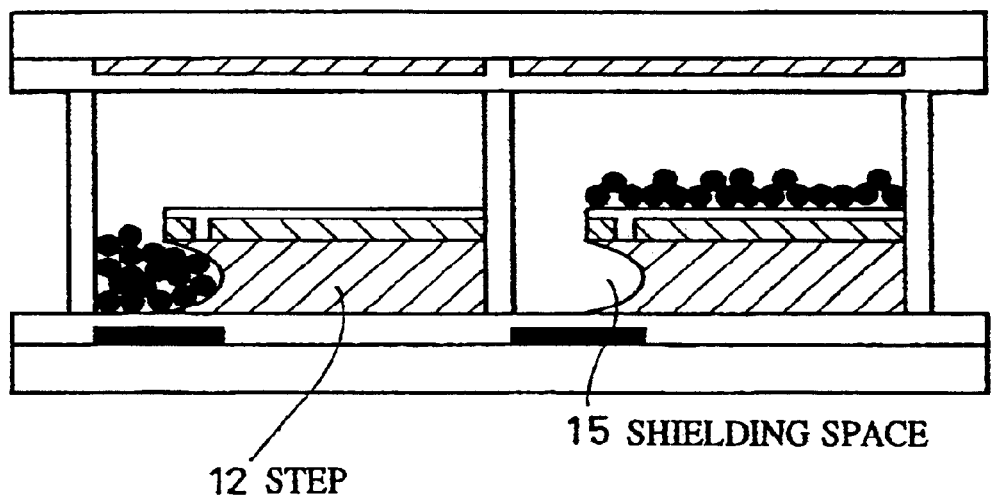
FIG. 12B is a cross section showing another example of the display device according to the present invention.

A variation of the step type display device shown in FIG. 11A is shown in FIG. 12. The fill-up volume of the charged particles on the first display electrode face is increased beside apparently increasing the effective area ratio between the first display electrode 4 and the second display electrode 3 to improve the display contrast, by forming a shield space 15 that is invisible from an observer of the display face on the step wall under the second display electrode face 3 located at the upper side of the step. The shield space 15 may be formed, for example, by an inverse-taper shape (FIG. 12A) or an overhang shape (FIG. 12B) of the cross section of the step.

Figure 13A:
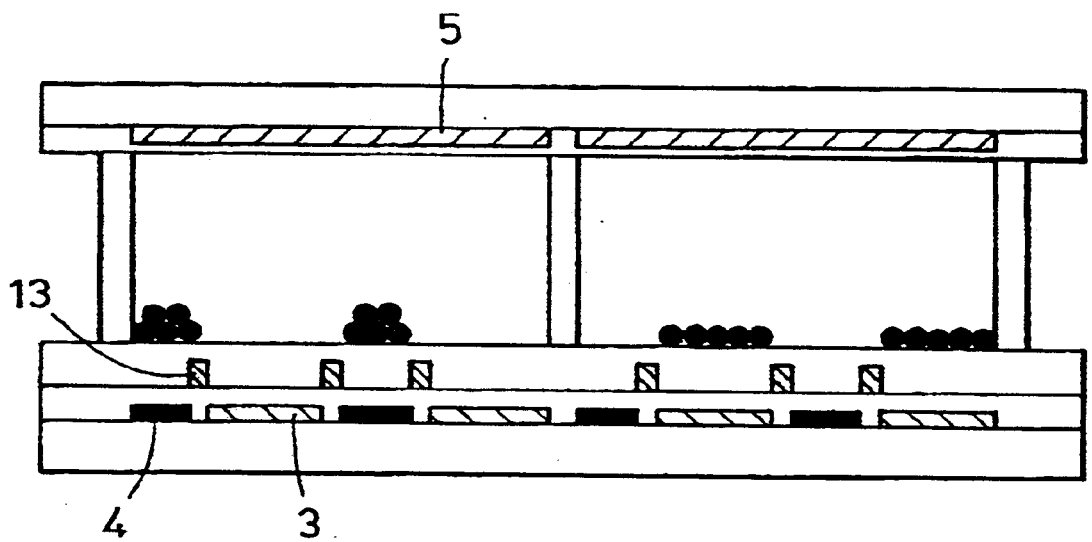
FIG. 13A is a cross section showing another example of the display device according to the present invention.
Figure 13B:
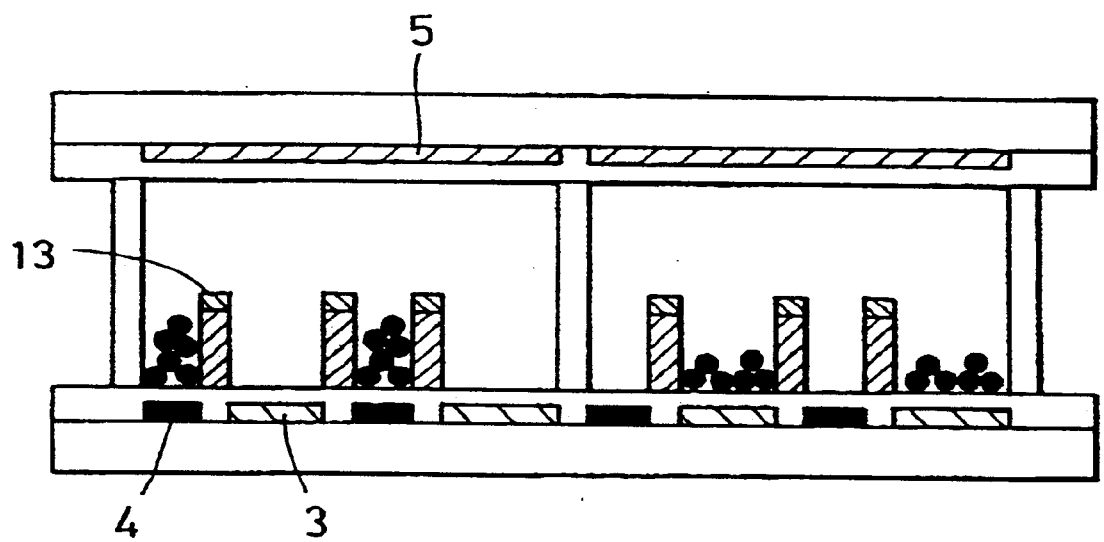
FIG. 13B is a cross section showing another example of the display device according to the present invention.

While a construction in which a pair of the first display electrode and the second display electrode is disposed in one pixel has been described for the convenience of explanation, the number of the electrodes is not particularly restricted in the present invention, but disposing a plurality of the display electrodes is naturally possible. FIGS. 13A and 13B show constructions in which two pairs of the electrodes are disposed in one pixel. FIG. 13A shows the type in FIG. 1, and FIG. 13B shows the type in FIG. 5. The second control electrode and the barrier wall are formed at every boundary between the first display electrode and the second display electrode in both cases.

(Material and Manufacturing Method of Constituting Members)

The manufacturing method of the display device in this embodiment will be described hereinafter with reference to FIG. 1.

At first, the first display electrode 4 and the second display electrode 3 are formed and patterned on the first substrate 1. The first control electrode 5 is similarly formed and patterned on the second substrate 2. Polymer films such as polyethylene terephthalate (PET) and polyethersulfone (PES) films, or inorganic materials such as a glass or quartz are used as the materials of the substrate. Any conductive materials capable of patterning may be used as the materials for the display electrode, and a transparent electrode such as indium tin oxide (ITO) is used for the material for the first control electrode.

An insulation layer is then formed on the display electrode. A thin film material hardly generating pin holes and having a low dielectric constant is preferable for the material of the insulation layer including, for example, an amorphous fluorinated resin, highly transparent polyimide and PET. The suitable thickness of the insulation film is about 100 nm to 1 $\mu$m.

Subsequently, the second control electrode 13 is formed and patterned on the insulation layer. Any conductive materials capable of patterning may be use for the second control material including, for example, a transparent electrode such as indium tin oxide (ITO). While the second control electrode 13 may be transparent, its color may be harmonized with either the first display electrode or the second display electrode.

The surfaces of the display electrode 3 and 4, and the surface of the second control electrode face 13 may utilize the color the electrode material, or the color of the insulation layer material itself formed on the electrode material, or a layer of a desirably colored material may be formed on the insulation layer and substrate face. A coloring material may be mixed into the insulation layer.

Then, the insulation layers 8 and 9 are formed on the first control electrode 5 and the second control electrode 13, respectively. The material and thickness of the insulation layer are as described previously.

Next, the dividing wall 10 is formed on the second substrate. While disposition of the dividing wall 10 is not restricted, it is desirable to place it so as to surround the circumference of each pixel so that the charged particles 6 do not migrate among the pixels. A polymer resin is used for the material of the dividing wall. The dividing wall may be formed by any methods. For example, light exposure and wet development after coating a photosensitive resin layer, adhesion of a separately prepared barrier wall, printing, or molding of the wall on the surface of the light transmissible first substrate is available.

Then, the transparent insulation liquid 7 and colored and charged particles 6 are filled in the space of each pixel surrounded by the dividing wall. A colorless and transparent liquid such as silicone oil, toluene, xylene or high purity petroleum is used. A material exhibiting a good charging property in the insulation liquid such as a mixture of a polyethylene or polystyrene resin with carbon is used for the black colored and charged particles 6. While the particle size of the charged particles 6 is not restricted, those with a particle size of 0.1 to 20 $\mu$m, preferably 0.5 to 10 $\mu$m, are usually used.

After forming an adhesive layer on the bonding face between the first substrate 1 and second substrate 2, they are positioned and bonded by heating. A voltage applying device is connected to this assembly to complete the display device.

The manufacturing method of the construction having the step or barrier wall as shown in FIGS. 5, 11 and 12 will be supplemented hereinafter. The barrier wall 11 or step 12 is formed after forming the display electrodes and insulation layer on the first substrate. The barrier wall or the step may be formed using the same material and method as used in forming the dividing wall, though the second control electrode 13 and the second display electrode 3 should be formed at the tip of the barrier wall or on the upper face of the step.

For example, the barrier wall may be formed by patterning the thick resist film after sequentially forming a thick film for the barrier wall, a film for the second control electrode and a resist film over the entire surface, followed by sequential dry etching or wet etching of the film for the second control electrode and the thick film for the step. The second display electrode film may be formed by low temperature deposition of ITO by a magnetron sputtering method, or by printing of an organic conductive material such as polyaniline.

The step is formed by deposition and patterning of the films for the second display electrode and second control electrode after forming a thick film for the step, then a resist film is separately formed and patterned, followed by dry etching or wet etching of the thick film for the step. The step having a inversely tapered shape (FIG. 12A) or an overhang shape (FIG. 12B) can be formed by adjusting the condition and method of etching as shown in FIG. 12.

The following effects were obtained by the present invention as hitherto described in detail in the first embodiment.

Firstly, a passive matrix addressing with good display contrast can be realized in the in-plane (transfer) type electrophoretic display device with no occurrence of crosstalk. This is because occurrence of cross-talk due to poor holding of the charged particles in the un-selected pixels, which has been a problem in the conventional art, has been almost perfectly depressed by the novel construction and addressing method.

Secondly, the control voltage required for holding the charged particles has been largely reduced by introducing two kinds of different control electrodes.

Thirdly, introducing a high barrier wall or step has enabled the area ratio between the first display electrode and the second display electrode to be adjusted to be higher than the conventional ratio, thereby more improvement of contrast has been realized by a different reason from depression of cross-talk.

Fourthly, addressing for bidirectional writing has been made possible. Consequently, need of initial reset has been eliminated while enabling partial rewriting by which a part of the screen is rewritten Second Embodiment (Basic Construction and Operation)

FIG. 20 is a cross section showing a representative example of the display device according to the present invention. A construction comprising two pixels is shown in FIG. 20 for the convenience of explanation. A barrier wall 11 as a feature of the present invention is disposed between the first display electrode 4 and the second display electrode 3 on the first substrate 1. A second substrate 2 is disposed in opposed relation to the first substrate via a dividing wall 10, and a control electrode 5 is formed on the second substrate 2. A transparent insulation liquid 7 is filled in the space formed by the both substrates and the dividing wall, and colored and charged particles 6 are dispersed in the transparent insulation liquid. The reference numeral 20 denotes an addressing driver.

Figure 21A:
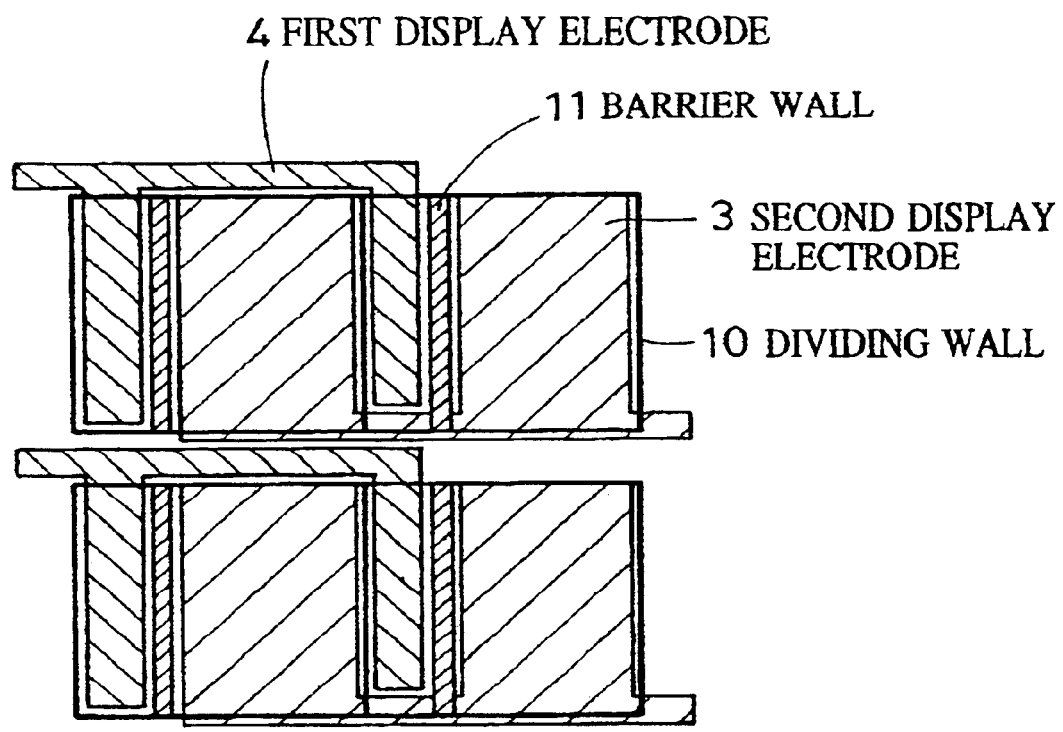
FIG. 21A is a plane view showing a representative example of the display device according to the present invention.
Figure 21B:
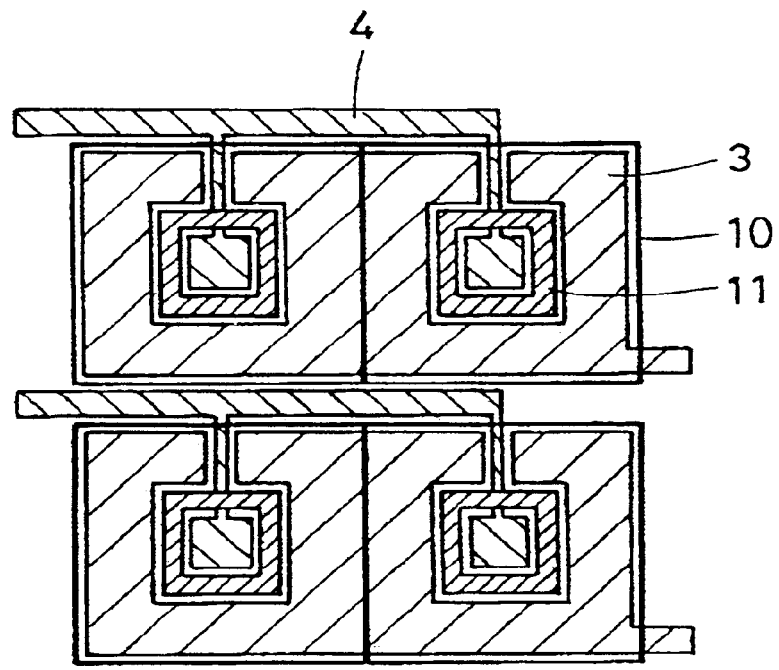
FIG. 21B is a plane view showing a representative example of the display device according to the present invention.

The plane configuration of the display electrode is not particularly limited, but representative stripe shape (FIG. 21A) as well as any shapes such as a rectangle (FIG. 21B) and a closed loop such as a circle may be used. The barrier wall 11 is formed at the boundary area between the first display electrode 4 and the second display electrode 3, irrespective of the shape of the display electrodes.

The feature of the construction of the present invention comprises the barrier wall 11 having a height several to several tens times, preferably 3 to 10 times, as large as the particle size of the charged particles. Providing a sufficiently high barrier wall allows direct in-plane transfer of the charged particles 6 between both display electrodes along the surface of the electrodes to be almost prohibited. Since the charged particles can be retained without overflow by the high barrier wall even when the area of the display electrode is small, a large area difference is set between the first display electrode and the second display electrode to enable display contrast to be largely improved.

The particle size of the colored and charged particles is 0.1 to 20 μm, preferably 0.5 to 10 μm.

Figure 28A:
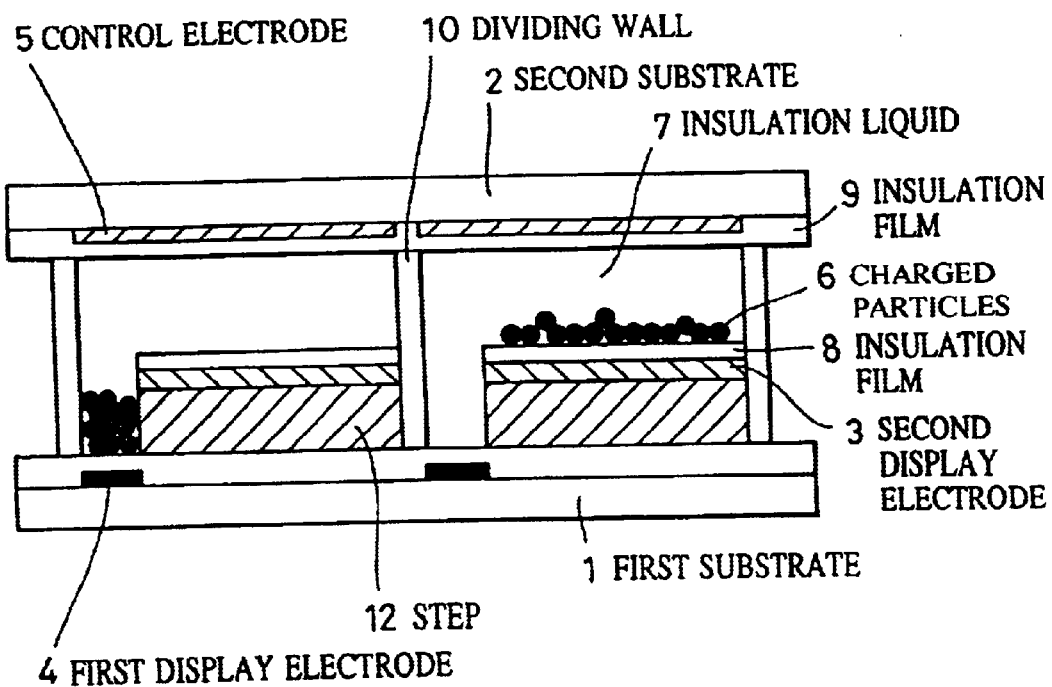
FIG. 28A shows a cross section of another example of the display device according to the present invention.
Figure 28B:
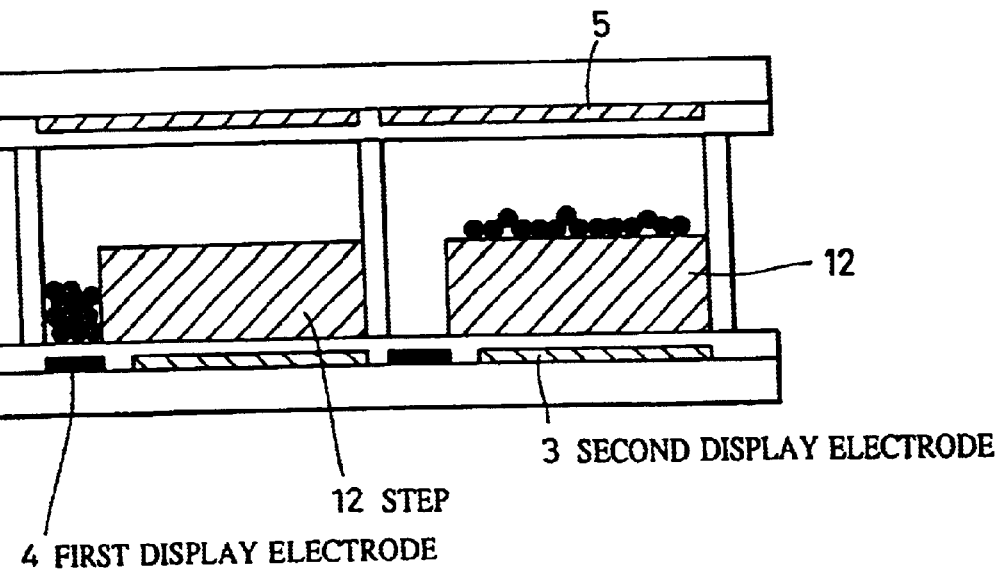
FIG. 28B shows a cross section of another example of the display device according to the present invention.

While the barrier wall in the present invention is constituted by a geometrical step, it is actually a barrier wall 11 shown in FIG. 20, or a step 12 shown in FIGS. 28A and 28B.

While a larger area ratio between the first display electrode 4 and the second display electrode 3 is desirable, it is required that all the charged particles in the pixels are accommodated within a space surrounded by the display electrode having a smaller area (the first display electrode 4 in FIG. 20), and the barrier walls 11 and 10 (or the barrier wall). Accordingly, the higher barrier walls 11 enables the area ratio to be large, or the display contrast to be larger.

In the construction shown in FIG. 1, the particle size of the charged particles of 5 μm, the distance between the first substrate and the second substrate of 80 μm, a height of the barrier wall of 40 μm, and the area ratios of the first display electrode, the second display electrode and the barrier wall of about 15%, 80% and 5%, respectively, are suitable relative to the pixel size of 100 μm×100 μm.

Any combinations of colors are possible for the constitution members of the cell.

For example, switching of display between the white state and the black state is possible in the combination of the black charged particles 6, black first display electrode 4, white second display electrode 3, transparent barrier wall 11 and transparent first control electrode 5. Colored display is also possible by aligning RGB colors of the second display electrode 3.

Figure 22:
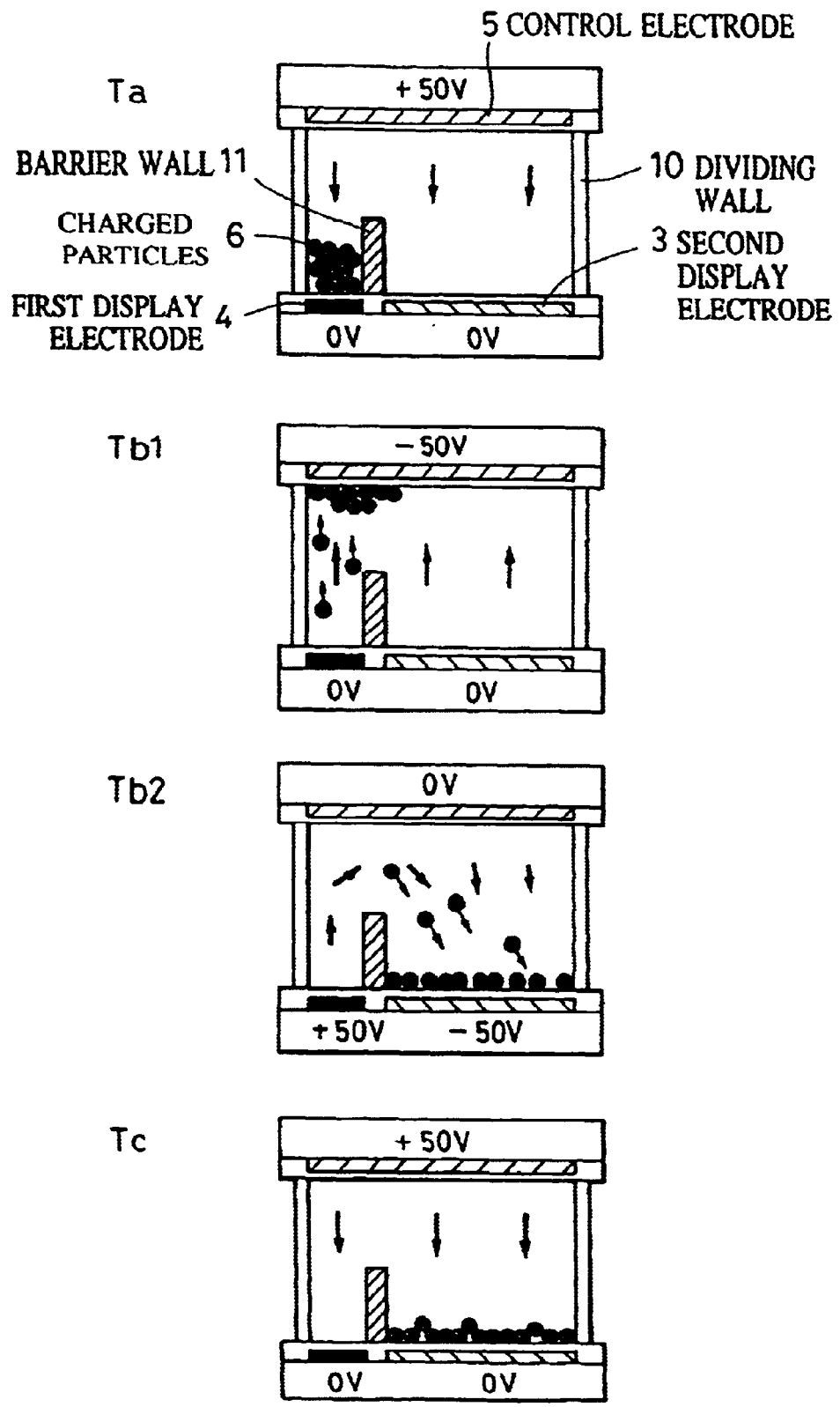
FIG. 22 shows one example of the addressing method and operation state of the display device according to the present invention.
Figure 23:
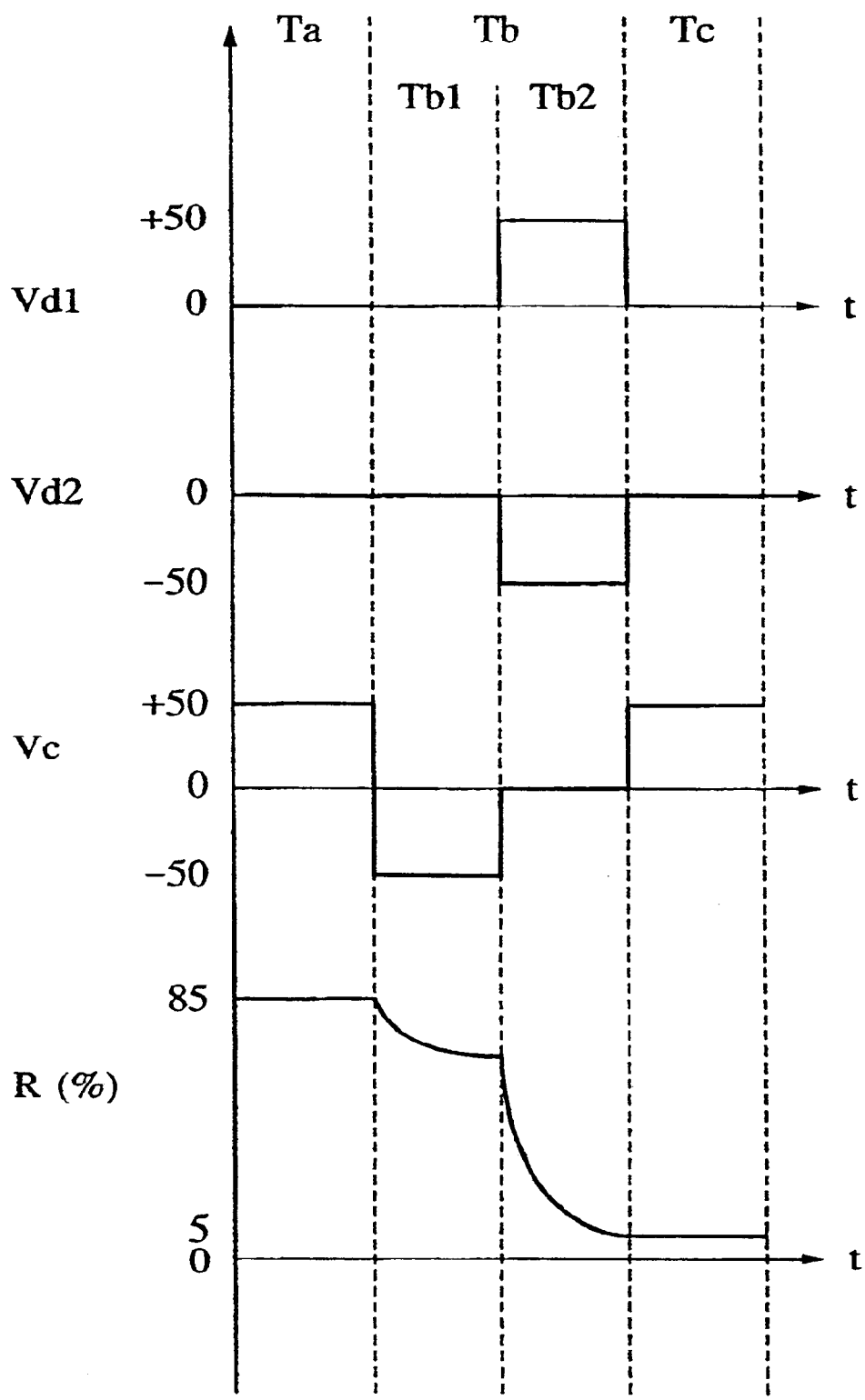
FIG. 23 shows another part of the addressing method and operation state of the display device shown in FIG. 22.

Writing operation as a remarkable feature of the present invention is described with reference to FIGS. 22 and 23. FIG. 22 shows the operation state in each process, and FIG. 23 shows applied pulses and change of the reflectivity in each process. The cell has a construction with one pixel as in FIG. 20.

The charged particles 6 are positively charged, and an addressing voltage Vd1 is applied on the first display electrode 4, a voltage Vd2 is applied on the second display electrode 3, and a voltage Vc is applied on the control electrode 5 in the following description.

The period Ta corresponds to a white state holding state. The arrows in the cell denotes approximate directions of electric field vectors in the cell. All the charged particles 6 are accommodated in a space surrounded by the first display electrode 4, barrier wall 11 and dividing wall 10, and are compressed toward the display electrode side by the holding voltage applied between the first display electrode 4 and control electrode 5 to securely maintain a white display state with a reflectivity of about 80%.

Since direct in-plane transfer of the charged particles toward the second display electrode 3 side is almost completely prohibited by the barrier wall 11 in the present invention, the control voltage for prohibiting transfer of the charged particles and for securely holding them may be largely decreased as compared with the control voltage in Japanese Patent Publication No. 8-507154, which is one of the advantages of the present invention. The control voltage Vc was set to be +50V in FIG. 22.

Writing is carried out at the periods Tb1 and Tb2. Voltages of Vd1 (0V) and Vd2 (0V) are applied at the period Tb1 to transfer the charged particles 6 toward the control electrode side. Although the charged particles 6 are adsorbed on the control electrode 5 side at the period Tb1 as shown in FIG. 22, it is important to allow the charged particles 6 to transfer toward the control electrode 5 side rather than to the tip of the barrier wall, and the particles are not required to transfer onto the control electrode.

Then, voltages of Vd1 (+50V), Vd2 (−50V) and Vc (0V) are applied at the period of Tb2 to invert the direction of transfer of the charged particles 6 from the control electrode side toward the second display electrode side. Since a bias of +50V is applied to the first control electrode 4 relative to the control electrode 5, all the charged particles 6 are transferred toward the second display electrode side without returning back to the first display electrode side to rapidly reduce the reflectivity R.

The period Tc denotes a blackholding state. The charged particles 6 transferred to the second display electrode side are compressed onto the display electrode side by the voltage Vc (+50V) to securely maintain the black display state with a reflectivity of about 10%.

Figure 24:
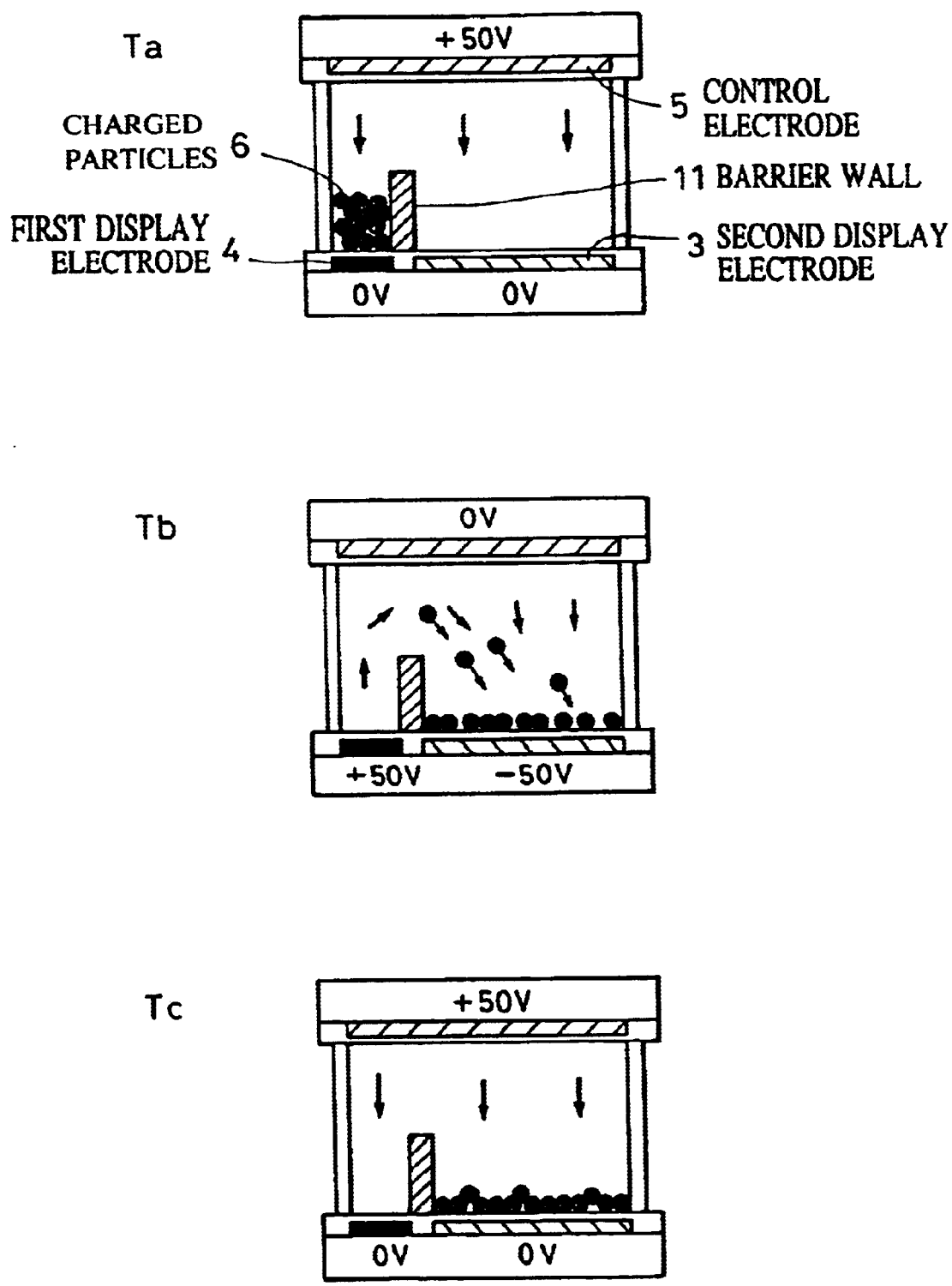
FIG. 24 shows another example of the addressing method and operation state of the display device according to the present invention.
Figure 25:
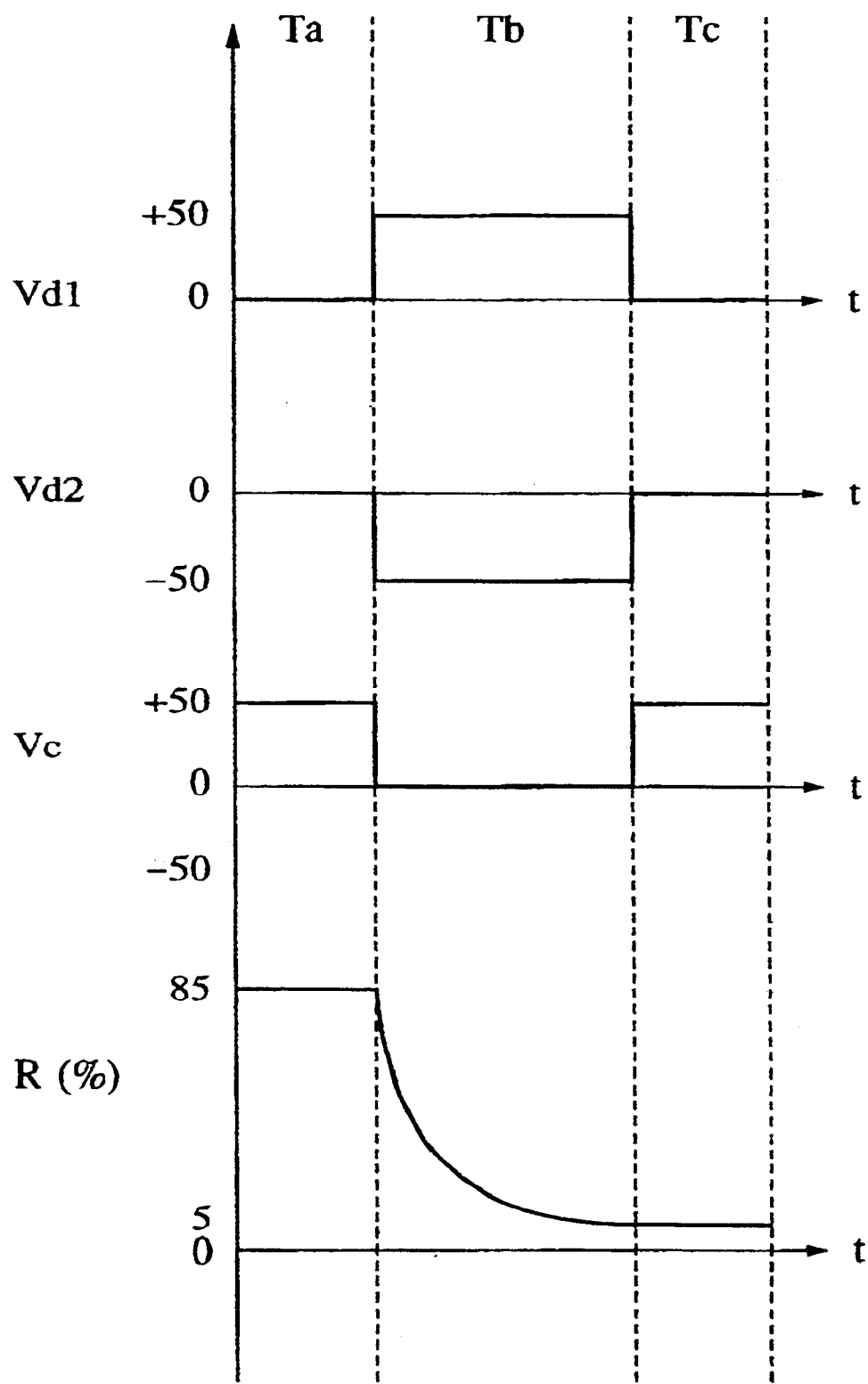
FIG. 25 shows another part of the addressing method and operation state of the display device shown in FIG. 24.

FIGS. 24 and 25 show other addressing methods according to the present invention. Explanations common to those in FIGS. 22 and 23 are omitted. The period Tb1 shown in FIGS. 22 and 23 is omitted in FIGS. 24 and 25, and the charged particles 6 are transferred according to an electric field profile generated when voltages of Vd1 (+50V), Vd2 (50V) and Vc (0V) are applied at a writing period Tb (corresponds to Tb2 in FIGS. 22 and 23).

The charged particles 6 on the first display electrode 4 are at first transferred toward the control electrode side in accordance with distribution of the electric field vectors shown in Fog. 24 at the period of Tb, then are transferred toward the second display electrode side by jumping over the barrier wall 11. While the addressing method in FIGS. 24 and 25 has a simple waveform and has an advantage that the response speed may be improved, freedom of the construction such as the height of the barrier wall is restricted as compared with the methods in FIGS. 22 and 23.

(Passive Matrix Addressing Method)

Figure 26A:
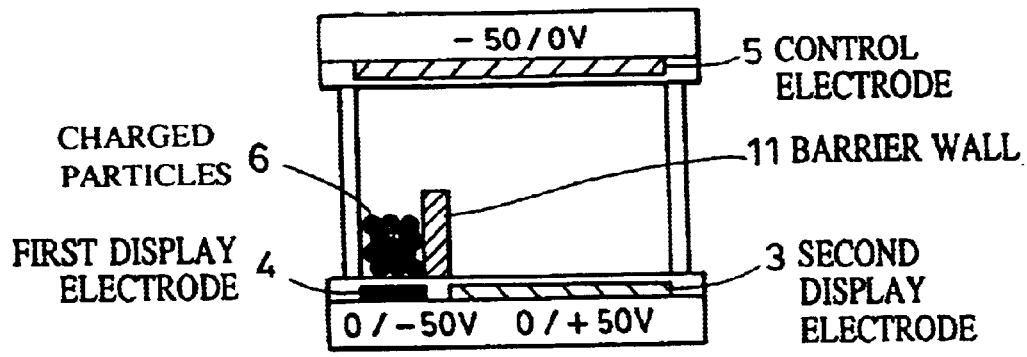
FIG. 26A shows one example of the passive matrix addressing method of the display device according to the present invention.
Figure 26B:
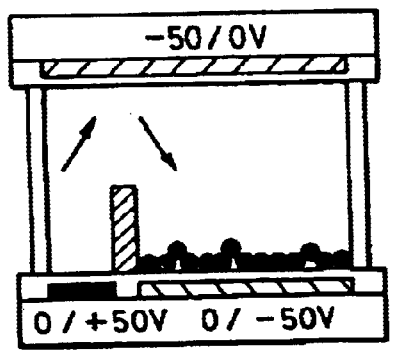
FIG. 26B shows one Ample of the passive matrix addressing method of the display device according to the present invention.
Figure 26C:
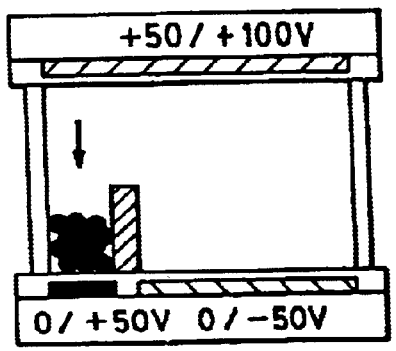
FIG. 26C shows one ample of the passive matrix addressing method of the display device according to the present invention.
Figure 27D:
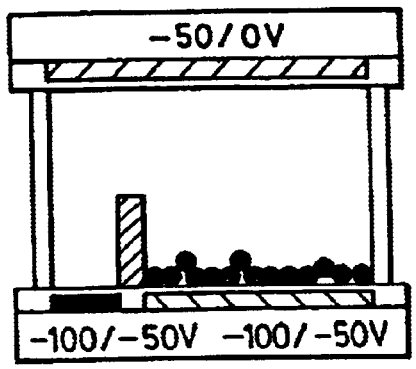
FIG. 27D shows another part of the passive matrix addressing method of the display device shown in FIGS. 26A to 26C.
Figure 27E:
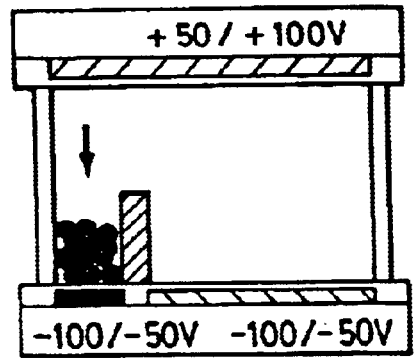
FIG. 27E shows another part of the passive matrix addressing method of the display device shown in FIGS. 26A to 26C.
Figure 27F:
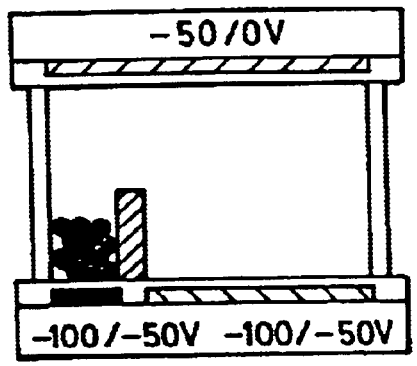
FIG. 27F shows another part of the passive matrix addressing method of the display device shown in FIGS. 26A to 26C.
Figure 27G:
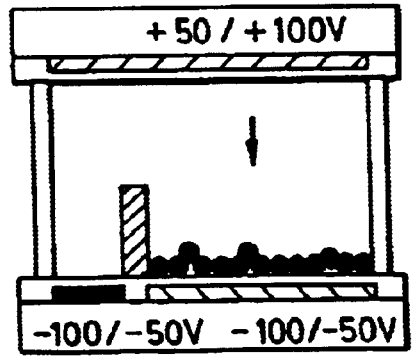
FIG. 27G shows another part of the passive matrix addressing method of the display device shown in FIGS. 26A to 26C.

Subsequently, the passive matrix addressing method according to the present invention will be described with reference to FIGS. 26 and 27. Consider an in-plane (transfer) type electrophoretic display device in which the pixels are arranged in a m×n matrix with colun and row numbers of m and n, respectively. Signal electrode lines (m) are aligned along the column direction, and scanning electrode lines (n) are aligned along the row direction of the pixel array, respectively, so as to cross at right angles to one another. Each signal electrode line is connected to the control electrode of each pixel, each first scanning electrode line is connected to the first display electrode within each pixel, and each second scanning line is connected to the second scanning electrode in each pixel at each crossing point.

At first, all the charged particles 6 are collected on the first display electrode 4 to set into an overall white display state by the writing method described in FIGS. 22 and 23. However, a voltage Vd1 (−50V) is applied on all the first scanning lines, a voltage Vd2 (+50V) is applied on all the second scanning lines, and a voltage Vc (0V) is applied on all the signal lines at a period of Tb2 (FIG. 20A, erase of entire panel face).

Then, writing is carried out by sequentially selecting the scanning lines along the Y-direction from above. A voltage of Vd1 (0V at the period Tb1/+50V at the period Tb2) is applied on the first scanning line, a voltage of Vd2 (0V/−50V) is applied on the second scanning line, a voltage of Vc (−50V/0V) is applied on the signal line corresponding to the selected pixel (FIG. 26B), and a voltage of Vc (+50V/+100V) is applied on the signal line corresponding to the un-selected pixel (FIG. 26C) at the selected period. Black state writing is carried out at the selected pixels (FIG. 26B) by the operations described in FIGS. 22 and 23, and the charged particles are always compressed toward the first display electrode side through the periods Tb1 and Tb2 at the un-selected pixels (FIG. 26C) to securely maintain the white display state.

On the other hand, a voltage of Vd1 (−100V/−50V) is applied on the first scanning line, a voltage Vd2 (−100V/50V) is applied on the second scanning line, and a voltage of Vc (−50V/0V in FIGS. 27D and 27F or +50V/+100V in FIGS. 27E and 27G) is applied on the signal line at the un-selected period. The charged particles are compressed onto the display electrode face by the voltage between the display electrode and control electrode in every case, and the display sate does not change.

A high contrast display can be formed without cross-talk by passive matrix addressing as described above in the in-plane (transfer) type electrophoretic display device according to the present invention.

(Variation of Construction)

The construction of the barrier wall as a feature of the present invention is not restricted to the type shown in FIG. 20. The construction effective in the present invention will be sequentially described hereinafter with reference to the drawings.

FIGS. 28A and 28B show the type in which the barrier wall comprises a step The second display electrode 3 is formed on the step 12 in one type (FIG. 28A), or formed under the step in the other type (FIG. 28B). The height of the step 12 formed is several to several tens times, preferably 3 to 10 times, as large as the particle size of the charged particles in both types, and the step has a function to almost entirely prohibit in-plane transfer of the charged particles. The step has different height and function from the step proposed in Japanese Patent Publication No. 8-507154.

Figure 29:
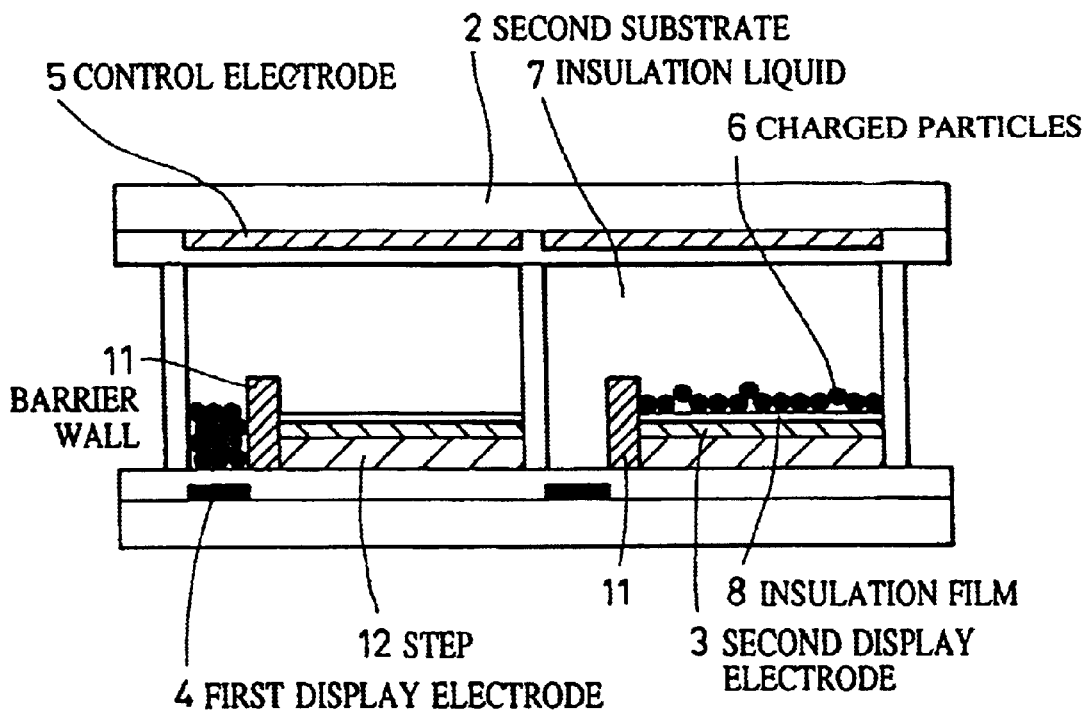
FIG. 29 shows a cross section of another example of the display device according to the present invention.

A construction in which the surface of the second display electrode 3 having a larger surface area is placed at a higher position than the first display electrode is shown in FIG. 29 as a modification of that shown FIG. 20. In the perspective view of the construction in FIG. 20, an area where the barrier wall 11 interferes with the field of vision appears on the display electrode face. This becomes evident on the surface of the second display electrode 3 having a large distance between the tip of the barrier wall 11 and the upper fill-up surface of the charged particles 6, and view angle characteristics of the screen are slightly affected even when the barrier wall 11 comprises a transparent member. However, it is made possible to align the distance between the fill-up surface and the tip of the barrier wall on the second display electrode 3 to be approximately equal to that on the first display electrode, by placing the surface of the second display electrode 3 to be higher than the surface of the surface of the first display electrode 4. This construction further affords an effect that difficulty of in-plane transfer for the charged particles 6 on the uppermost face of the first display electrode 4 may be adjusted to be approximately equal to that on the uppermost face of the second display electrode 3.

Figure 30:
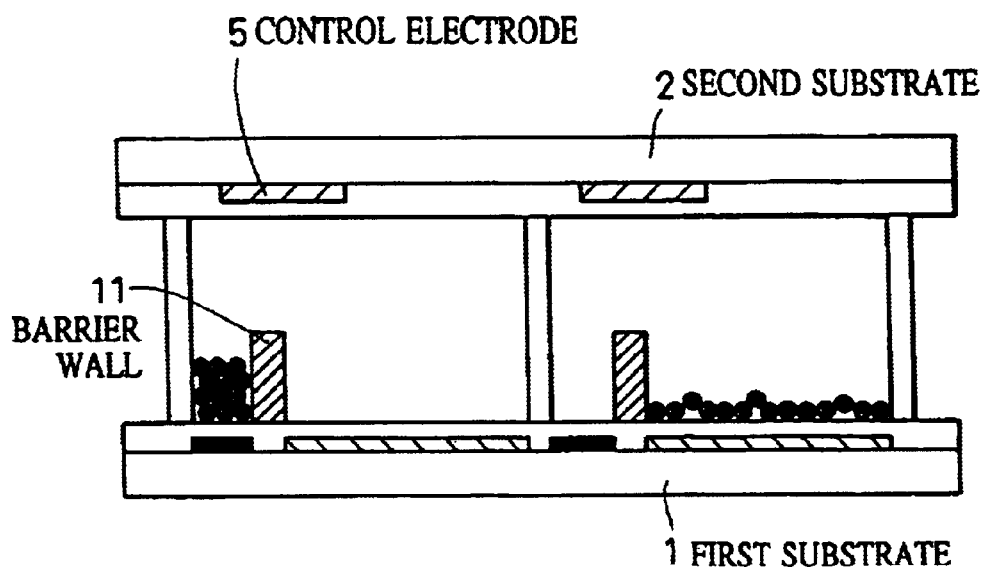
FIG. 30 shows a cross section of another example of the display device according to the present invention.

The control electrode on the second substrate is not always formed over the entire surface of the pixel. A construction in which the control electrode 5 is disposed only in the vicinity above the barrier wall in the construction shown in FIG. 20 is shown in FIG. 30 as an example. This construction has an advantage that the charged particles 6 are more smoothly transferred in the writing operation of the addressing method shown in FIGS. 24 and 25

Figure 31A:
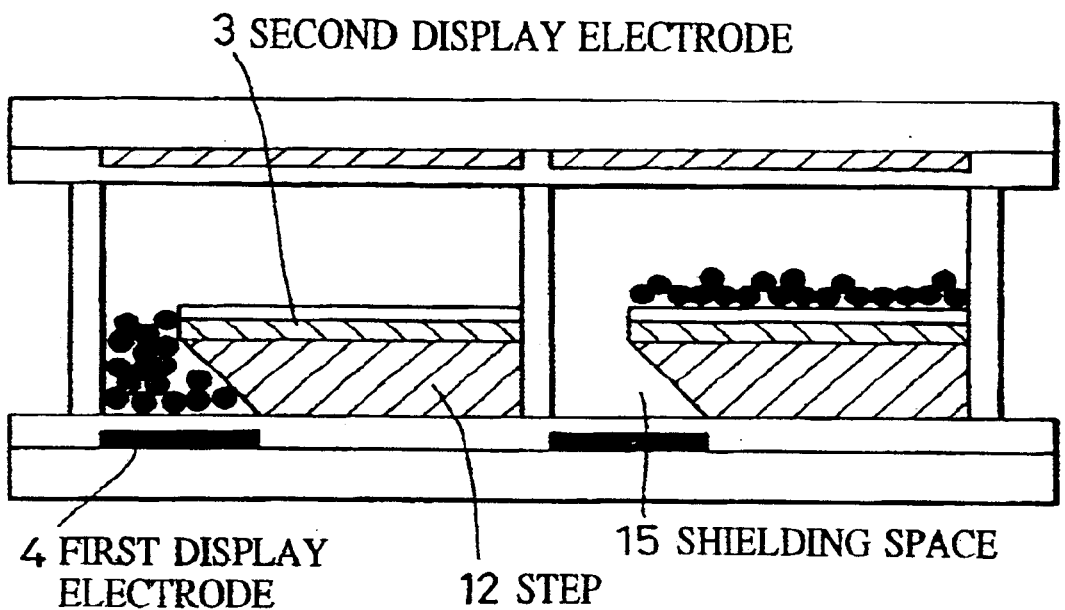
FIG. 31A shows a cross section of another example of the display device according to the present invention.
Figure 31B:
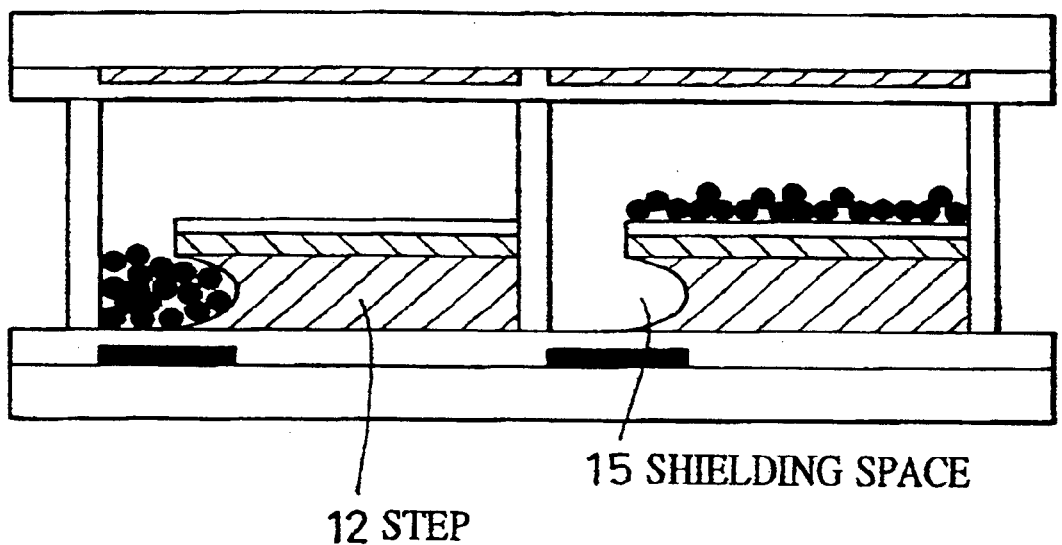
FIG. 31B shows a cross section of another example of the display device according to the present invention.

FIGS. 31A and 31B show variations of the step type shown in FIGS. 28A and 28B. The display contrast can be improved by forming a shielding space 15 invisible from an observer of the screen on the wall of the step under the second display electrode 3 located at the upper side of the step, so that the fill-up volume of the charged particles on the surface of the first display electrode is increased, besides apparently increasing the effective area ratio between the first display electrode 4 and the second display electrode 3. The shield space 15 may be formed, for example, by an inverse-taper shape (FIG. 31A) or an overhang shape (FIG. 31B) of the cross section of the step.

Figure 32A:
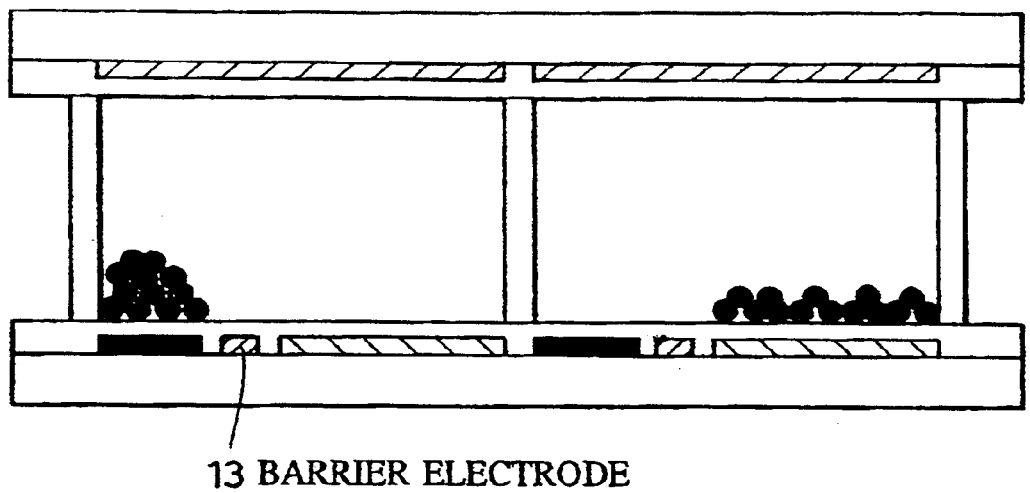
FIG. 32A shows a cross section of another example of the display device according to the present invention.

The barrier wall according to the present invention is not restricted to the geometrical barrier wall, but any barrier wall, for example an electrical barrier wall, that almost prohibits direct in-plane transfer of the charged particles between the display electrodes may be used. FIG. 32A shows a construction in which a barrier electrode 13 as an electrical barrier wall is disposed. The electrical barrier wall is able to exhibit an identical function with the geometrical barrier wall, by controlling the potential of the barrier electrode so as to always exert a repulsive force on the charged particles.

Figure 32B:
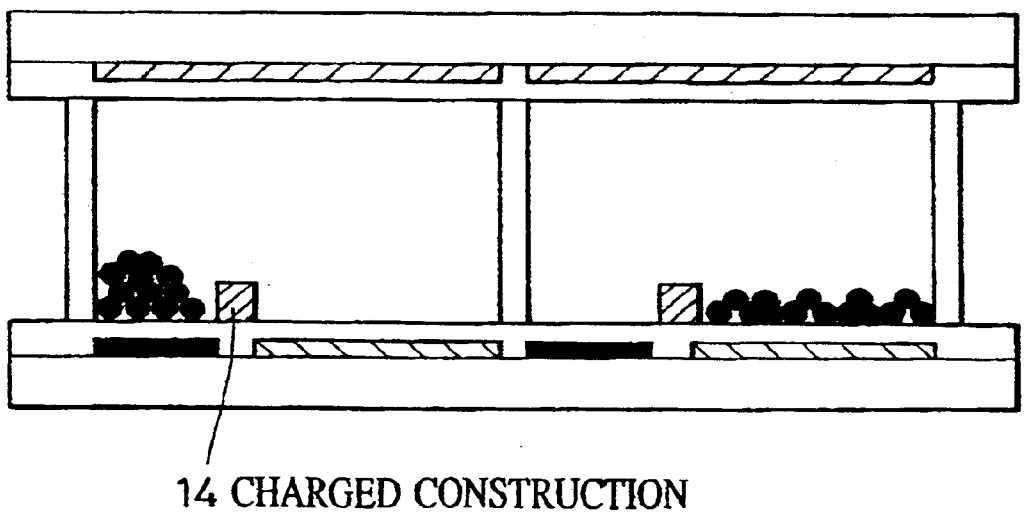
FIG. 32B shows a cross section of another example of the display device according to the present invention.

The construction using a charged assembly 14 as an electrical barrier wall is shown in FIG. 32B. A material capable of semi-permanently retaining electric charge such as a ferromagnetic material and electlet is used for the charged assembly. The charged assembly can exhibit a similar function to the geometrical barrier by charging it with the same polarity as the charged particles.

Figure 33A:
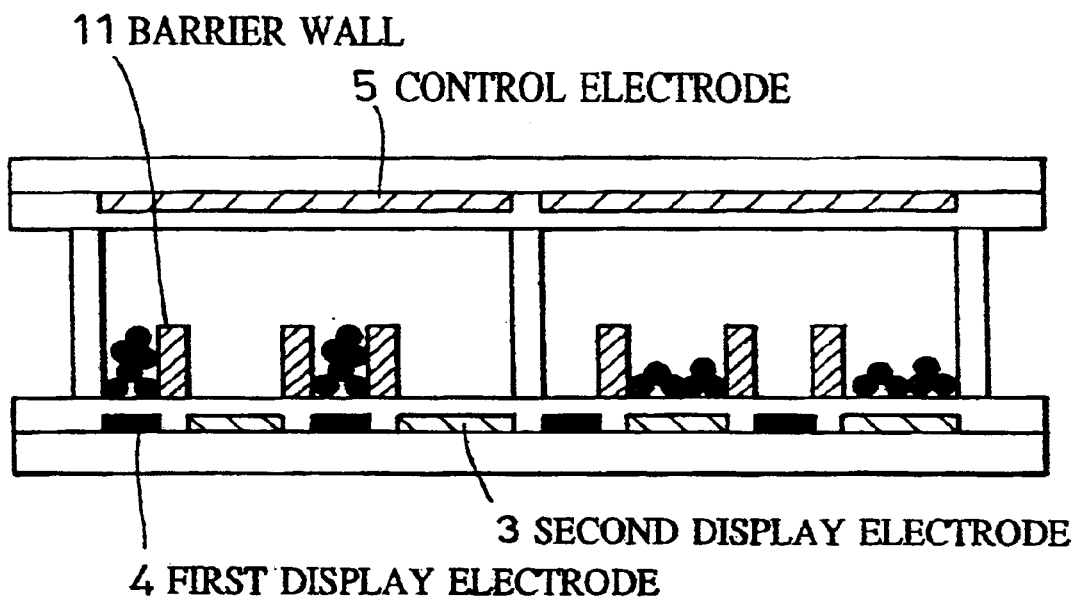
FIG. 33A shows a cross section of another example of the display device according to the present invention.
Figure 33B:
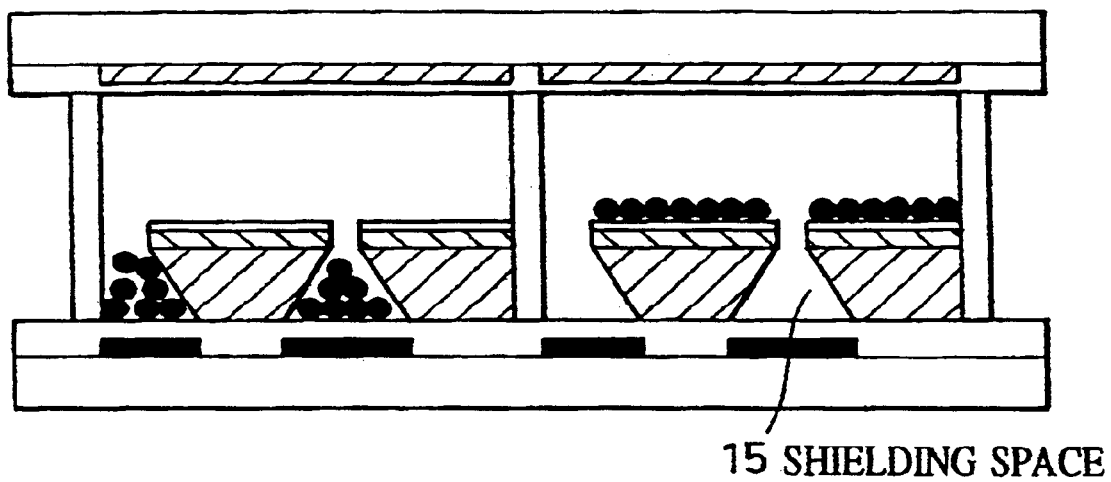
FIG. 33B shows a cross section of another example of the display device according to the present invention.

Although the construction in which a pair of the first display electrode and second display electrode is disposed in one pixel has been described above for the convenience of explanations, it is needless to say that the number of the electrodes in one pixel is not restricted in the present invention, but a plurality of electrode pairs may be disposed. FIGS. 33A and 33B show the construction in which two pairs of the electrodes are disposed in one pixel. The type in FIG. 33A corresponds to the type in FIG. 20, and the type in FIG. 33B corresponds to the type in FIG. 31A.

(Material and Manufacturing Method of Construction Members)

The manufacturing method of the display device in this embodiment is described hereinafter with reference to FIG. 20.

At first, the first display electrode 4 and the second electrode 3 are formed patterned on the first substrate 1. The control electrode 5 is also formed and patterned on the second substrate 2. Polymer films such as polyethylene terephthalate (PET) and polyethersulfone (PES) films, or inorganic materials such as a glass or quartz are used as the materials of the substrate. Any conductive materials capable of patterning may be used as the materials for the display electrode, and a transparent electrode such as indium tin oxide (ITO) is used for the material for the first control electrode.

The color of the electrode material, or the insulation layer material itself may be utilized as the color of the display electrode, or a layer of a material with a desired color may be coated on the electrode. Insulation layer or the substrate face. A coloring material may be mixed into the insulation layer.

Then, insulation layers 8 and 9 are formed on the display electrode and control electrode. Materials having a low dielectric constant such as amorphous silicon resin, highly transparent polyimide and PET may be preferably used. A thickness of the insulation layer of 100 nm to 1 μm is favorably used.

Subsequently, the barrier wall 11 is formed on the first substrate 1. A polymer resin is used for the barrier wall material. The barrier wall may be formed by any method including, for example, exposing to light and wet development after coating a photosensitive resin layer, adhering a separately prepared barrier wall, printing, or forming the barrier wall by molding on the surface of the light transmissible first substrate.

Then, the barrier wall 10 is formed on the second substrate. While disposition of the wall 10 is not restricted, it is preferable to arrange it so as to surround the circumference of each pixel, so that the charged particles do not migrate among the pixels. The barrier wall 10 is formed using the same material and method as in the barrier wall 11. The transparent insulation liquid 7 and colored and charged charged particles 6 are filled in each space in the pixel surrounded by the barrier wall. A colorless and transparent liquid such as silicone oil, toluene, xylene or high purity petroleum is used for the transparent insulation liquid 7. A material exhibiting good charging ability in the insulation liquid such as a mixture of carbon with polyethylene or polystyrene is used for the black charged particles. While particle size of the charged particles 6 is not restricted, particles with a diameter of 0.1 to 20 μm, preferably 0.5 to 10 μm, are usually used.

After forming an adhesive layer on the bonding face between the first substrate 1 and the second substrate 2, the first and second substrates are positioned to one another, followed by bonding with heating. The display device is completed by connecting a voltage application device to the assembly.

The step shapes as shown in FIGS. 20, 29 and 31 may be formed by the same material and method for forming the step and barrier wall. The second display electrode 3 should be formed, however, on the upper face of the step, except those in FIG. 20B. After sequentially forming a thick film for the step, a film for the second display electrode and a resist film on the entire surface, the resist film on the uppermost face is patterned, followed by sequentially applying a dry etching or wet etching to the film for the second display electrode and the thick film for the step. ITO can be deposited by a magnetron sputtering method for the film for the second display electrode, or a film of an organic conductive material such as polyaniline may be formed by printing. A step with a cross section such as an inverse-taper shape (FIG. 31A) or an overhang shape (FIG. 31B) may be formed by adjusting the etching method and condition.

The following effects were obtained by the present invention as hitherto described in detail in the first embodiment.

Firstly, a passive matrix addressing with good display contrast can be realized in the in-plane (transfer) type electrophoretic display device with no occurrence of cross-talk. This is because occurrence of cross-talk due to poor holding of the charged particles in the un-selected pixels, which has been a problem in the conventional art, has been almost perfectly depressed by the novel construction and addressing method.

Secondly, the area ratio between the first display electrode and the second display electrode can be set larger than the conventional one by introducing the high barrier wall, thereby enabling more improvement of the contrast to be realized by a different reason from depressing the cross-talk.

Thirdly, addressing for bidirectional writing has been made possible. Consequently, need of initial overall reset of the entire screen has been eliminated while enabling partial rewriting addressing by which a part of the screen is rewritten.

Fourthly, the control voltage has been largely decreased as compared with the conventional one by sufficiently increasing the height of the barrier wall or step to enable in-plane transfer of the charged particles to be almost entirely prohibited without setting the control voltage.

Third Embodiment

The third embodiment of the present invention provides an electrophoretic display device comprising: a first substrate; a first display electrode and a second display electrode disposed on the first substrate; a second substrate disposed in opposed relation to the first substrate; a device for applying a desired voltage on each electrode; a transparent insulation liquid filled between the first substrate and the second substrate; and a plurality of colored and charged fine particles dispersed in the transparent insulation liquid, display modes being switched by allowing the colored and charged particles between the first and second display electrodes, wherein the control electrode is disposed between the first display electrode and the second display electrode in the first substrate, and the distance between the upper face of the control electrode and the surface of the first substrate is larger than the distance between the upper face of the first display electrode and the surface of the first substrate, and the distance between the upper face of the second display electrode and the surface of the first substrate.

The third embodiment of the present invention also provides an electrophoretic display device comprising; a first substrate; a first display electrode and a second display electrode disposed on the first substrate; a second substrate disposed in opposed relation to the first substrate; a device for applying a desired voltage to each electrode; a transparent insulation liquid filled between the first substrate and the second substrate; a plurality of colored and charged fine particles dispersed in the insulation liquid; a structural barrier wall comprising a wall structure or a step structure disposed at the interface between the first display electrode and the second display electrode; a control electrode disposed above the structural barrier wall, display modes being switched by allowing the colored and charged particles between the first and second display electrodes, and being capable of controlling transfer of the colored and charged fine particles by a synergetic effect between a physical barrier by the structural barrier wall and an electrical barrier by the control electrode, wherein transfer of the charged particles comprises a first process for allowing the charged particles to transfer from one of the display electrodes to the vicinity of the second control electrode side and, succeeding the first process, and a second process for allowing the charged particles to transfer from the control electrode side to the other display electrode side by jumping over the barrier wall.

The third embodiment of the present invention will be sequentially described hereinafter.

(Construction and Operation of Representative Third Embodiment)

Figure 40:
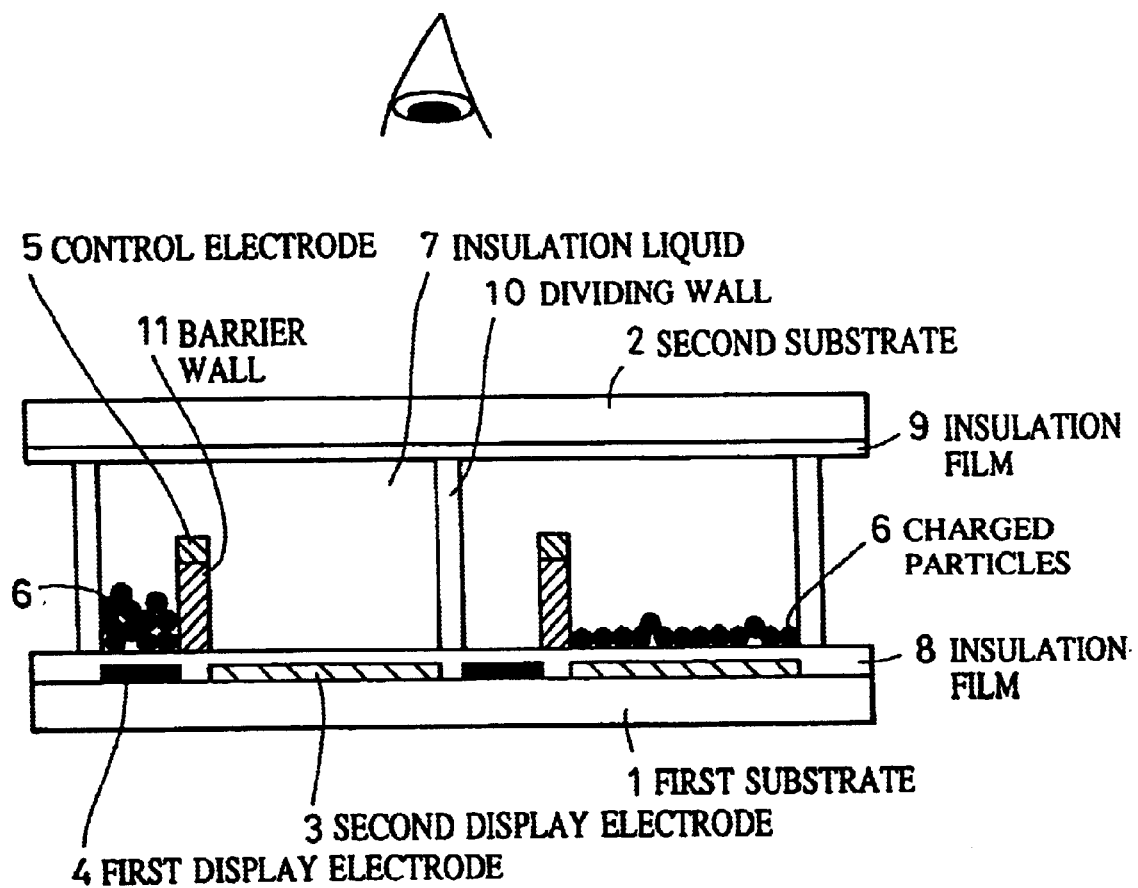
FIG. 40 is a cross section showing a representative example of the display device according to the present invention.

FIG. 40 shows a cross section of the representative construction according to the present invention. A construction comprising two pixels is shown in FIG. 40 for the convenience of explanations. The first display electrode 4 and second display electrode 3 are disposed on the first substrate 1, and the second substrate 2 is placed in opposed relation to the first substrate via a dividing wall 10. A structural barrier wall 11 comprising a wall or a step, and a control electrode 5 disposed above the structural barrier wall are provided at the boundary between the first display electrode 4 and second display electrode 3. A wall structure is formed as the structural barrier wall 11 in FIG. 40. A transparent insulation liquid 7 is filled in the space formed by both substrates and the dividing wall, and the colored and charged particles are dispersed in the insulation liquid.

Figure 41A:
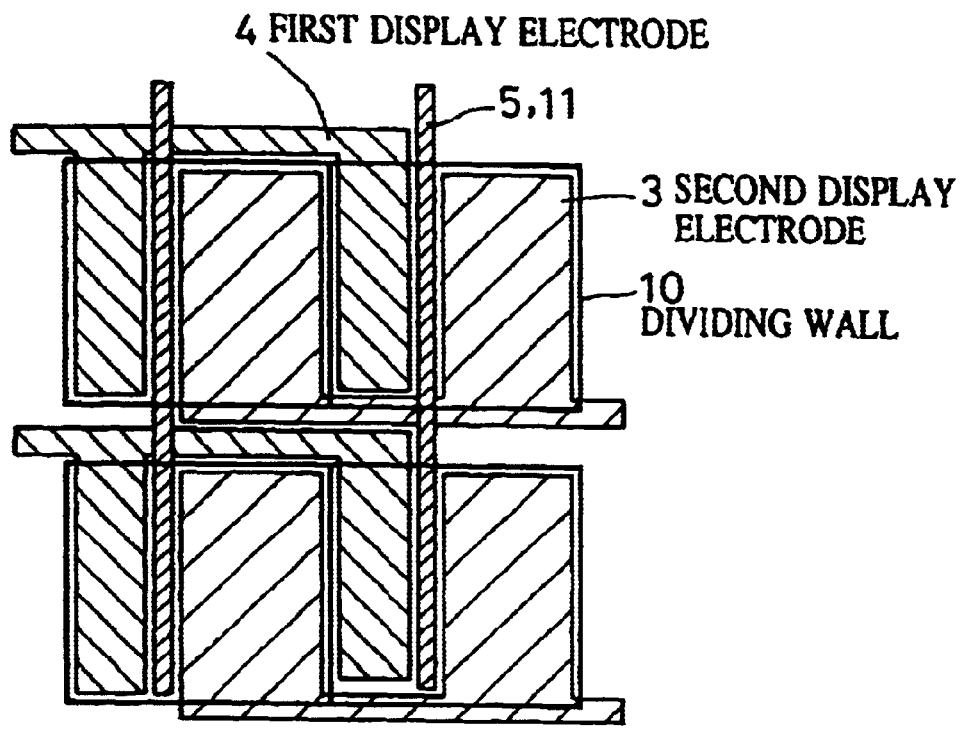
FIG. 41A is a plane view showing a representative example of the display device according to the present invention.
Figure 41B:
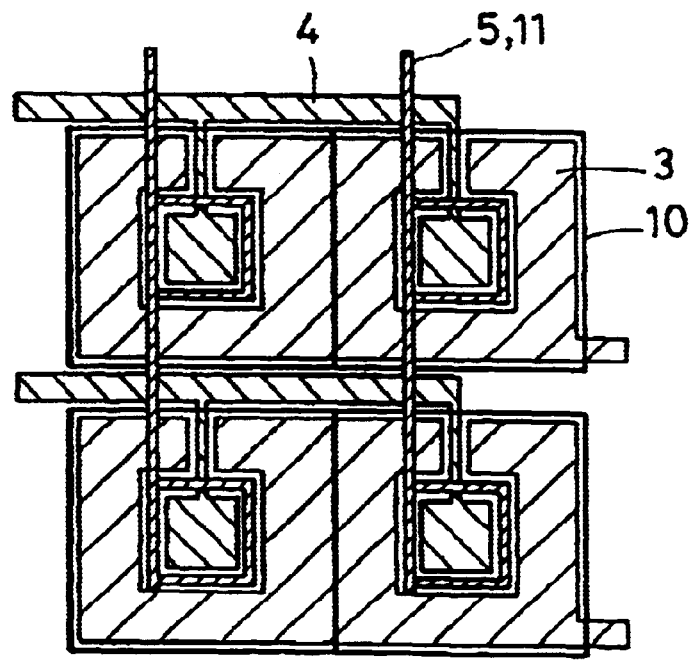
FIG. 41B is a plane view showing a representative example of the display device according to the present invention.

The plane configuration of the display electrode is not particularly limited, but representative stripe shape (FIG. 41A) as well as any shapes such as a rectangle (FIG. 41B) and a closed loop such as a circle may be used. The control electrode 5 is formed at the boundary area between the first display electrode 4 and the second display electrode 3, irrespective of the shape of the display electrodes.

The remarkable feature of the construction according to the present invention is that the structural barrier wall 11 as a physical barrier and the control electrode 5 that generates an electrical barrier are used together as members for suppressing transfer of the charged particles. Transfer of the charged particles can be effectively suppressed by applying a relatively low control voltage by the synergistic effect between the physical barrier and electrical barrier. Since a sufficient amount of holding voltage component perpendicular to the surface of the display electrode is generated by forming the control electrode 5 on the structural barrier wall 11 and placing at a higher position relative to the display electrode face, partial distribution of the charged particles on the display electrode face during the application period of the holding voltage, which has been a problem in the second construction in Japanese Patent Publication 8-507154, or adhesion of the charged particles on the upper substrate side (FIGS. 46A and 46B) can be effectively suppressed. Since the charged particles can be retained without overflow even when the area of the display electrode is small, a large area difference may be given between the first display electrode and the second display electrode to enable display contrast to be largely improved.

Advantageous examples of the sizes of the constitution in FIG. 40 comprise the particle size of the charged particles of 0.5 to 10 $\mu$m, the distance between the first and second substrates of 10 to 100 $\mu$m, the height of the barrier wall 11 of 5 to 50 $\mu$m, as well as the area ratios of the first display electrode of 10 to 30%, second display electrode of 85 to 65% and control electrode of 5 to 10% against the total pixel area ratio, relative to the pixel size of 100 $\mu$m×100 $\mu$m.

Any combination of the color of the constitution materials of the cell is possible, for example switching between white state display and black state display is possible using the black charged particles 6, black first display electrode 4, white second display electrode 3, and white control electrode 5. Color display is also possible by aligning RBC colored second display electrode 3 and control electrode 5.

Figure 43:
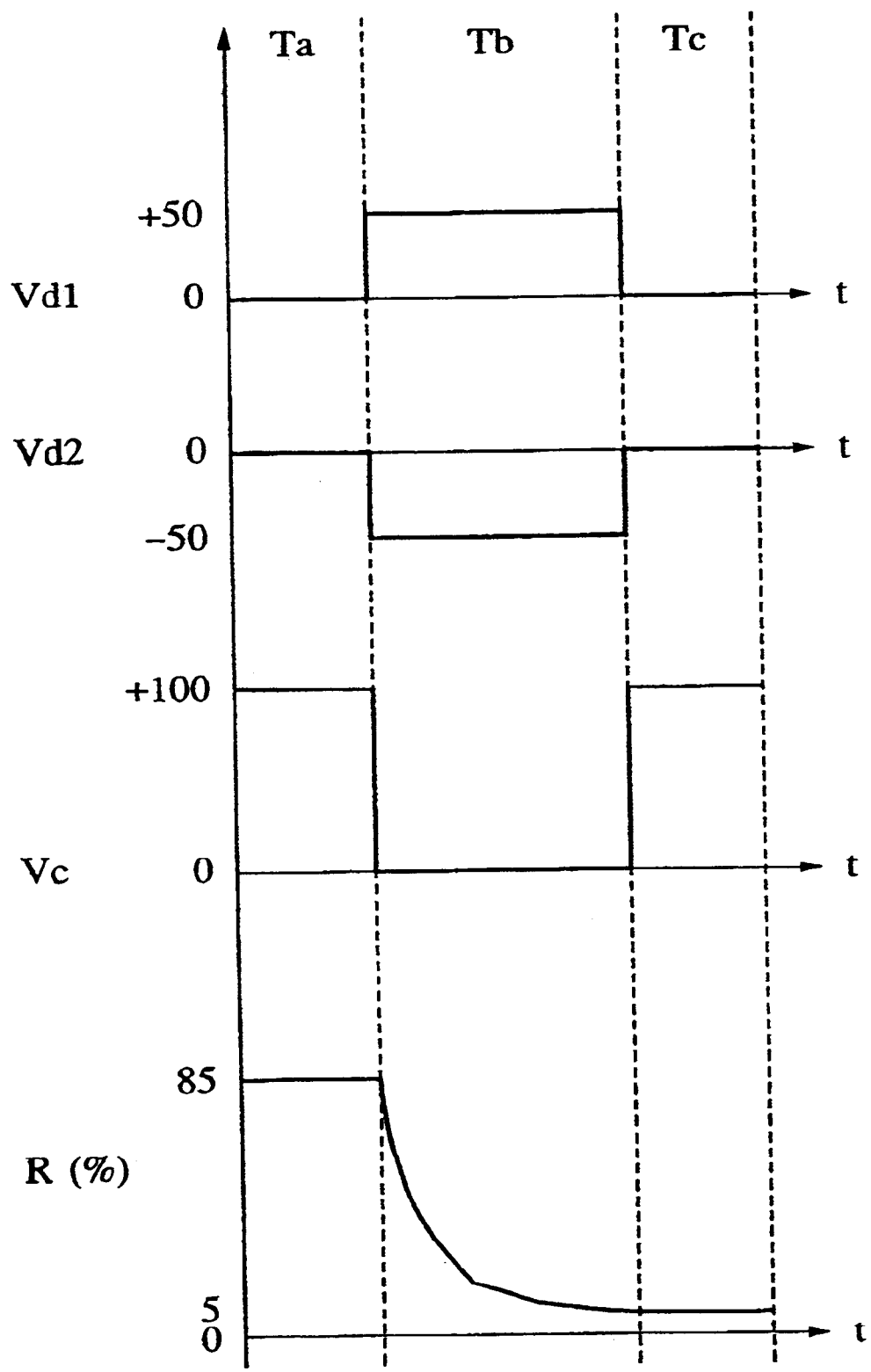
FIG. 43 shows another part of the addressing method and operation state of the display device shown in FIG. 42.

Writing operation as a feature of the present invention will be then described with reference to FIGS. 42 and 43. FIG. 42 shows the operation state of the charged particles in each process, and FIG. 43 shows the applied pulse and reflectivity in each process. The cell construction (one pixel) is the same as shown in FIG. 40.

The charged particles 6 are positively charged in the following descriptions, and an addressing voltage Vd1 is applied on the first display electrode 4, a voltage Vd2 is applied on the second display electrode 3, and a voltage Vc is applied on the control electrode 5 in the following description.

The period Ta corresponds to a white state holding state. The arrows in the cell denote approximate electric field vectors in the cell. All the charged particles 6 are accommodated in a space surrounded by the first display electrode 4, barrier wall 11 and dividing wall 10, and are compressed toward the display electrode side by the holding voltage applied between the first display electrode 4 and control electrode 5 to securely maintain a white display state with a reflectivity of about 80%.

The holding voltage for prohibiting transfer and for holding of the charged particles can be largely reduced as compared with the construction in Japanese Patent Publication No. 8-507154, since direct in-plane transfer of the charged particles toward the second display electrode 3 side is prohibited by a synergetic effect between the physical barrier by the structural barrier wall 11 and electrical barrier by the control electrode 5. The holding voltage Vc was set to +100V in FIG. 42.

Writing is carried out at the period Tb. Writing is effected by applying a writing voltage satisfying the conditions of Vd1<Vc<Vd2 to the control electrode 5 and first display electrode 4 disposed on the structural barrier 11. For example, the charged particles 6 on the first display electrode 4 are at first transferred toward the control electrode 5 side in accordance with the distribution of the electric field vectors when the voltages of Vd1 (+50V), Vd2 (−50V) and VC (0V), then are transferred toward the second display electrode side by jumping over the structural barrier 11.

The period Tc corresponds to black holding state. The charged particles 6 transferred toward the second display electrode side are compressed to the display electrode side by the control voltage Vc of +100V, securely maintaining a black display state with a reflectivity of about 10%.

Figure 51:
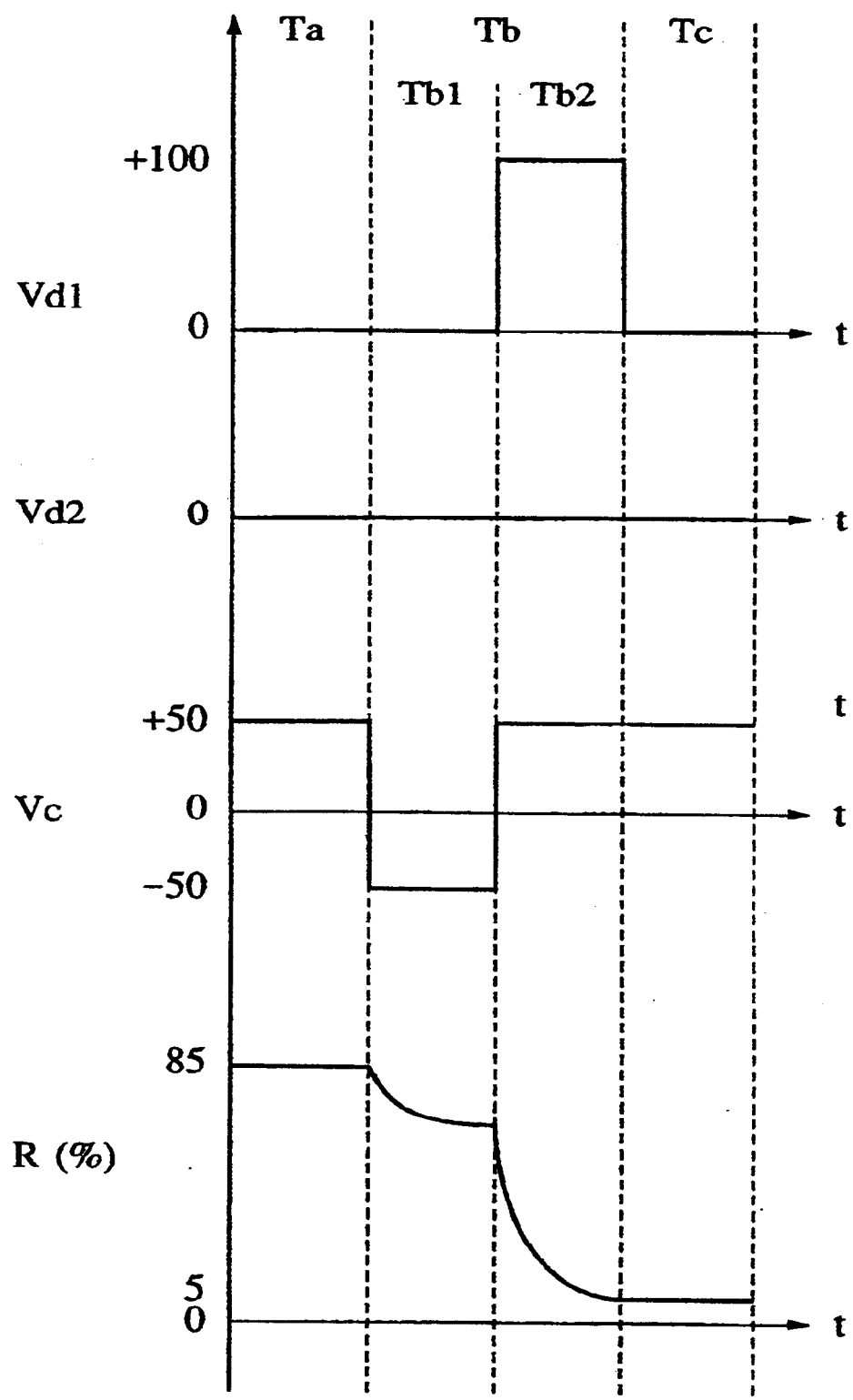
FIG. 51 shows another part of the addressing method and operation state of the display device shown in FIG. 50.

FIGS. 50 and 51 show another writing method according to the present invention. Writing is carried out at the periods of Tb1 and Tb2. At first, the voltages of Vd1 (0V). Vd1 (0V) and Vc (−50V) are applied at the period of Tb1 to transfer the charged particles 6 toward the control electrode side. Then, the voltages of Vd1 (+100V), Vd1 (0V) and Vc (+50V) are applied at the period of Tb2 to allow the direction of transfer of the charged particles 6 to reverse from the control electrode direction to the second display electrode side. Since a bias of +50V is applied to the first display electrode 4 relative to the control electrode 5, all the charged particles 6 are transferred toward the second display electrode side by lumping over the structural barrier wall 11 without returning back to the first display electrode side, rapidly reducing the reflectivity R.

Since all the electric field vectors are aligned toward the control electrode 5 at the period of Tb1 in this writing method, the charged particles 6 can be transferred without colliding with the structural barrier wall 11, even when the structural barrier wall 11 is extremely high. Accordingly, reliability of writing is improved besides enhancing structural freedom such as the height of the structural barrier wall.

The period Tc corresponds to the black state display holding state. The charged particles 6 transferred toward the second display electrode side is compressed to the display electrode side by the control voltage Vc of +50V, securely retaining the black display state with a reflectivity of about 10%.

(Passive Matrix Addressing Method)

The passive matrix addressing method in the embodiment according to the present invention will be described hereinafter. Consider an in-plane (transfer) type electrophoretic display device having a m×n matrix with column and row numbers of m and n. Signal lines (m lines and n lines) are aligned to be perpendicular to one another toward the row and column directions, respectively, along the pixel arrangement.

A plurality of variations are possible in the writing method. The methods for connecting to each electrode include two methods of connecting the control electrode to the scanning electrode line, and connecting the display electrode to the signal electrode line in each pixel; and connecting the control electrode to the signal electrode line, and connecting the display electrode to the scanning electrode line in each pixel. The writing methods comprise bidirectional writing to the white state and black state for each scanning line, and unidirectional writing to the rewriting pixels for each scanning line, after resetting the entire initial screen to one of the two states.

FIGS. 44A and 44B, and FIGS. 45C to 45F describe the addressing method, wherein the first signal electrode line is connected to the first display electrode in each pixel, the second signal electrode line is connected to the second display electrode in each pixel, and the scanning electrode line is connected to the control electrode in each pixel, and writing is bidirectional. Bidirectional writing, which is one of the features of the present invention on which the barrier wall has a symmetrical structure, is difficult in the disclosed first construction in the Japanese Patent Publication No. 8-507154.

Figure 44A:
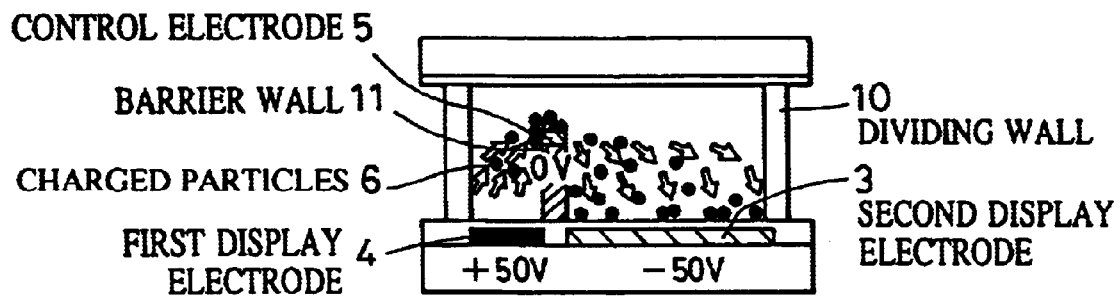
FIG. 44A shows a representative example of the passive matrix addressing method of the display device according to the present invention.
Figure 44B:
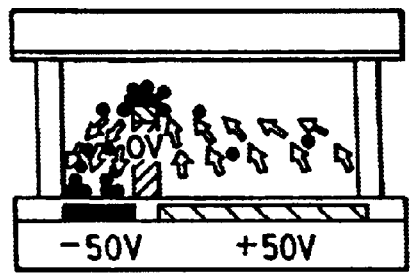
FIG. 44B shows a representative example of the passive matrix addressing method of the display device according to the present invention.

Writing is carried out by sequentially selecting the scanning lines toward the Y-direction from above. A voltage of Vc (0V) as a write enable voltage is applied on the scanning line at the selected period, and signals corresponding to the image data to be displayed are applied to each signal line. In other words, a voltage of Vd1 (+50V) is applied on the first signal line, and a voltage Vd2 (−50V) is applied on the second signal line corresponding to the pixel in which a black state is written (FIG. 44A). Likewise, a voltage of Vd1 (−50V) is applied on the first signal line, and a voltage Vd2 (+50V) is applied on the second signal line corresponding to the pixel in which a white state is written (FIG. 44B). Detailed descriptions of the writing operation are omitted since they are identical to those in FIGS. 42 and 43. Bidirectional writing of black and white states are simultaneously carried out as described above at the period of Tb.

On the other hand, a voltage of Vc (+100V) as a write inhibit voltage (a holding voltage) is applied on the scanning line at the un-selected period. A holding voltage component perpendicular to the display electrode is generated by forming the control electrode 5 on the structural barrier wall 11 and disposing it at a higher position relative to the display electrode face, enabling the charged particles to be sufficiently compressed onto the display electrode face. Partial distribution of the charged particles on the display electrode face, or adhesion of the charged particles on the upper substrate side, which has been a problem in the second construction in Japanese Patent Publication 8-507154, can be effectively suppressed, even in the state in which the black state writing signal is applied (FIGS. 45C and 45E) on each signal line, or in the state in which the white state writing signal is applied (FIGS. 45D and 45F) on each signal line.

Another example of the addressing method in which writing is unidirectional will be described with reference to FIGS. 46A to 56C, FIGS. 47D to 47G, FIGS. 48A to 48C and FIGS. 49D to 49G. In FIGS. 46A to 56C and FIGS. 47D to 47G, the electrodes are connected by the method in FIGS. 44A and 44B, and in FIGS. 45C to 45F, wherein the scanning electrode line and the signal electrode line are connected to the control electrode and display electrode, respectively. Connections of the wiring lines in FIGS. 48A to 48C, and FIGS. 49D to 49G are different from those in FIGS. 44A and 44B, and FIGS. 45C to 45F, but the scanning line and the display line are connected to the display electrode and control electrode, respectively. Two lines of the signal electrode lines are not needed for each pixel in unidirectional writing, and the second display electrode is grounded as a common electrode.

Figure 46A:
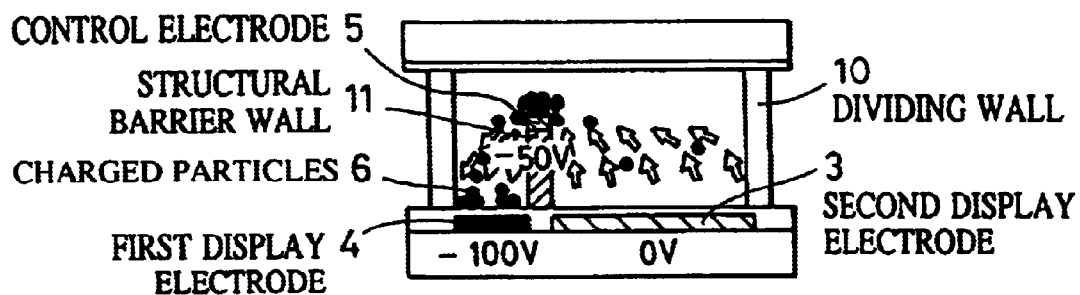
FIG. 46A shows another representative example of the passive matrix addressing method of the display device according to the present invention.
Figure 46B:
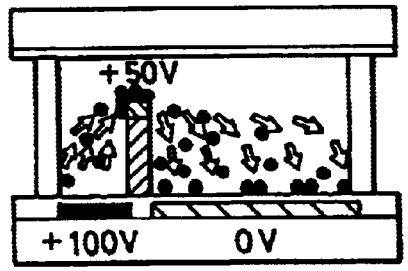
FIG. 46B shows another representative example of the passive matrix addressing method of the display device according to the present invention.

The addressing method in FIGS. 46A to 46C, and FIGS. 47D to 47E will be described hereinafter. At first, a voltage of Vc (−50V) is applied on all the scanning electrode lines, and a voltage of Vd (−100V) is applied on all the signal electrode lines to reset the entire screen to a white state (FIG. 46A).

Figure 46C:
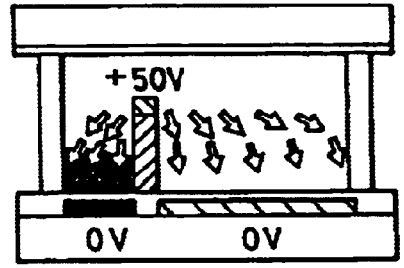
FIG. 46C shows another representative example of the passive matrix addressing method of the display device according to the present invention.
Figure 47D:
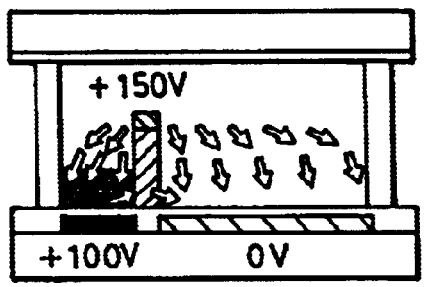
FIG. 47D shows another part of the passive matrix addressing method of the display device shown in FIGS. 46A to 46C.
Figure 47E:
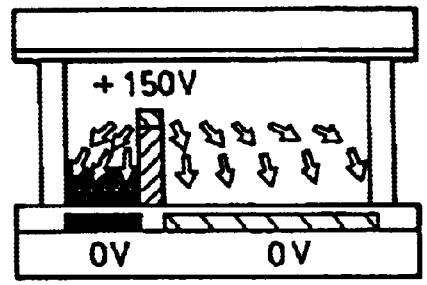
FIG. 47E shows another part of the passive matrix addressing method of the display device shown in FIGS. 46A to 46C.
Figure 47F:
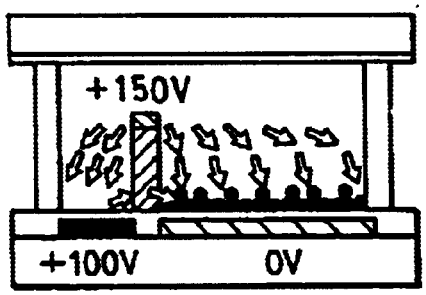
FIG. 47F shows another part of the passive matrix addressing method of the display device shown in FIGS. 46A to 46C.
Figure 47G:
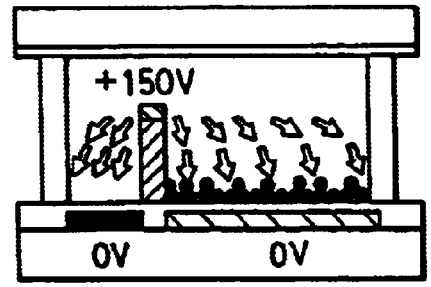
FIG. 47G shows another part of the passive matrix addressing method of the display device shown in FIGS. 46A to 46C.

Writing is carried out by sequentially selecting the scanning line toward the Y-direction from above. A voltage of Vc (+50V) as a write enable voltage is applied on the scanning line at the selected period, and the signal corresponding to the image data to be displayed is applied on each signal line. In other words, writing in the black state is carried out by applying a voltage of Vd1 (+100V) on the signal line corresponding to the pixel for writing a black state (FIG. 46B), and the white state is maintained by applying a voltage vd1 (0V) on the signal line corresponding to the pixel for writing the white state (FIG. 46C).

Unidirectional writing in the black state is carried out only to the desired pixel at the selected period as described above.

In the un-selected state, on the other hand, a voltage of Vc (+150V) is applied as a write inhibit voltage on the scanning line, thereby the display state is favorably maintained in the state in which the black state writing signal is applied on each signal line (FIGS. 47D and 47F), and in the state in which the black state writing signal is not applied on each signal line (FIGS. 47E and 47G), as in FIGS. 44A and 44B, and FIGS. 45C to 45F.

Figure 48A:
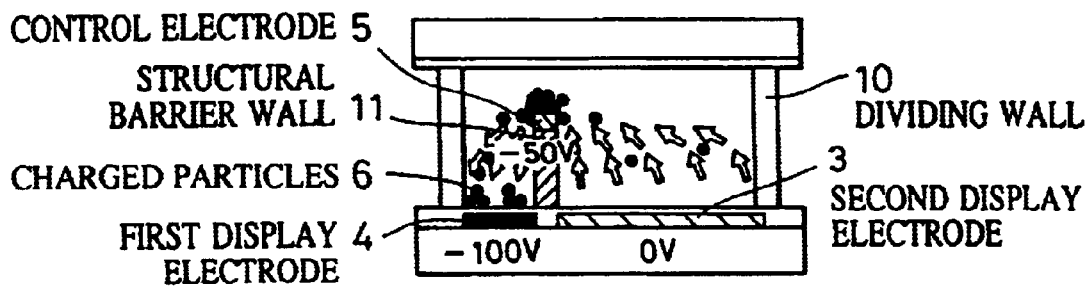
FIG. 48A shows another representative example of the passive matrix addressing method of the display device according to the present invention.
Figure 48B:
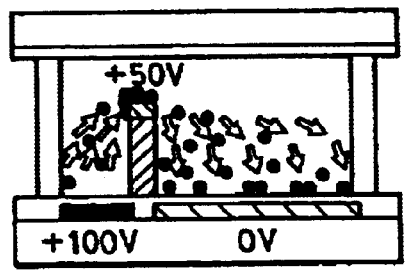
FIG. 48B shows another representative example of the passive matrix addressing method of the display device according to the present invention.
Figure 48C:
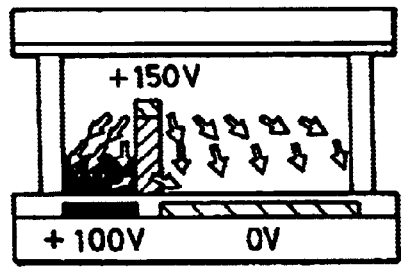
FIG. 48C shows another representative example of the passive matrix addressing method of the display device according to the present invention.

The addressing methods in FIGS. 48A to 48C, and in FIGS. 49D to 49G will be described hereinafter. At first, a voltage of Vd1 (−100V) is applied on all the scanning electrode lines, and a voltage Vc (−50V) is applied on all the signal electrode lines to rest the entire screen to the white state (FIG. 48A).

Writing is carried out by sequentially selecting the signal lines along the Y-direction from above. A voltage of Vd1 (+100V) as a black state writing voltage is applied on the scanning line at the selected period to apply a signal corresponding to the image data to be displayed on each signal line. In other words, writing in the black state is carried out by applying a voltage VC (+50V) as a write enable signal on the signal line corresponding to the pixel in which the black state is to be written (FIG. 48B, and the white state is maintained by applying a voltage Vc (+150V) as a write inhibit signal on the signal line corresponding to the pixel in which the white state is to be maintained (FIG. 48C). Unidirectional writing in the black state is carried out only in the desired pixel at the selected period as described above.

In the un-selected state, on the other hand, the writing signal is not applied on the scanning line (Vd1=0V), and the display state is favorably maintained in the state in which the writing enable signal is applied on each signal line (FIGS. 49D and 49F), or in the state in which the writing inhibit signal is applied on each signal line (FIGS. 49E and 49G), as in FIGS. 44A and 44B, and FIGS. 45C to 45F.

A writing method in which the writing period is divided into two portions (FIG. 50 and FIG. 51) will be described with reference to FIGS. 52A to 52C, FIGS. 53D to 53E and FIGS. 54F and 54G. The scanning line is connected to the control electrode, the first signal line is connected to the first display electrode, and the second signal line is connected to the second display electrode, and writing is bidirectionally carried out for each line. Initial overall reset is not necessary in this case.

A voltage of Vc (−50V at the period Tb1/0V at the period of Tb2) is applied to the first scanning line at the selected period. Simultaneously, a voltage of Vd1 (0V/+50V) is applied on the first signal line corresponding to the pixel in which the black state writing is to be carried out (FIG. 52A), and a voltage of Vd2 (0V/−50V) is applied on the second signal line. A voltage of Vd1 (0V/−50V) is applied on the first signal line corresponding to the pixel in which the white state writing is to be carried out (FIG. 52B), and a voltage of vd2 (0V/+50V) is applied on the second signal line. The description on the writing operation is omitted since it has been already described in FIGS. 50 and 51.

Figure 54F:
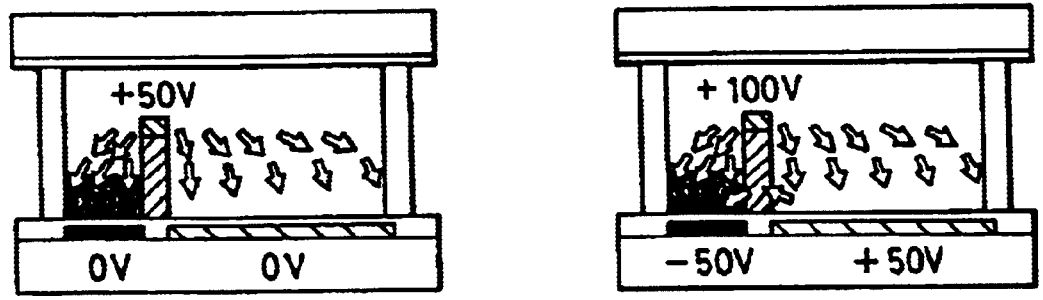
FIG. 54F shows another part of the passive matrix addressing method of the display device shown in FIGS. 52A and 52B.
Figure 54G:
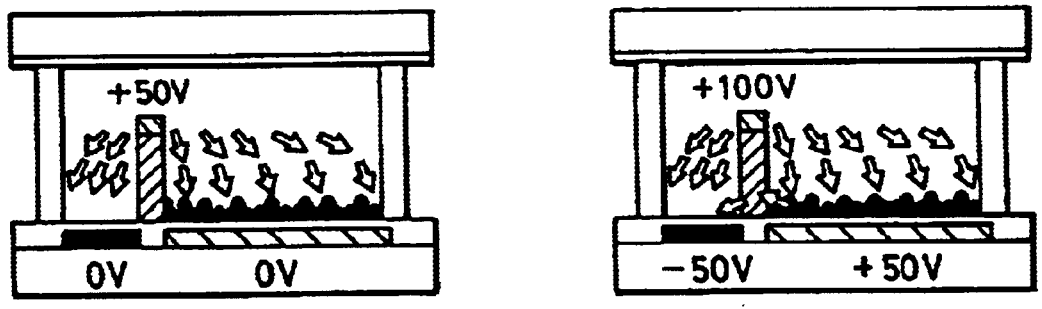
FIG. 54G shows another part of the passive matrix addressing method of the display device shown in FIGS. 52A and 52B.

On the other hand, a voltage Vc (+50V/+100V) is applied on the scanning line at the un-selected period. A voltage of Vd1 (0V/+50V) is applied on the first signal line, and a voltage Vd2 (0V/−50V) is applied on the second signal line as a black state writing signal (FIGS. 53D and 53E) as at the selected period. A voltage of Vd1 (0V/−50V) is applied on the first signal line, and a voltage Vd2 (0V/+50V) is applied on the second signal line as a white state writing signal (FIGS. 54F and 54G). A holding voltage component perpendicular to the display electrode face is generated in both cases, and the display state is securely maintained since the charged particles 6 are sufficiently compressed onto the display electrode face.

(Variation of Construction)

The construction of the present invention is not restricted to the type in FIG. 40. For example, the cross section of the structural barrier wall is not restricted to the rectangular shape, but an arbitrary shape such as a triangle or a trapezoid may be naturally applicable. The position of the control electrode 5 is not always disposed at the uppermost part of the structural barrier wall, but it may be buried in an intermediate part of the barrier wall so long as it is above the display electrode face, or it may be formed on the side wall of the barrier wall. The effective construction in the present invention is further described with reference to the drawings.

Figure 55A:
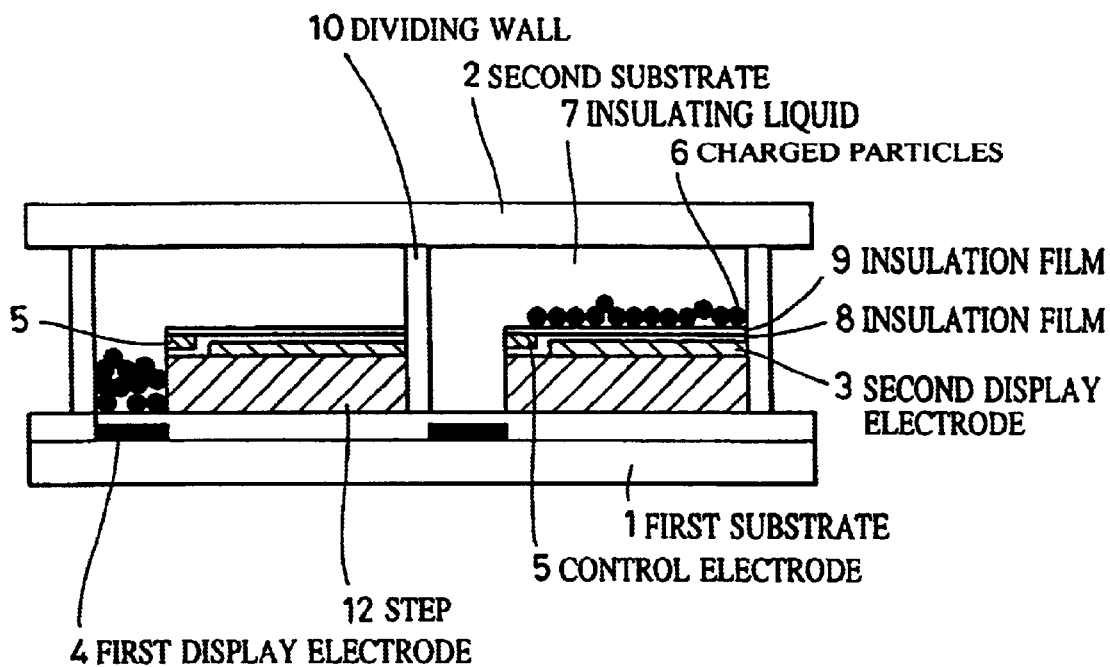
FIG. 55A shows another representative example of the display device according to the present invention.

FIG. 55A shows a type in which the barrier wall is a step. The control electrode 5 is placed at the edge of the step. While the addressing method is the same as that described in FIG. 40, the writing method is restricted to the unidirectional writing. The height of the step 12 is several to several tens times as large as the particle size of the charged particles, and the charged particles are sufficiently compressed onto the display electrode face by generating a holding voltage perpendicular to the display electrode face by applying a holding voltage on the control electrode. The step in this embodiment has a different height and function from the step disclosed in Japanese Patent Application No. 8-507154.

Figure 55B:
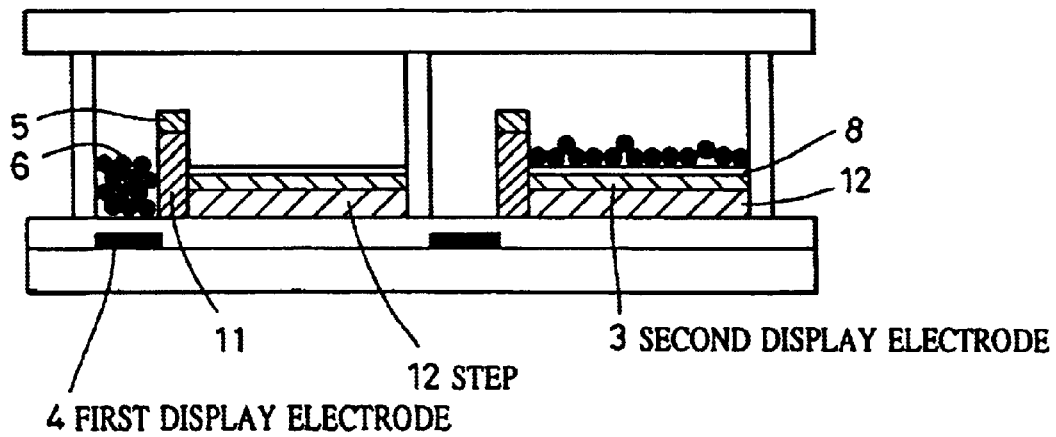
FIG. 55B shows another representative example of the display device according to the present invention.

A construction in which the second display electrode 3 face having a larger area is placed at a position higher than the first display electrode face 3 is shown in FIG. 55B as a modification of that in FIG. 1. In the perspective view of the construction in FIG. 40, an area where the barrier wall 11 interferes with the field of vision appears on the display electrode face. This becomes evident on the surface of the second display electrode 3 having a large distance between the tip of the barrier wall 11 and the upper fill-up surface of the charged particles 6, and view angle characteristics of the screen are slightly affected even when the barrier wall 11 comprises a transparent member. However, it is made possible to align the distance between the fill-up surface and the tip of the barrier wall on the second display electrode 3 to be approximately equal to that on the first display electrode, by placing the surface of the second display electrode 3 to be higher than the surface of the surface of the first display electrode 4. This construction further affords an advantage that the suppressing effect of in-plane transfer for the charged particles 6 on the uppermost face of the first display electrode 4 may be adjusted to be approximately equal to that on the uppermost face of the second display electrode 3.

Figure 56A:
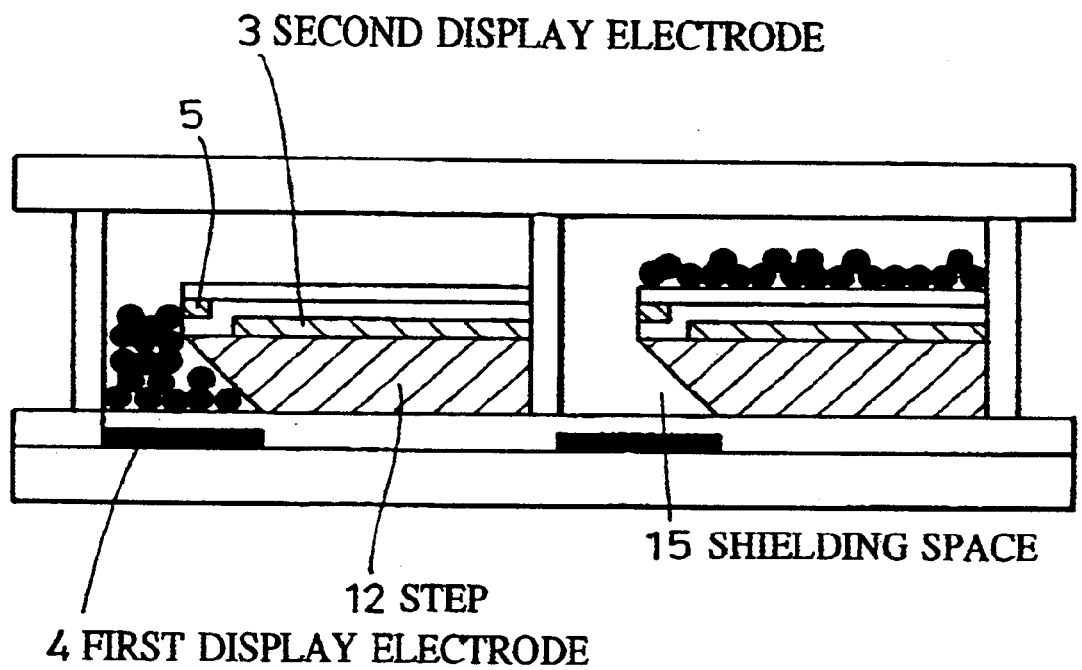
FIG. 56A shows another representative example of the display device according to the present invention.
Figure 56B:
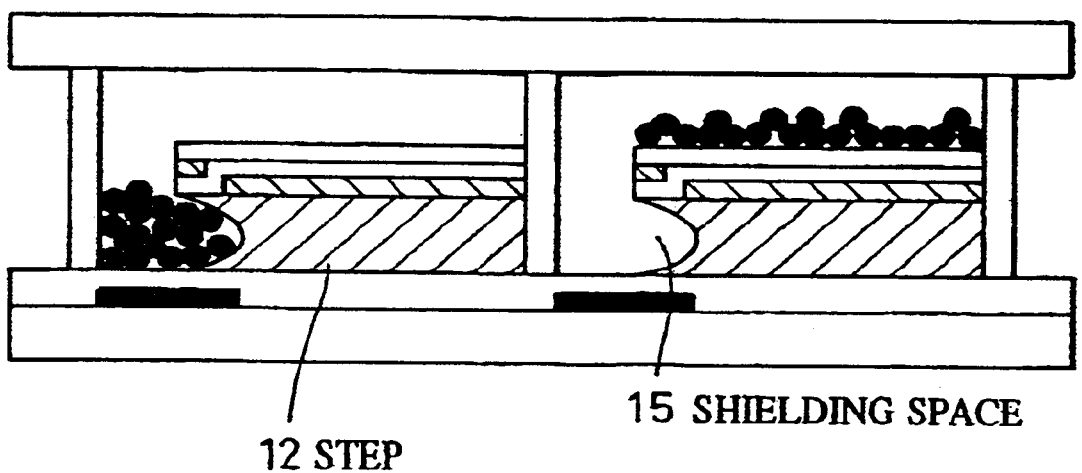
FIG. 56B shows another representative example of the display device according to the present invention.

FIGS. 56A and 56B shows variations of the step type display device shown in FIG. 55A. The fill-up volume of the charged particles on the first display substrate is increased while apparently increasing the effective area ratio between the first display electrode 4 and second display electrode 3 to improve the display contrast, by forming a shielding space 15 invisible from an observer of the display surface on the wall face of the step on the lower side of the second display electrode 3 face located at the upper side of the step. For example, the shielding space 15 can be formed by forming the cross section of the step to be a inverse-taper shape (FIG. 56A) or over-hang shape (FIG. 56B).

Figure 57:
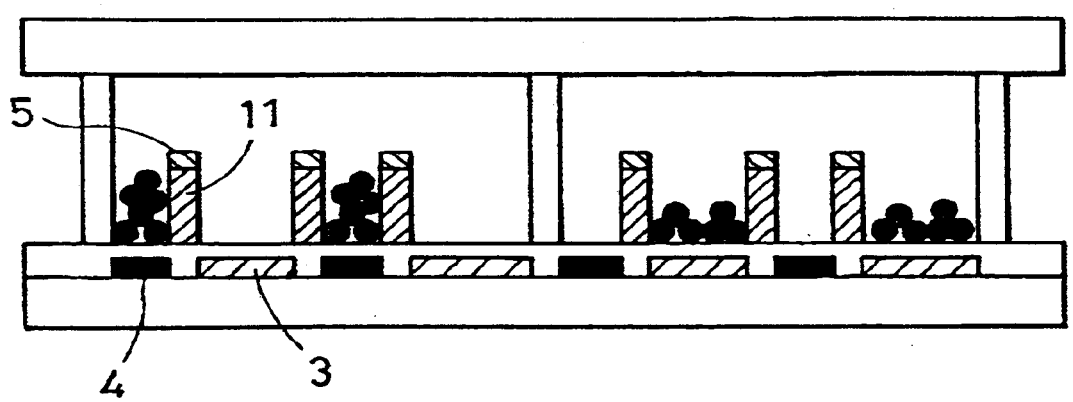
FIG. 57 shows another representative example of the display device according to the present invention.

While a construction in which a pair of the first display electrode and second display electrode is disposed in one pixel has been described for the convenience of explanations, the number of the electrodes in one pixel is not particularly restricted in this invention, but it is needless to say that a construction in which plural pairs of the display electrode are disposed is possible. The construction in which two pairs of the electrodes are disposed in one pixel in the type shown in FIG. 40 is shown in FIG. 57. The structural barrier wall 11 and the control electrode 5 are formed at all the boundaries between the first display electrode and the second display electrode.

(Material and Manufacturing Method of the Constituting Members)

The method for manufacturing the display device in this embodiment is described hereinafter with reference to FIG. 40.

At first, the first display electrode 4 and the second electrode 3 are formed patterned on the first substrate 1. Polymer films such as polyethylene terephthalate (PET) and polyethersulfone (PES) films, or inorganic materials such as a glass or quartz are used as the materials of the substrate. Any conductive materials capable of patterning may be used as the materials for the display electrode, and a transparent electrode such as indium tin oxide (ITO) is used for the material for the first control electrode.

Then, an insulation layer is formed on the display electrode. A material that hardly forms pin holes on the thin film and has a low dielectric constant is preferable as the material for the insulation layer. For example, an amorphous fluorinated resin, highly transparent polyimide. PET, acrylic resin and epoxy resin may be used. Favorable thickness of the insulation film is about 100 nm to 1 μm.

Subsequently, the structural barrier wall is formed. After sequentially forming a thick film for the step, a film for the control electrode and the resist film over the entire surface, the resist film on the uppermost face is patterned, followed by sequentially applying a dry etching or wet etching to the film for the control electrode and the thick film for the step. In the case of the step 12 shown in FIGS. 55A and 55B, and in FIGS. 56A and 56B, the films for the second control electrode and the control electrode are deposited and patterned after depositing a thick film for the step, then the resist film is separately formed and patterned, followed by dry etching or wet etching of the thick film for the step. The step having an inverse-taper shape (FIG. 56A) or overhang shape (FIG. 56B) may be formed by adjusting the etching method and condition. A polymer resin is used for the material of the barrier wall or step. Any conductive materials capable of patterning may be used for the control electrode film or for the second display electrode material. A metal film may be deposited, or an ITO film may be formed by a low temperature magnetron sputtering. Otherwise, an organic conductive material such as polyaniline may be formed into a film by printing. An insulation layer is formed on the control electrode 5, if necessary.

The control electrode 5 may be transparent, or may be colored in harmony with the color of either the first display electrode or the second display electrode. The surfaces of the display electrodes 3 and 4, and the surface of the control electrode 5 may be colored by taking advantage of the color of the insulation material itself formed on the electrode material, or a material layer having a desired color may be formed on the electrodes, insulation layer and substrate. A coloring material may be mixed with the insulation layer.

Then, the insulation layer 9 and dividing wall 10 are formed on the second substrate. The material for the insulation layer and the film thickness are as described previously. While disposition of the dividing wall 10 is not restricted, it may be disposed so as to surround the circumference of each pixel, so that the charged particles do not migrate among the pixels. A polymer resin is used for the dividing wall. The dividing wall may be formed by any method, including light exposure and wet development after coating with a photosensitive resin layer, adhering a separately prepared barrier wall, printing, or molding on the surface of the light permeable first substrate.

Subsequently, the space in each pixel surrounded by the dividing wall is filled with the transparent insulation liquid 7 and colored and charged particles 6. A colorless transparent liquid such as silicone oil, toluene, xylene and high purity petroleum may be used for the insulation liquid 7. A material exhibiting a good charging property in the insulation liquid is used for the black charged particles 6 including, for example, a mixture of a resin such as polyethylene or polystyrene with carbon. While the particle size of the charged particles 6 is not restricted, particles with a mean particle size of 0.5 to 20 μm, preferably 1 to 5 μm are usually used.

Finally, the first and second substrates are bonded after forming an adhesive layer on the bonding faces of the first and second substrates, followed by adhesion by heating. A display device is completed by connecting the assembly to a voltage applying device.

As hitherto described in detail, the following effects were obtained by the third embodiment according to the present invention.

Firstly, passive matrix addressing with good contrast was realized in the in-plane (transfer) type electrophoretic display device without any cross-talk phenomena. This is because occurrence of cross-talk due to poor holding of the charged particles in the un-selected pixels, which has been a problem in the conventional art, was almost completely depressed by the novel construction and addressing method.

Secondly, the control voltage required for holding the charged particles was largely reduced by a synergetic effect between the physical barrier by the structural barrier wall and electrical barrier by the control electrode formed above the structural barrier wall.

Thirdly, all the constituting elements related to addressing including the control electrodes can be disposed on a single substrate. This configuration can eliminate accurate positioning in the bonding step of the upper and lower substrates, in particular affording a large advantage that a display with high resolution can be realized using plastic substrates that are in principle difficult to accurately position to one another.

Fourthly, the area ratio between the first and second display electrodes was made possible to be larger than the conventional ones, in the construction in which high elevation of barrier walls or steps were introduced. This configuration enabled more improvement of contrast to be realized, by a different reason from depression of cross-talk.

Fifthly, bidirectional writing was made possible, thereby the need of initial reset of the entire screen was eliminated to enable partial rewriting addressing to be carried out for partially rewriting the screen.

EXAMPLES

Examples are described below. The examples 1 and 2 are based on the first embodiment, the examples 3, 4 and 5 are based on the second embodiment, and the examples 6, 7 and 8 are based on the third embodiment. The comparative examples are prepared for comparison with the examples 1 to 8.

Example 1

A 3×3 matrix display cell was prepared in this example using the cell construction shown in FIG. 1, and it was addressed by unidirectional writing of the passive matrix.

A plane view of the 3×3 matrix display cell is shown in FIG. 14. The size of one pixel was 1×1 mm, and the area ratio among the first display electrode, second control electrode and second display electrode was 20:5:75.

The method for manufacturing the cell is briefly described with reference to FIGS. 1 and 14. An insulation colored layer comprising an acrylic resin in which a white pigment such as alumina was dispersed was at first formed over the entire surface of a first substrate 1 comprising a PET film with a thickness of 200 μm. Then, ITO was deposited at low temperature as a second display electrode 3, and was patterned into a shape shown in FIG. 14 by photolithography and dry etching. Then, a dark-black titanium carbide film was deposited as a first display electrode 4 followed by patterning by the same method.

Next, an insulation film comprising the acrylic resin was formed on the display electrode with a thickness of 1 μm. Subsequently, a dark-black titanium carbide film was also deposited as a second control electrode 13 followed by patterning. Then, an insulation layer 8 comprising an amorphous fluorinated resin was formed over the entire surface with a thickness of 200 μm.

Subsequently, after a low temperature deposition of ITO on the second substrate 2 comprising the PET film as a control electrode 5 on the second substrate 2, the deposition film was patterned into a shape shown in FIG. 14. An insulation layer comprising the amorphous fluorinated resin was then formed over the entire surface with a thickness of 200 nm, followed by forming dividing walls 10 thereon. The dividing walls 10 were formed with an elevation of 70 $\mu$m by light exposure and wet etching after coating a photosensitive epoxy resin A transparent insulation liquid 7 and black-colored charged particles 6 were filled into a space formed by the dividing walls.

Silicon oil was used for the transparent insulation liquid 7. A mixture of polystyrene and carbon with a mean particle size of about 5 $\mu$m was used for the black-colored charged particles 6. The charged particles 6 were positively charged in the silicone oil. Then, a pattern of a heat-fusion adhesive layer was formed on the adhesive face between the first substrate 1 and second substrate 2, and the first substrate 1 was placed on the dividing wall on the second substrate 2 with positioning to bond them by heating. A display device was manufactured by connecting the assembly above to a voltage applying device (not shown).

The addressing method in this example is described below.

The first display electrode was used for the first scanning line (S11 to S13), the second display electrode was used for the second scanning line (S21 to S23), the first control electrode was used for the first signal line (I11 to I13), and the second control electrode was used for the second signal line (I21 to I23).

Figure 15A:
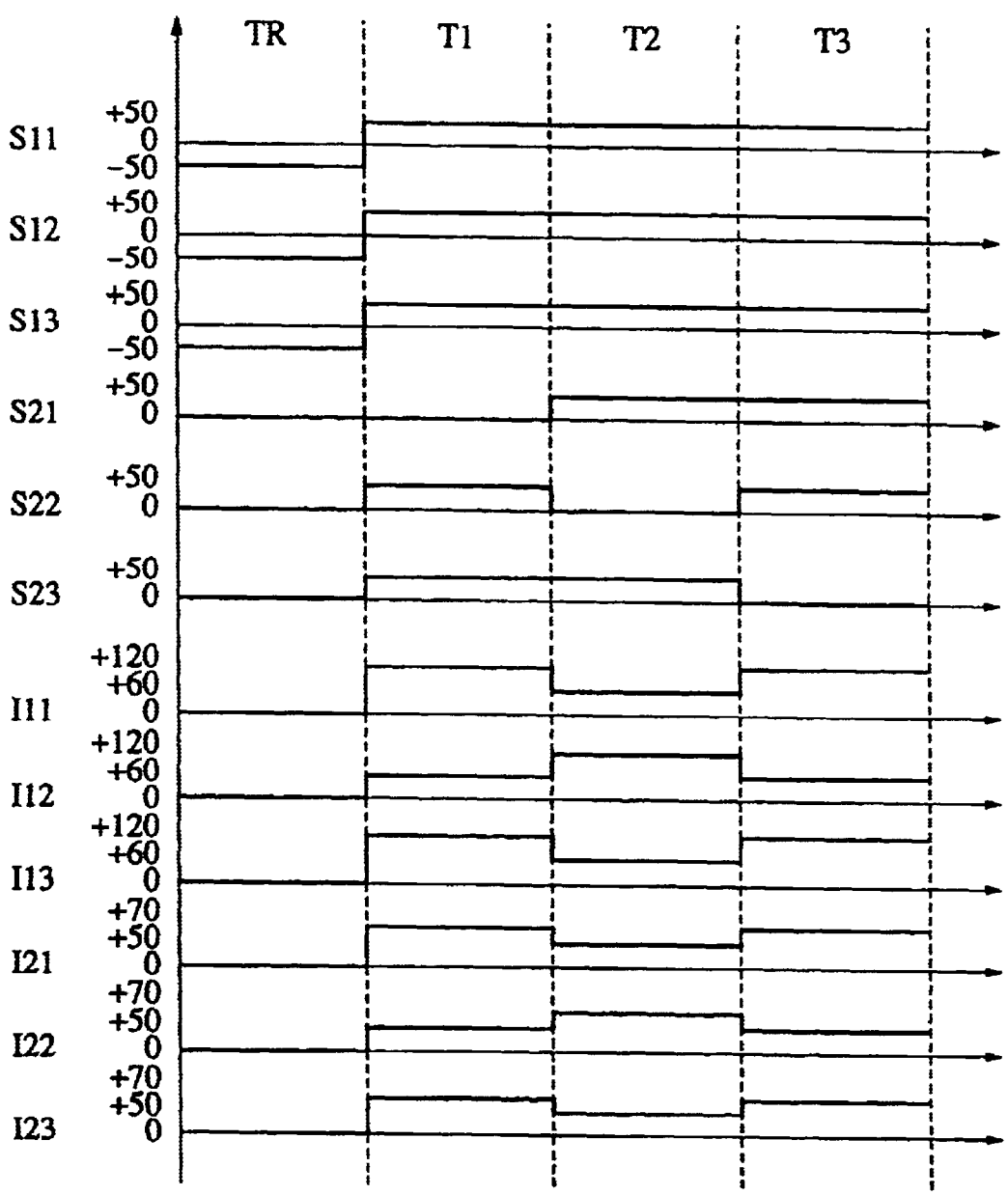
FIG. 15A shows an addressing time chart executed in Example 1 according to the present invention.
Figure 15B:
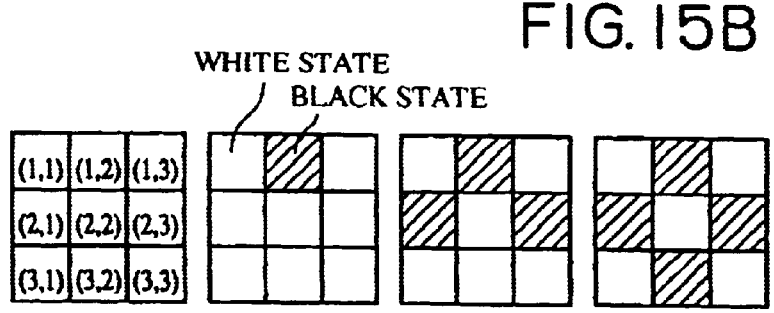
FIG. 15B shows a display pattern in Example 1 according to the present invention.

FIG. 15A shows a time chart for applying addressing pulses on each scanning line and signal line, and FIG. 15B shows the change of display state in each period. The selected period (TR, T1, T2 and T3) of one scanning line was set to 50 msec.

The entire screen was reset to white state display, and then unidirectional (white state→black state) writing was carried out to the selected pixels (1, 2), (2, 1), (2, 3) and (3, 2) corresponding to display patterns for each scanning line. Writing was carried out by the addressing method described in FIGS. 3A to 3C, and FIGS. 4D to 4G in this example. Description of detailed behavior of the charged particles during writing is omitted since it is the same as described in FIGS. 3A to 3C, and FIGS. 4D to 4G.

The addressing method will be sequentially described in accordance with the time chart. A voltage Vd1 (−50V) was applied on all the first scanning lines S11 to S13, a voltage Vd2 (0V) was applied on all the second scanning lines S21 to S23, a voltage Vc1 (0V) was applied on all the first signal lines I11 to I13, and a voltage Vc2 (0V) was applied on all the second signal lines I21 to I23 at the period TR to rest all the pixels to white state display.

Voltages Vd1 (+50V) and Vd2 (0V) were applied on the selected scanning lines S11 and S21, voltages Vd1 (+50V) and Vd2 (0V) were applied on the un-selected scanning lines S12, S22, S13 and S23, a voltage Vc1 (+60V) was applied on the first signal line I12 and a voltage Vc2 (+50V) was applied on the second signal line I22, each corresponding to the selected pixel (1, 2), A Voltage Vc1 (+120V) was applied on the first signal lines I11 and I13 corresponding to the un-selected pixels (1, 1) and (1, 3), and a voltage Vc2 (+70V) was applied on the second signal line, at a period T1. As a result, only the selected pixel (1, 2) on the selected scanning line was rewritten to black state display, and white state display was maintained on the un-selected pixels (1, 1) and (1, 3), and on each pixel on the un-selected scanning line.

The same addressing was carried out thereafter according to the selected pixel patterns at the periods of T2 and T3, thereby obtaining objective display patterns with good contrast. Cross-talk phenomenon, poor transfer of the charged particles and deterioration of contrast by poor holding were not observed at all, an averaged contrast between the black state display and white state display were as high as 10:1. The maximum control voltage required for addressing was +120V.

Example 2

A 3×3 matrix display cell was prepared with the cell construction shown in FIG. 5 in this example, and the cell was addressed by a passive matrix method with unidirectional writing. Bidirectional transfer of the charged particles can be prohibited using the construction in FIG. 5, and hence bidirectional writing of black state display→white state display and white state display→black state display was enabled. Bidirectional writing addressing is difficult in the first construction disclosed in Japanese Patent Publication No. 8-507154, and the present invention is featured by a symmetrical structure of the barrier wall.

The plane view of the 3×3 matrix display cell prepared is shown in FIG. 16. The size of one pixel was 1×1 mm, and the area ratio among the first display electrode, second control electrode and second display electrode was 18:5:77.

The method for manufacturing the cell is briefly described with reference to FIGS. 5 and 16. An insulation colored layer comprising an acrylic resin in which a white pigment such as alumina was dispersed was at first formed over the entire surface of a first substrate 1 comprising a PET film with a thickness of 200 $\mu$m. Then, ITO was deposited at low temperature as a second display electrode 3, and was patterned into a shape shown in FIG. 16 by photolithography and dry etching. Then, a dark-black titanium carbide film was deposited as a first display electrode 4 followed by patterning by the same method.

Next, an epoxy resin was coated with a thickness of 30 $\mu$m, a dark-black titanium carbide film was deposited as a second control electrode, a resist film was coated followed by patterning as shown in FIG. 16, and finally a reactive dry etching using $CF_4$ and $O_2$ was applied, thereby forming an assembly in which the second control electrode 13 comprising titanium carbide is placed on the barrier wall 11 with an elevation of 30 $\mu$m. Then, an insulation layer 8 comprising an amorphous fluorinated resin was formed on the entire surface with a thickness of 200 nm.

The explanation of the succeeding process is omitted since it is the same as in Example 1.

The addressing method according to the present invention is described below.

The first control electrode was used for the first scanning line (S11 to S13), the second control electrode was used for the second scanning line (S21 to S23), the first display electrode was used for the first signal line (I11 to I13), and the second display electrode was used for the second signal line (I21 to I23)(FIG. 16).

Figure 17A:
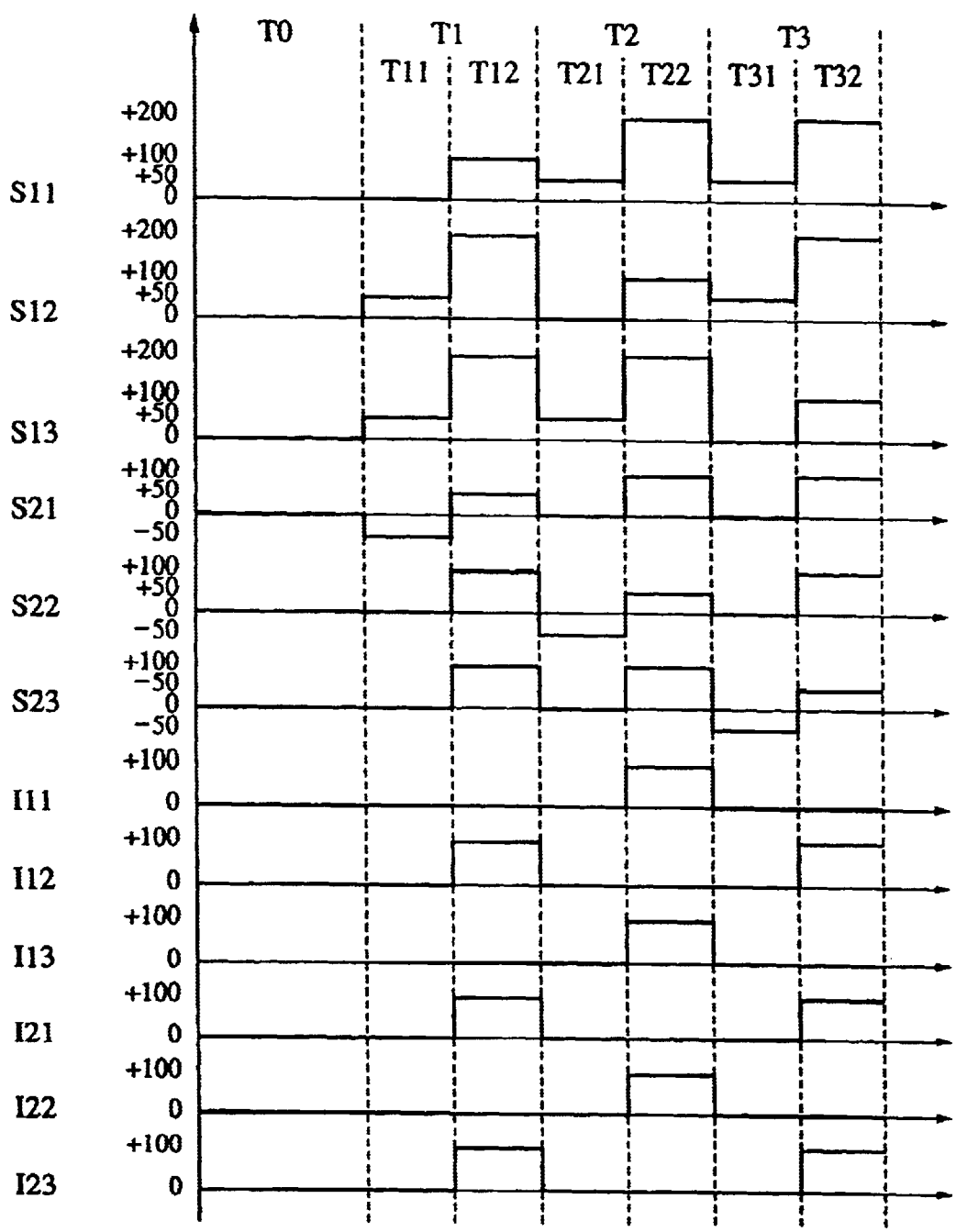
FIG. 17A shows an addressing time chart executed in Example 2 according to the present invention.
Figure 17B:
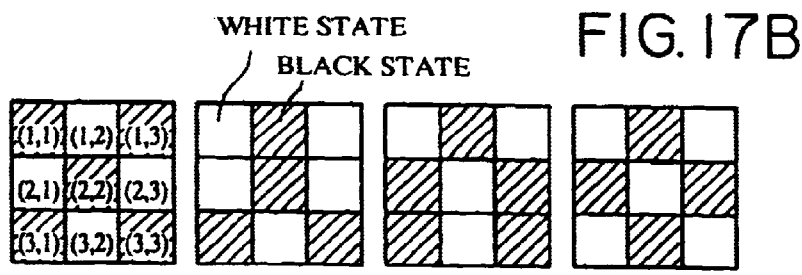
FIG. 17B shows a display pattern in Example 2 according to the present invention.

FIG. 17A shows the time chart of the addressing pulse for applying on each scanning line and signal line, and FIG. 17B shows the change of display state in each period. Writing was carried out by the addressing method described in FIGS. 6 and 7, FIGS. 8A and B, FIGS. 9C to 9D and FIGS. 10E to 10E. The selected period per one scanning line comprises the first half period of 30 msec and the latter half period of 30 msec. Detailed behavior of the charged particles during writing, is omitted since it is the same as described in FIGS. 6 and 7, FIGS. 8A and B, FIGS. 9C to 9D and FIGS. 10E to 10E.

Since bideirectional writing is enabled in this example, reset of the entire screen as an initial operation is not needed. Therefore, a pattern for displaying at the period TO was given as an initial display pattern, and all the pixels were inversely displayed for every scanning line (S1 to S3).

The addressing method is sequentially described according to the time chart. The first scanning line is selected at a period of TI, and a voltage Vc1 (0V at the first half period T11/+100V at the last half period T12) was applied on S11, a voltage of Vc2 (−50V/+50V), was applied on S21, a voltage Vc1 (+50V/+200V) was applied on S12 and S13 as un-selected scanning lines, and a voltage Vc2 (0V/+100V) was applied on S22 and S23 Simultaneously, voltages Vd1 (0V/0V) and Vd2 (0V/+100V) were applied as white state writing pulses on the first signal lines I11 and I13 and second signal lines I21 and I23, respectively, corresponding to the pixels (1, 1) and (1, 3). Voltages Vd1 (0V/+100V) and Vd2 (0V/0V) were also applied as black state writing pulses on the first signal line I12 and second signal line I22, respectively, corresponding to the pixel (1, 2). As a result, all the pixels on the selected first scanning line were rewritten and inversely displayed. The initial display state was maintained in each pixel on the second and third un-selected scanning lines.

The objective inverse display patterns were obtained with good contrast by similarly addressing at the periods of T2 and T3. The display obtained showed no cross-talk phenomenon, poor transfer of the charged particles, and deterioration of contrast due to poor holding at all, and the average contrast between the white state display and black state display was as high as about 12:1. The maximum addressing voltage required for addressing was +200V.

The present invention is described in more detail in the examples 2, 3 and 4.

Example 3

A 3×3 matrix display cell was prepared in this example by the cell construction with a step as shown in FIG. 28A, and the cell was addressed by unidirectional passive matrix writing.

Figure 34:
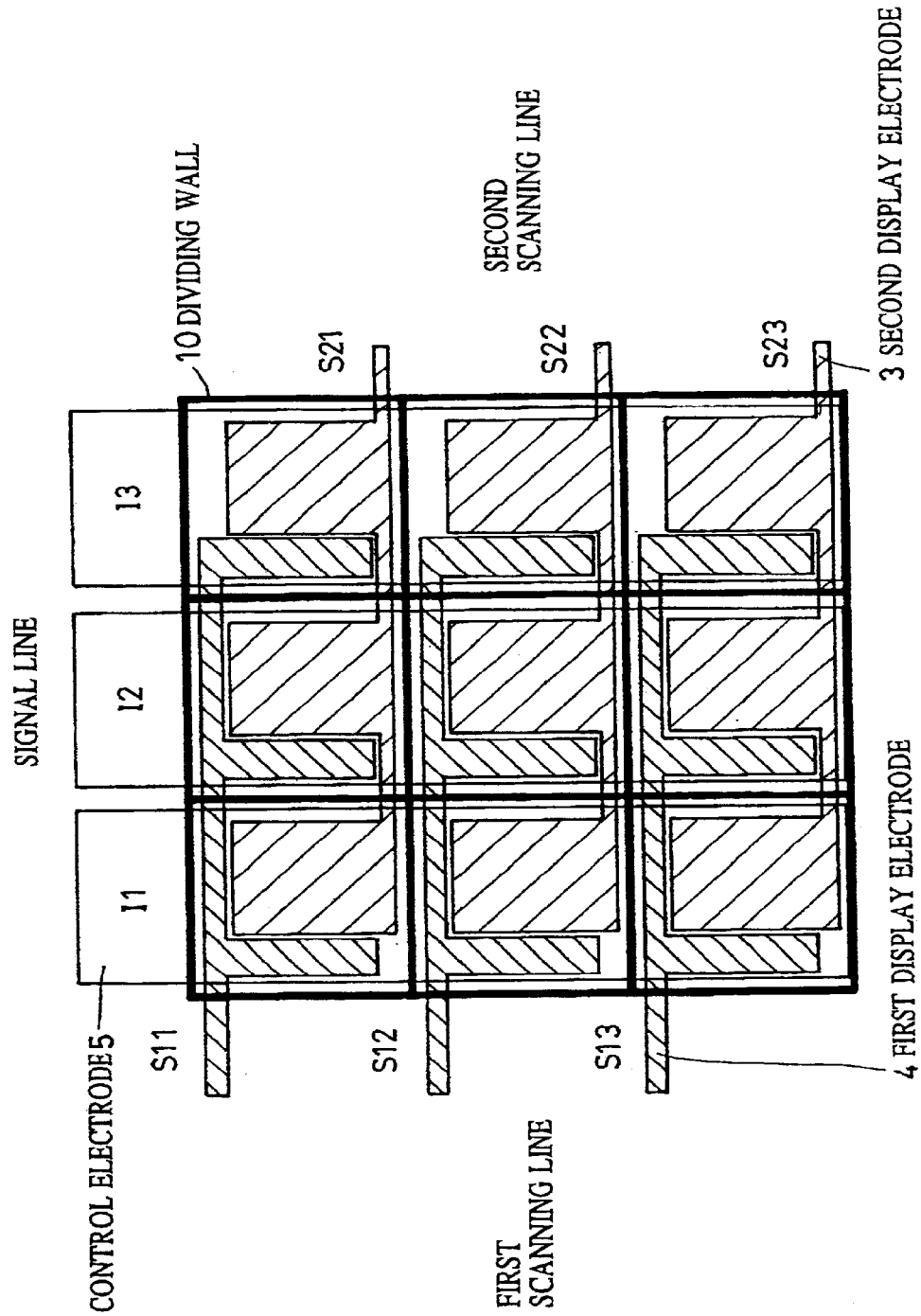
FIG. 34 shows a plane construction of a 3×3 matrix prepared in Example 3 according to the present invention.

The plane view of the 3×3 matrix display cell prepared is shown in FIG. 34. The size of one pixel was 1×1 mm, and the area ratio between the first display electrode and the second display electrode was 20:80.

The method for manufacturing the cell is briefly described with reference to FIG. 34 and FIG. 28A.

An insulation colored layer comprising an acrylic resin in which a white pigment such as alumina was dispersed was at first formed over the entire surface of a first substrate 1 comprising a PET film with a thickness of 200 $\mu$m. Then, a dark-black titanium carbide film was deposited as a first display electrode 4 followed by patterning into the shape shown in FIG. 34 by photolithography and dry etching.

Next, an epoxy resin was coated with a thickness of 30 $\mu$m, and a thin film of ITO as a second display electrode was deposited at low temperature by a magnetron sputtering method. Subsequently, a resist film was coated and patterned into the shape as shown in FIG. 34, and finally subjected to reactive dry etching with $CF_4$ and $O_2$ to form an assembly in which the second display electrode comprising ITO is disposed on a step with an elevation of 30 $\mu$m. An insulation layer 8 comprising an amorphous fluorinated resin was then formed over the entire surface with a thickness of 200 nm.

After depositing ITO as a control electrode 5 on the second substrate 2 comprising a PET film by low temperature deposition, the film was patterned into a shape shown in FIG. 34 and then an insulation film comprising an amorphous fluorinated resin with a thickness of 200 nm was formed over the entire surface. A dividing wall 10 was formed thereon The dividing wall 10 was formed by applying light exposure and wet development after coating a photosensitive epoxy resin. The height of the dividing wall was 70 $\mu$m, a transparent insulation liquid 7 and black-colored charged particles 6 were filled into the space formed in the dividing wall.

Silicon oil was used as the transparent insulation liquid 7. A mixture of polystyrene and carbon with a mean particle size of about 5 $\mu$m was used for the black-colored charged particles 6. The charged particles 6 in the silicone oil were positively charged. Subsequently, a pattern of an adhesive layer was formed on the bonding face between the first and second substrates, and the first substrate was placed on the dividing wall on the first substrate with positioning, followed by bonding by heating. A display device was formed by connecting the assembly to a voltage application device.

The addressing method according to the present invention is described hereinafter.

The first display electrode was used for the first scanning lines (S11 to S13), the second display electrode was used for the first scanning lines (S21 to S23), and the control electrode was used for the signal lines (I1 to I3).

Figure 35A:
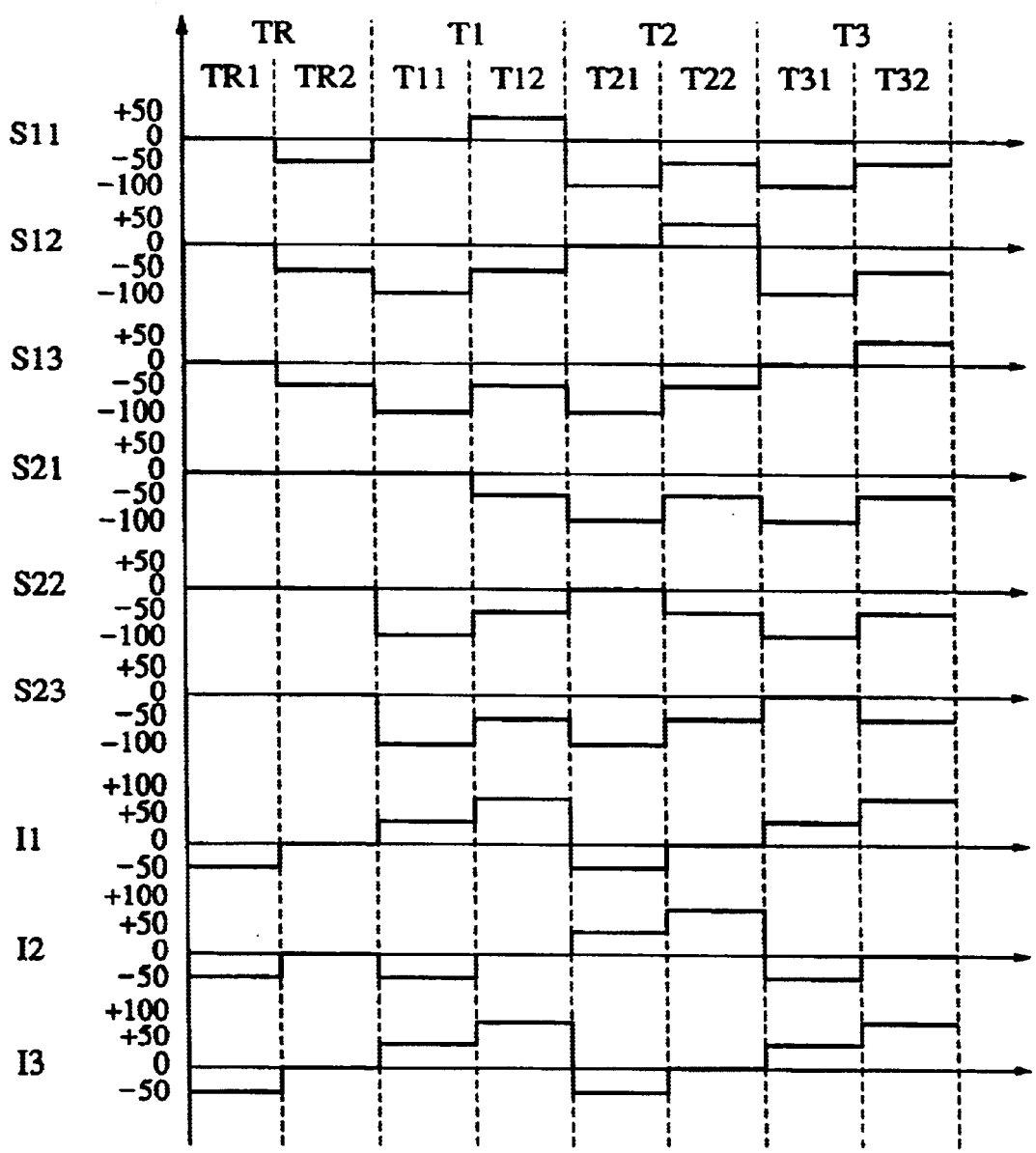
FIG. 35A shows an addressing times chart executed in Example 3 according to the present invention.
Figure 35B:
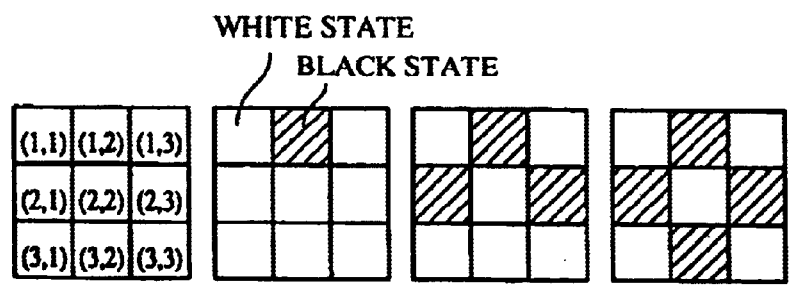
FIG. 35B shows a display pattern in Example 3 according to the present invention.

FIG. 35A shows a time chart of the addressing pulse applied on each scanning line and signal line, and FIG. 35B shows the change of display state in each period. The first half period (TR1, T11, T21 and T31) was set to 30 msec, and the last half period (TR2, T12, T22 and T32) was set to 30 msec.

The entire screen was addressed to reset to white state display. Then, unidirectional writing (white state display→black state display) was carried out to the selected pixels (1, 2), (2, 1), (2, 3) and (3, 2) corresponding to the preset display pattern for each scanning line. Writing was carried out in this example according to the addressing method described in FIG. 22, FIG. 23, FIG. 26 and FIG. 27. Details of the behavior of the charged particles is omitted since it is the same as that described in FIG. 22, FIG. 23, FIG. 26 and FIG. 27.

The addressing method is sequentially described hereinafter according to the time chart. A voltage Vd1 (0V at the first half period TR/−50V at the last half period, abbreviated hereinafter) was applied on all the first scanning lines S11 to S13, a voltage of Bd2 (0V/0V) was applied on all the second scanning lines S21 to S23, and a voltage Vc(−50V/0V) was applied on all the signal lines I1 to I3 at a period TR to reset the entire screen to white state display.

Subsequently, voltages Vd1(0V/+50V) and Vd2(0V/−50V) was applied on the selected scanning lines S11 and S21, and voltages Vd1(−100V/−50V) and Vd2(0V/−50V) were applied on the un-selected scanning lines S12, S22, S13 and S23 at a period T1. A voltage Vc(−50V/0V) was applied on the signal line I2 corresponding to the selected pixel (1, 2), and a voltage of Vc(+50V/+100V) was applied on the signal lines I1 and I3 corresponding to the selected pixels (1, 1) and (1, 3). As a result, only the selected pixel (1, 2) on the selected scanning line was rewritten to black state display, and white state display was maintained on each pixel on the un-selected pixel (1, 19) and (1, 3), and on each pixel on the un-selected scanning line.

The objective inverse display patterns were obtained with good contrast by similarly addressing at the periods of T2 and T3. The display obtained showed no cross-talk phenomenon, poor transfer of the charged particles, and deterioration of contrast due to poor holding at all, and the average contrast between the white state display and black state display was as high as about 12:1.

Example 4

A 3×3 matrix display cell was prepared in this example using the cell construction shown in FIG. 20, and bidirectional writing was carried out by addressing the passive matrix. Bidirectional writing of black state display→white state display and white state display→black state display was enabled by prohibiting bidirectional in-plane transfer of the charged particles in the construction shown in FIG. 20. Addressing for bidirectional writing is impossible in the construction disclosed in Japanese Patent Publication No. 8-507154, and is one of the features of the present invention.

A plane view of the 3×3 matrix display cell is shown in FIG. 36. The size of one pixel is 1×1 mm, and the area ratio between the first display electrode and the second display electrode is 18:72.

The method for manufacturing the cell is briefly described below with reference to FIGS. 36 and 20. A colored insulation layer comprising an acrylic resin in which a white pigment such as alumina was dispersed was formed over the entire face on the first substrate 1 comprising a PET film with a thickness of 200 μm. Then, ITO as a second display electrode 3 was deposited at low temperature, followed by patterning into a shape shown in FIG. 36 by photolithography and dry etching. Then, a dark-black titanium carbonate film was deposited as a first display electrode 4, followed by patterning as described above. Next, an insulation layer 8 comprising an amorphous fluorinated resin was formed over the entire surface with a thickness of 200 nm. Finally, a photosensitive epoxy resin was coated, exposed to light and developed to form a barrier wall 11 with a height of 30 μm.

The process thereafter is the same as that in Example 3, and its explanation is omitted.

The addressing method in this example is described hereinafter.

The control electrode was used for the scanning line (S1 to S3), the first display electrode was used for the first signal line (I11 to I13), and the second display electrode was used for the second signal line (I21 to I23).

Figure 37A:
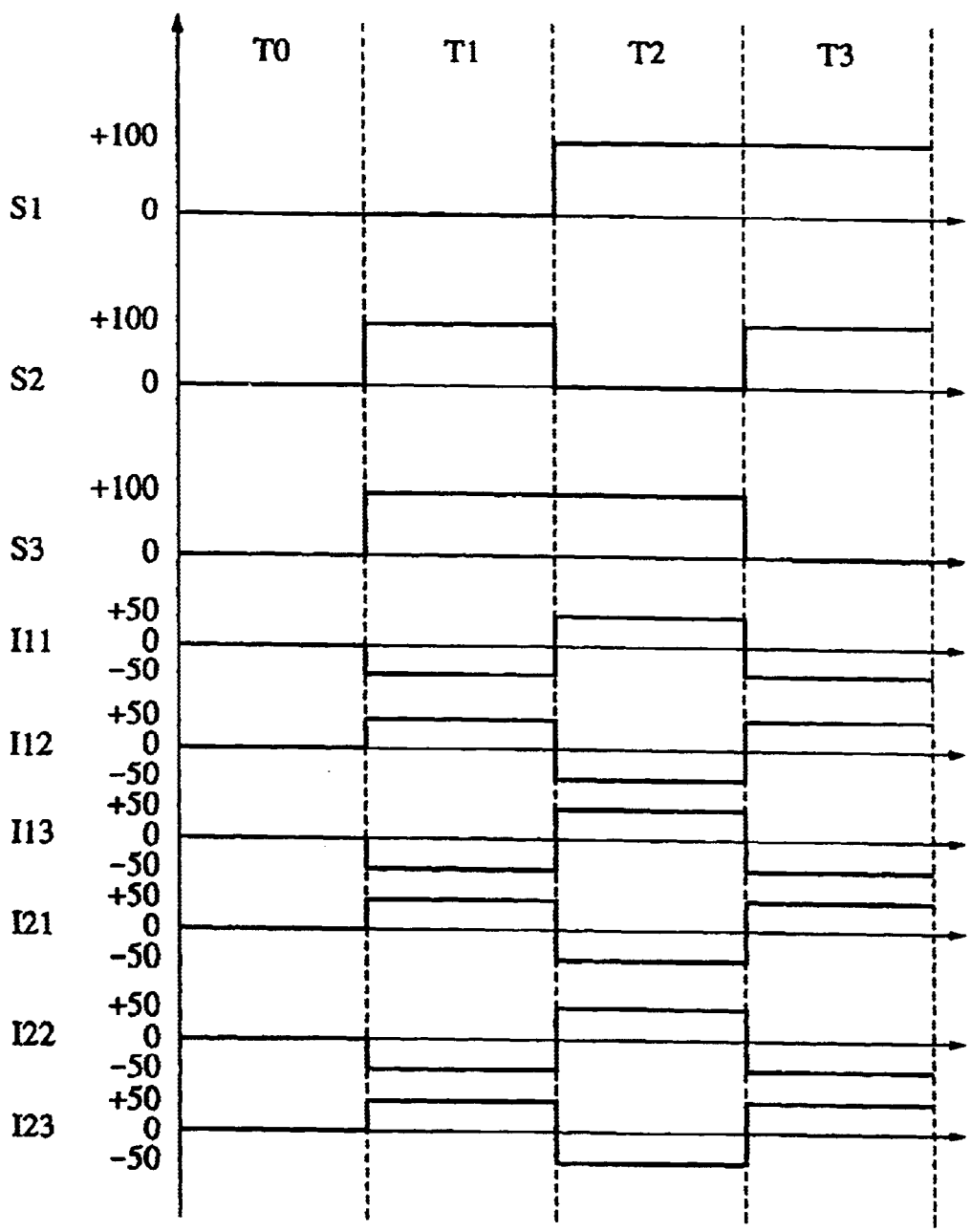
FIG. 37A shows an addressing time chart executed in Example 4 according to the present invention.
Figure 37B:
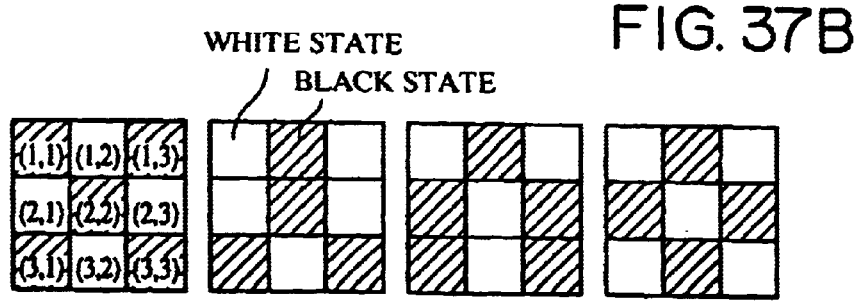
FIG. 37B shows a display pattern in Example 4 according to the present invention.

FIG. 37A shows a time chart of the addressing pulse applied on each scanning line and signal line, and FIG. 37B shows the change of the display state in each period.

Reset of the entire screen is not needed in this example, since bidirectional writing is enabled. A pattern at the period T0 is given as the initial display pattern in this example, and all the pixels are displayed as inverse patterns for every scanning line (S1 to S3). Writing was carried out by the addressing method shown in FIGS. 24 and 25. Details of the behavior of the charged particles are omitted, since it is the same as that described in FIGS. 24 and 25.

The addressing method is sequentially described hereinafter in accordance with the time chart. A voltage Vc(0V) is applied on the selected scanning line S1, a voltage Vc(+100V) is applied on the un-selected lines S2 and S3, and voltages Vd1 (−50V) and Vd1(+50V) are applied on the first signal lines I11 and I13, and the second signal lines I21 and I23, respectively, corresponding to the pixels (1, 1) and (1, 3) at the period T1. Voltages Vd1(+50v) and Vd2(−50V) were also applied on the first signal line I12 and second signal line I22, respectively, corresponding to the pixel (1, 2) as black state writing pulses. As a result, all the pixels on the selected scanning line S1 were rewritten to inverse display, and the initial display state in each pixel on the un-selected scanning lines was maintained.

The objective inverse display patterns were obtained with good contrast as a result of similar addressing at the periods of T2 and T3. The display obtained showed no cross-talk phenomenon, poor transfer of the charged particles, and deterioration of contrast due to poor holding at all, and the average contrast between the white state display and black state display was as high as about 10:1.

Example 5

A 3×3 matrix display cell was prepared in this example by the cell construction shown in FIG. 31B having an overhang shape cross section, and the passive matrix was addressed by unidirectional writing. The plane view of the 3×3 matrix display cell prepared is shown in FIG. 31. The pixel size was 1×1 mm, the effective area ratio between the first substrate and second substrate was 10:90, the distance between the first substrate and second substrate was 70 μm, the elevation of the stop was 30 μm, and positively charged particles with a mean particle size of 5 μm were used.

Explanations of the manufacturing stop are omitted since they are the same as that in Example 3 However, dry etching by an oxygen plasma used in forming the second display electrode and step pattern were applied a little longer than usual to form the cross section with the overhang shape as shown in FIG. 31B.

The objective display patterns were obtained with good contrast as a result of the same addressing as in Example 3. The display obtained showed no cross-talk phenomenon, poor transfer of the charged particles, and deterioration of contrast due to poor holding at all, and the average contrast between the white state display and black state display was as high as about 15:1.

Example 6

A 3×3 matrix display cell was prepared in this example using the cell construction shown in FIG. 40, and bidirectional writing was carried out by addressing the passive matrix. Bidirectional writing of black state display to white state display was enabled by prohibiting bidirectional in-plane transfer of the charged particles in the construction shown in FIG. 40. Addressing for bidirectional writing is impossible in the first construction disclosed in Japanese Patent Publication No. 8-507154, and is one of the features of the present invention having a symmetrical structure of the barrier wall.

Figure 58:
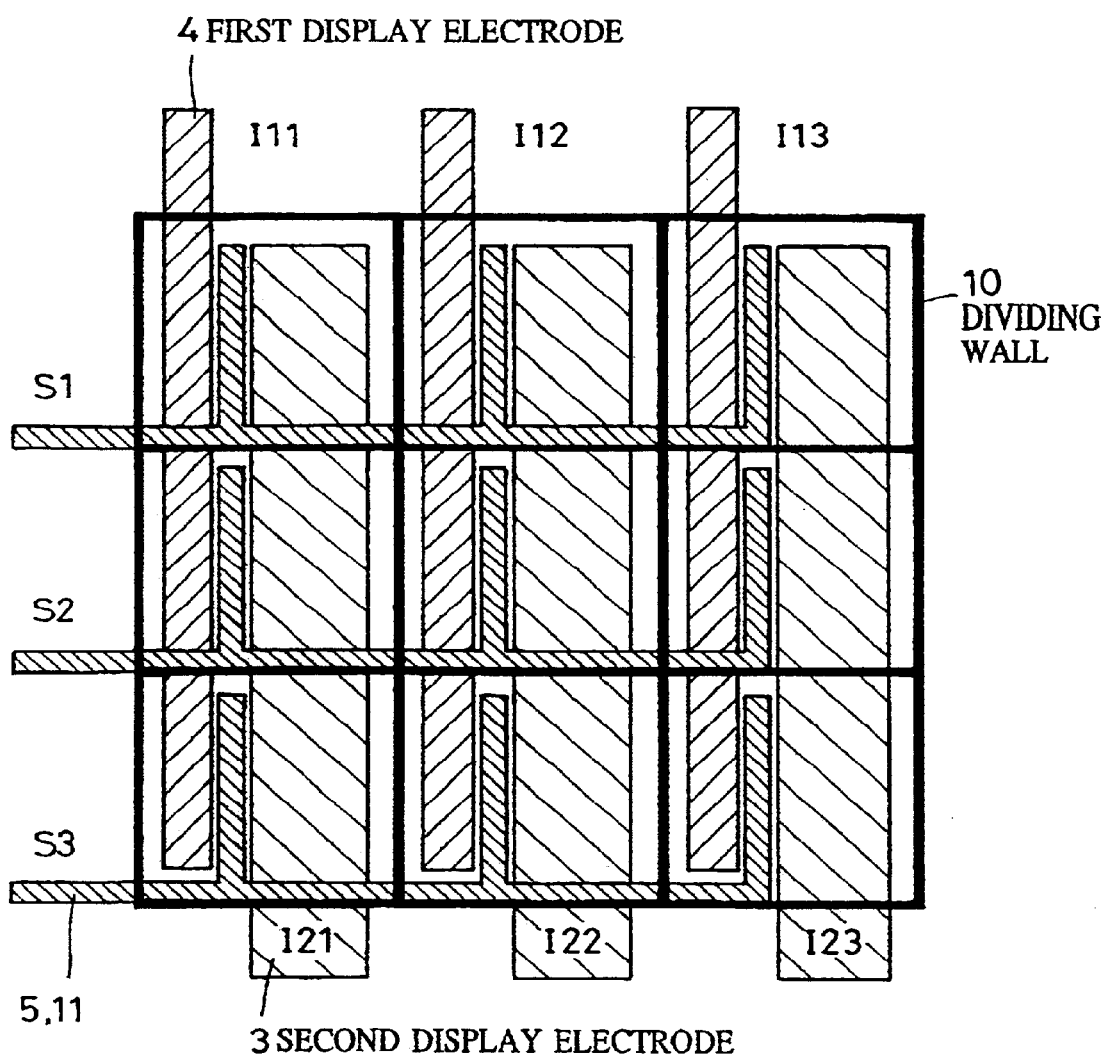
FIG. 58 shows a plane construction of a 3×3 matrix prepared in Example 5 according to the present invention.

A plane view of the 3×3 matrix display cell is shown in FIG. 58. The size of one pixel is 200×200 μm, and the area ratio between the first display electrode, second control electrode and second display electrode is 20:5:75.

The method for manufacturing the cell is briefly described with reference to FIGS. 40 and 58. A colored insulation layer comprising an acrylic resin in which a white pigment such as alumina was dispersed was formed over the entire face on the first substrate 1 comprising a PET film with a thickness of 200 μm. Then, ITO as a second display electrode 3 was deposited at low temperature, followed by patterning into a shape shown in FIG. 58 by photolithography and dry etching. Then, a dark-black titanium carbonate film was deposited as a first display electrode 4, followed by patterning as described above.

Subsequently, an epoxy resin was coated with a thickness of 30 μm, and a dark-black titanium carbonate film was deposited as a control electrode film followed by coating of a resist film, light exposure and development to form into a shape shown in FIG. 58 by patterning. An assembly in which a control electrode 5 comprising titanium carbonate was placed on the barrier wall 11 with an elevation of 30 μm was formed by reactive fry etching with $CF_4$ and $O_2$ gases. Then, an insulation layer 8 comprising an amorphous fluorinated resin was formed on the entire surface with a thickness of 200 μm.

Subsequently, an insulation layer 9 comprising the amorphous fluorinated resin with a thickness of 200 nm was formed on the entire surface of the second substrate 2 comprising a PET film. A barrier wall 10 was formed thereon. The barrier wall 10 was formed to an elevation of 70 μ by light exposure and wet development after coating a photosensitive epoxy resin. The space in the dividing wall formed was filled with an insulation liquid 7 and black-colored charged particles 6.

Silicon oil was used for the insulation liquid 7. A mixture of polystyrene and carbon with a mean particle size of 5 μm was used for the black-colored charged particles 6. The charged particles 6 in the silicone oil was positively charged. Then, a heat-fusion adhesive layer pattern was formed on the bonding face between the first substrate 1 and second substrate 2. The first substrate 1 was placed on the dividing wall on the second substrate 2 with positioning, and the substrate was bonded by heating to complete a sheet of the screen. Addressing characteristics were evaluated after connecting a voltage application device (not shown) to this screen.

The addressing method according to this example is described hereinafter.

The control electrode was used for the scanning lines (S1 to S3), the first display electrode was used for the first signal lines (S1 to S3), and the second display electrode was used for the second signal lines (I21 to I23).

Figure 59A:
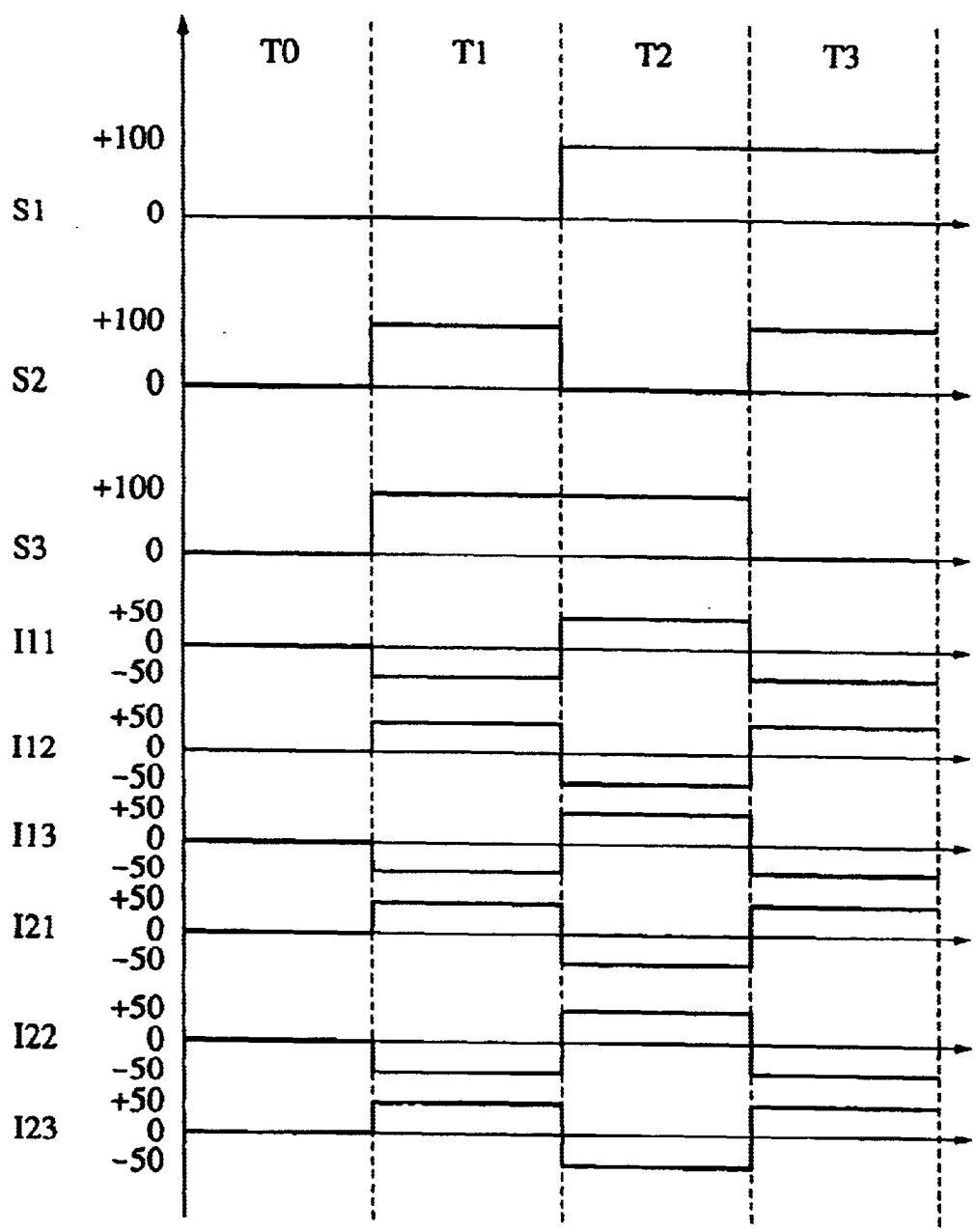
FIG. 59A shows an addressing time chart executed in Example 5 according to the present invention.
Figure 59B:
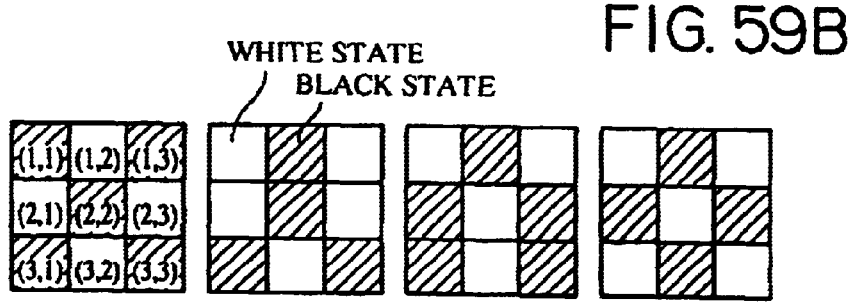
FIG. 59B shows a display pattern in Example 5 according to the present invention.

FIG. 59A shows the time chart of the addressing pulse applied on each scanning line and signal line, and FIG. 59B shows the change of display state in each period. Each period was adjusted to 50 msec.

Reset of entire screen as an initial operation is not needed, since bidirectional writing is enabled in this example. All the pixels were put into inverse display state for every scanning line (S1 to S3) by giving a pattern shown in the period T0 as the initial display pattern. The addressing methods described in FIGS. 44A and 44B, and FIGS. 45C to 45F were used for writing in this example. Details of the behavior of the charged particles are omitted, since they are the same as those described in FIGS. 44A and 44B, and FIGS. 45C to 45F.

The addressing method is sequentially described in accordance with the time chart. A voltage Vc(0V) was applied on the selected scanning line S1, a voltage Vc(+100V) was applied on the un-selected scanning lines S2 and S3, and voltages Vd1(−50V) and Vd2(+50V) as white state display writing pulses were applied on the first signal lines I11 and I13, and second signal lines I21 and I23, respectively, corresponding to the pixels (1, 1) and (1, 3) at the period T1. Voltages Vd1(+50V) and Vd2(−50V) as black state display writing pulses were also applied on the first signal line I12 and second signal line I22, respectively, corresponding to the pixel (1, 2). As a result, all the pixels on the selected scanning line were rewritten and were put into inverse, and the initial display state was maintained in each pixel on the un-selected scanning lines S2 and S3.

The same addressing method was used at the periods T2 and T3 thereafter, and the objective inverse display patterns were obtained with good contrast. The display obtained showed no cross-talk phenomenon, poor transfer of the charged particles, and deterioration of contrast due to poor holding at all, and the average contrast between the white state display and black state display was as high as about 10:1.

Example 7

A 3×3 matrix display cell was prepared in this example using the cell construction having a step shown in FIG. 55A. The cell was addressed by passive matrix writing.

Figure 60:
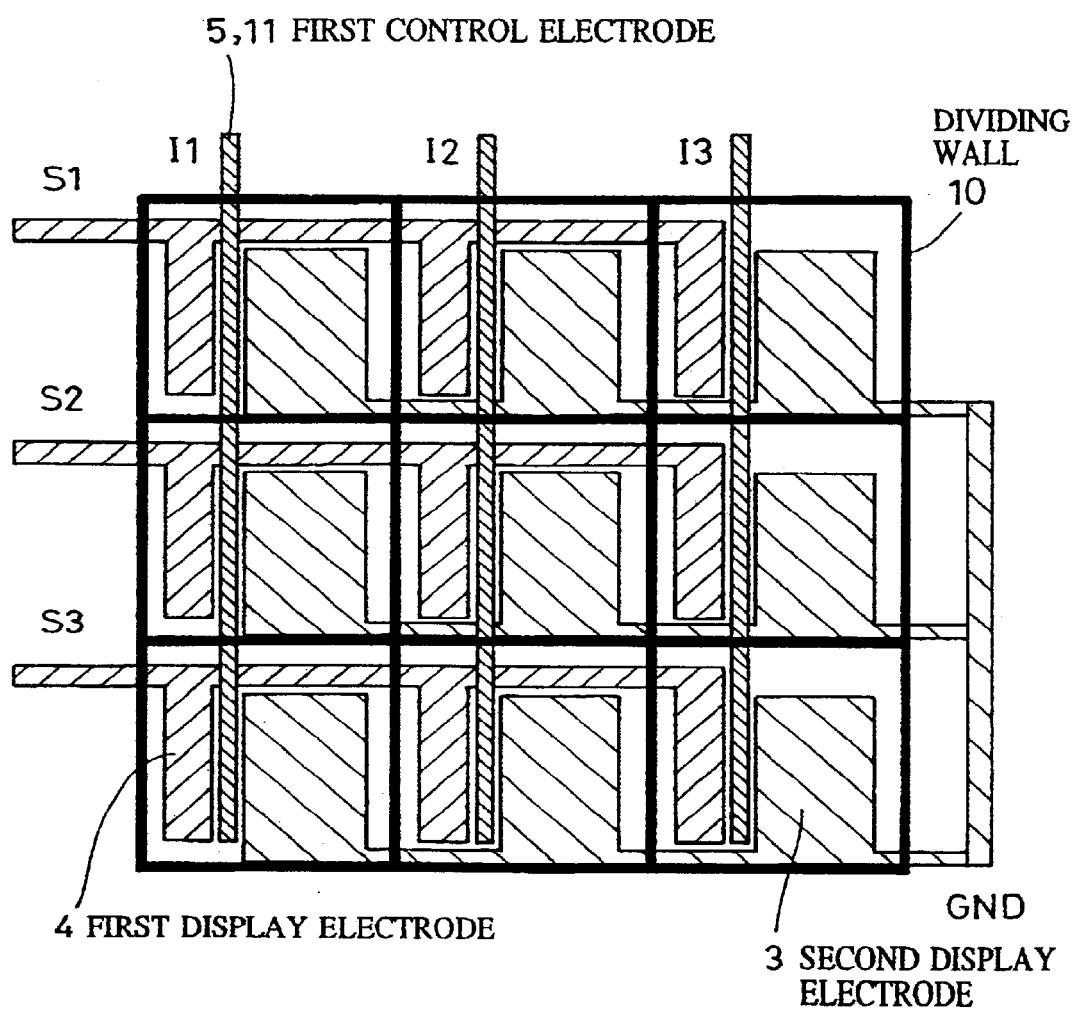
FIG. 60 shows a plane construction of a 3×3 matrix prepared in Example 6 according to the present invention.

The plane view of the 3×3 matrix display cell is shown in FIG. 60. The size of one pixel was 200×200 μm, and the area ratio among the first display electrode, control electrode and second display electrode was 20:5:75.

The method for manufacturing the cell is briefly described with reference to FIGS. 60 and 55A. A colored insulation layer comprising an acrylic resin in which a white pigment such as alumina was dispersed was formed over the entire face on the first substrate 1 comprising a PET film with a thickness of 200 μm. Then, a dark-black colored titanium carbonate film was deposited as a first display electrode 4, and was patterned into a shape shown in the drawing by photolithography and dry etching.

Then, an epoxy resin was coated with a thickness of 30 μm, a resist film was coated, exposed to light and developed to form a negative pattern and the resist film was lift-off after depositing an ITO thin film by a magnetron sputtering method at low temperature, thereby patterning the second display electrode 3. An insulation layer comprising an acrylic resin was deposited with a thickness of 1 μm, and a dark-black titanium carbonate film as a control electrode film was deposited followed by patterning by the same method as forming the second display electrode 3. Subsequently, the step and connection pattern were formed with the resist film, and the film was subjected to dry etching with a reaction gas comprising $CF_4$ and $O_2$, forming an assembly in which the second display electrode 3 and control electrode 5 were disposed on the step having an elevation of 30 μm. Then, an insulation film with a thickness of 200 nm comprising an amorphous fluorinated resin was formed over the entire surface.

A sheet of the screen was completed thereafter by the same process as in Example 6. Addressing characteristics were evaluated by connecting this screen to a voltage application device.

The addressing method in this example is described hereinafter.

The first display electrode was used for the scanning lines (S1 to S3), and the control electrode was used for the signal lines (I1 to I3). The second display line was grounded as a common electrode.

Figure 61A:
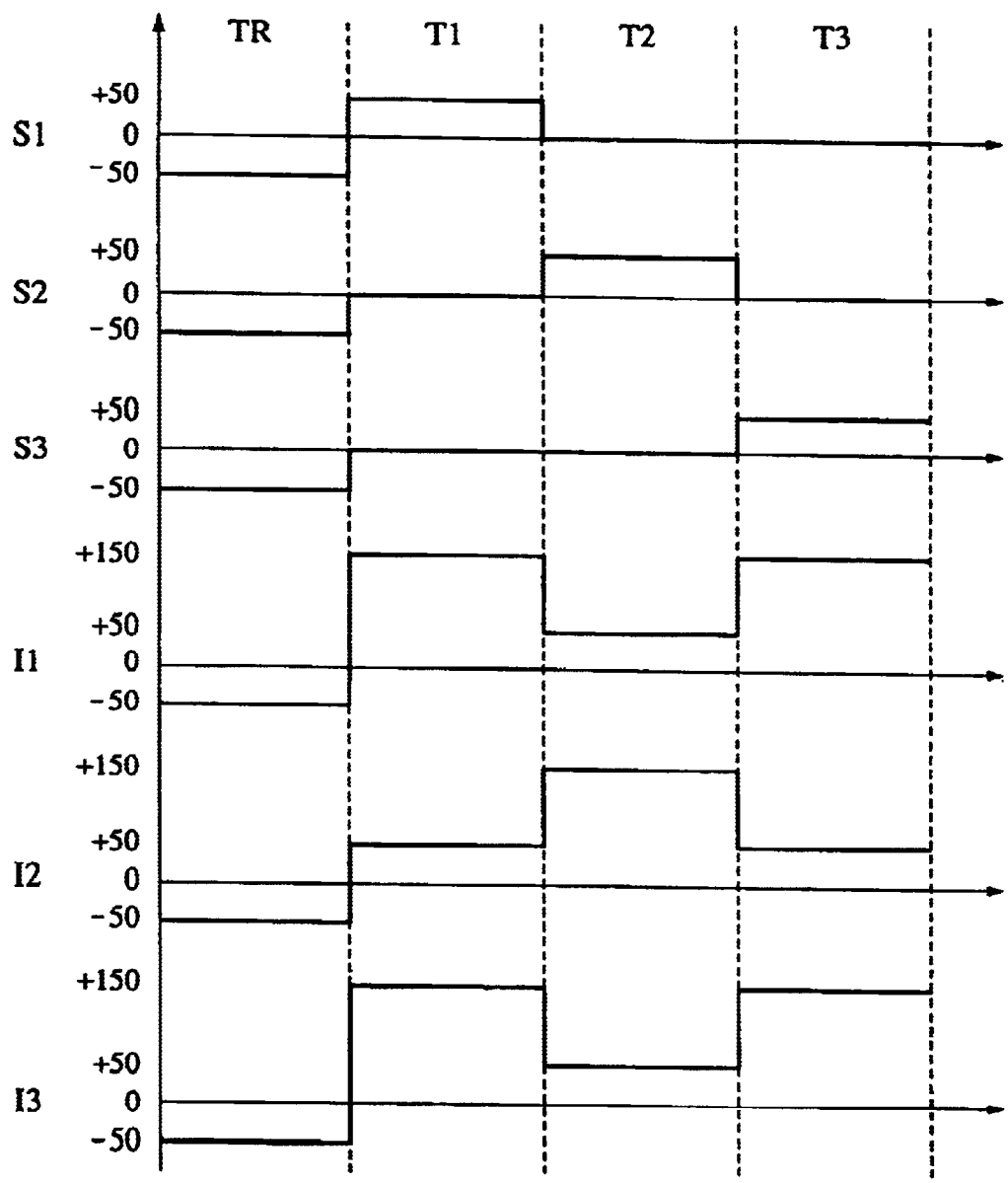
FIG. 61A shows an addressing time chart executed in Example 6 according to the present invention.
Figure 61B:
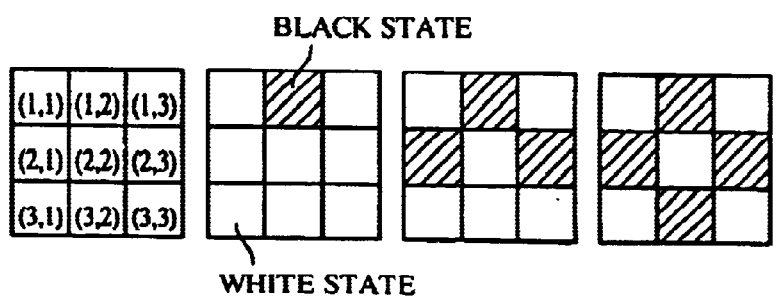
FIG. 61B shows a display pattern in Example 6 according the present invention.

FIG. 61A shows the time chart of the addressing pulse applied on each scanning line and signal line, and FIG. 61B shows the change of display state in each period. The selected periods of one scanning lines (TR, T1, T2 and T3) were set to 50 msec.

The entire screen was addressed at first to rest into white state display, and then unidirectional writing (white state display→black state display) was carried out to the selected pixels (1, 2), (2, 1), (2, 3) and (3, 2) corresponding to the predetermined display pattern. The description of the detailed behavior of the charged particles is omitted since it is the same as described in FIGS. 48A to 48C, and FIGS. 49D to 49G.

The addressing method is described hereinafter according to the time chart. All the pixels were reset to white display state by applying a voltage Vd1(−100V) on all the scanning lines S1 to S3, and by applying a voltage Vc(−50V) on all the signal lines I1 to I3 at the period TR.

A voltage Vd1(+100V) was applied on the selected scanning line S1, a voltage Vd1(0V) was applied on the un-selected lines S2 and S3, a voltage Vc(+50v) was applied on the signal line I2 corresponding to the selected pixels (1, 2) for black state writing, and a voltage of Vc(+50) was applied on the first signal lines I1 and I3 corresponding to the un-selected pixels (1, 19) and (1, 3) for holding the white state state at the period T1. As a result, only the selected pixels (1, 2) on the selected scanning line was rewritten to black state display, and the white display state was maintained in the un-selected pixels (1, 1) and, (1, 3) and in each pixel on the un-selected scanning line.

The same addressing method was used at the periods T2 and T3 thereafter, and the objective inverse display patterns were obtained with good contrast. The display obtained showed no cross-talk phenomenon, poor transfer of the charged particles, and deterioration of contrast due to poor holding at all, and the average contrast between the white state display and black state display was as high as about 15:1.

Example 8

A 3×3 matrix display cell was prepared in this example using the cell construction shown in FIG. 40. The passive matrix was addressed by bidirectional writing comprising two writing periods shown in FIGS. 50 and 51, FIGS. 52A and 52B, FIGS. 53D to 53G and FIGS. 54F and 54G.

The addressing characteristics were evaluated by connecting the voltage applying circuit (not shown) to the display cell prepared in Example 6. The addressing method in this example will be described hereinafter.

The control electrode was used for the scanning lines (S1 to S3), the first display electrode was used for the first signal lines (I11 to I13), and the second display electrode was used for the second signal lines (I21 to I23).

Figure 62A:
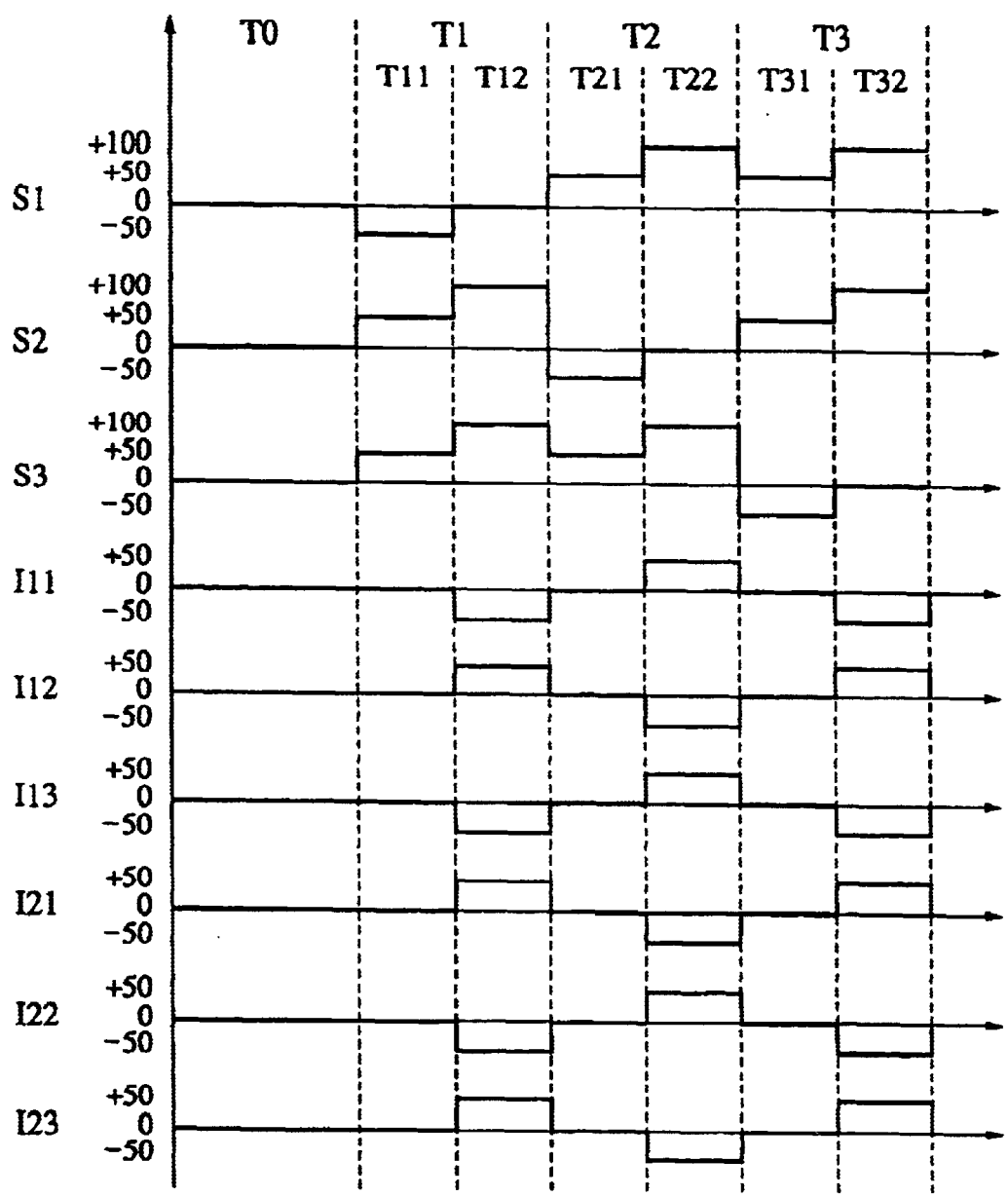
FIG. 62A shows an addressing time chart executed in example 7 according to the present invention.
Figure 62B:
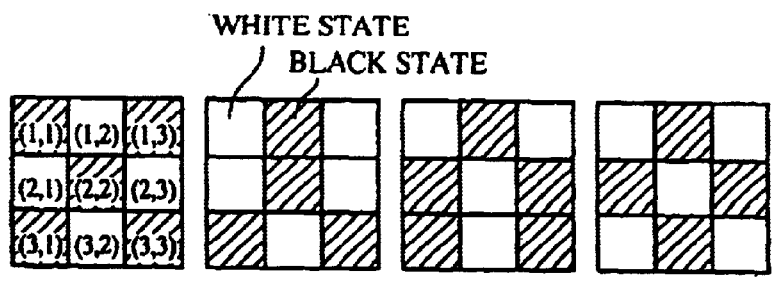
FIG. 62B shows a display pattern in Example 7 according to the present invention.

FIG. 62A shows the time chart of the pulse applied on each scanning line and signal line, and FIG. 62B shows the changes of the display state in each period. Writing was carried out according to the addressing method described in FIGS. 50 and 51, FIGS. 52A and 52B, FIGS. 53D to 53G and FIGS. 54F and 54G. The selected periods for one scanning line were 30 msec in the first half period, and 30 msec in the last half period. Detailed behavior of the charged particles is omitted since it is the same as described in FIGS. 50 and 51, FIGS. 52A and 52B, FIGS. 53D to 53G and FIGS. 54F and 54G.

Reset of the entire screen as an initial operation is not needed since bidirectional writing is enabled in this example. Accordingly, a pattern shown at the period T0 is given as a initial display pattern, and display of each pixel is reversed for every scanning line (S1 to S3).

The addressing method is described hereinafter in accordance with the time chart. A voltage Vc(−50V at the period T11/0V at the period T12) was applied on the selected scanning line S1, a voltage Vc(+50V/+100V) was applied on the un-selected scanning lines S2 and S3, and voltages Vd1(0V/−50V) and Vd2(0V/+50V) were applied as white state writing pulses on the first signal lines I11 and I13, and second signal lines I21 and I23, respectively, corresponding to the pixels (1, 1) and (1, 3) at the period T1. Voltages Vd1(0V/+550V) and Vd2(0V/−50V) as black state writing pulses were also applied on the first signal line I12 and second signal line I22, respectively, corresponding to the pixel (1, 2). As a result, all the pixels on the selected first line were rewritten into inverse display. The initial display state was maintained in each pixel on the second and third un-selected lines.

The objective inverse display patterns were obtained with good contrast as a result of similar addressing at the periods of T2 and T3. The display obtained showed no cross-talk phenomenon, poor transfer of the charged particles, and deterioration of contrast due to poor holding at all, and the average contrast between the white state display and black state display was as high as about 10:1.

The comparative example will be described hereinafter.

Comparative Example

Figure 65A:
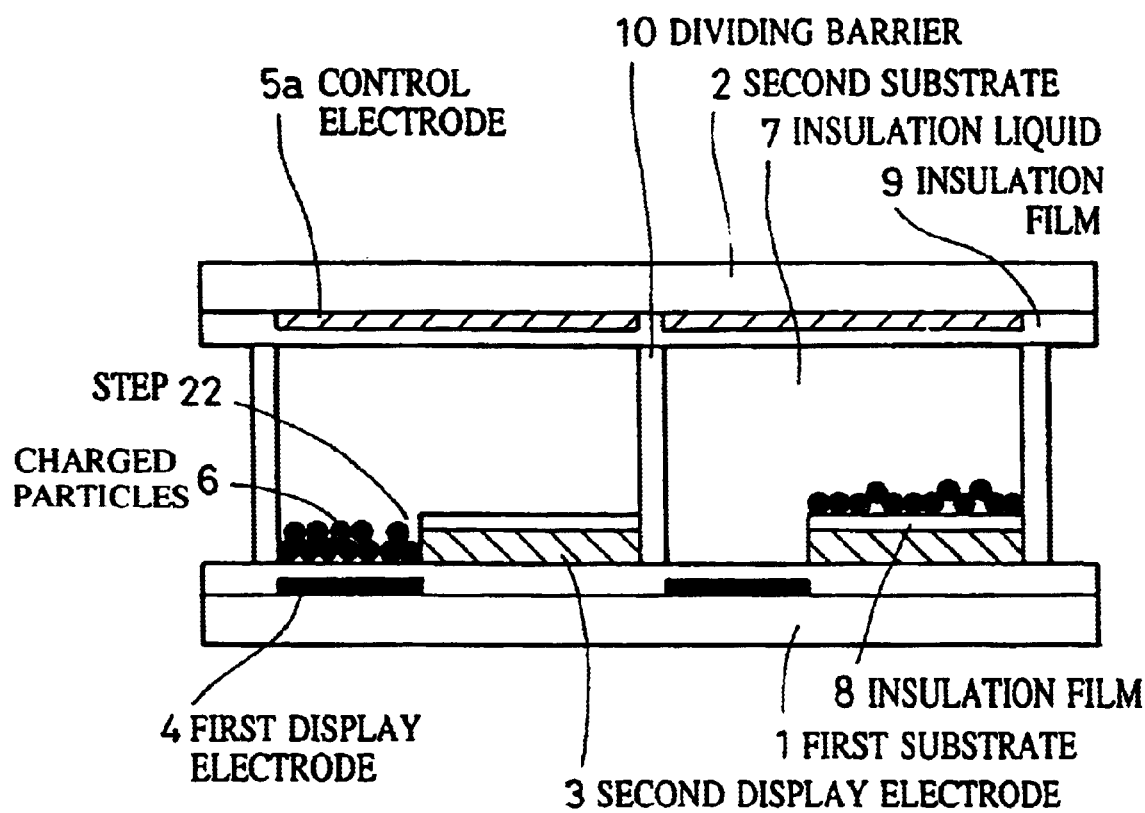
FIG. 65A shows a cross section of the conventional display device.
Figure 65B:
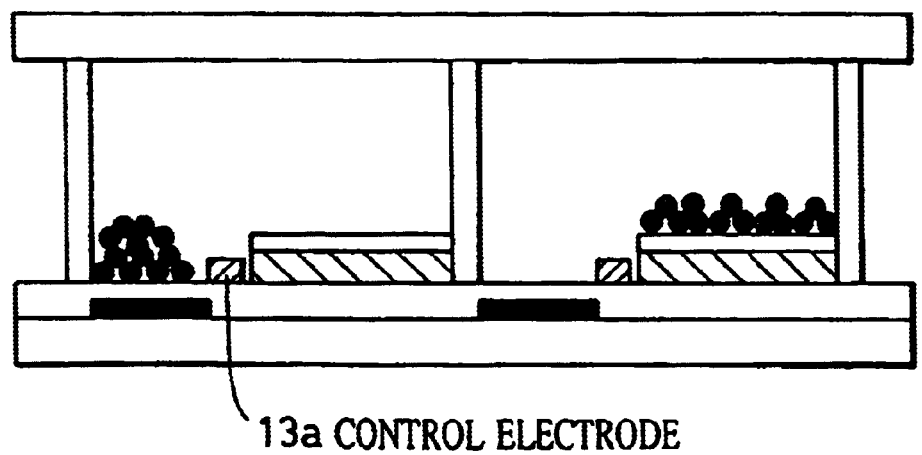
FIG. 65B shows a cross section of the conventional display device.
Figure 67:
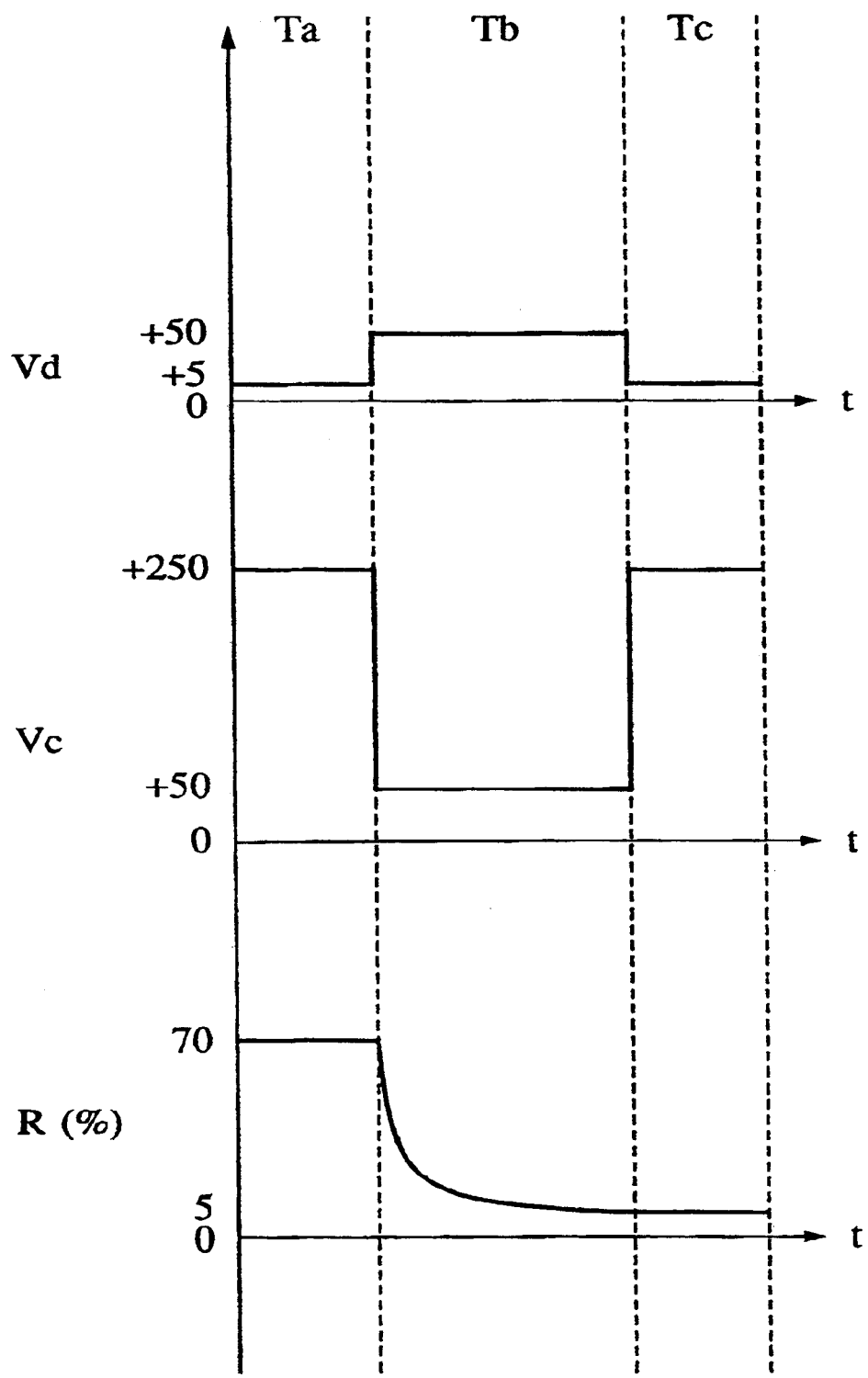
FIG. 67 shows another part of an addressing method and operation state of the conventional display device shown in FIGS. 47D to 47G.

A 3×3 matrix display cell was prepared in this example using the cell constructions shown in FIGS. 65A and 65B, which are disclosed in Japanese Patent Publication 8-507154. The passive matrix was addressed by unidirectional writing.

The plane view of the 3×3 matrix display cell is shown in FIG. 63. The size of one pixel was 200×200 μm, the area ratio between the first display electrode and the second display electrode was 35:65, the distance between the first substrate and second substrate was 70 μm, and the step height was 0.3 μm. The mean particle size of the positively charged particles was 1 μm. The display electrode and the charged particles were colored as in FIG. 40.

The method for manufacturing the cell will be briefly described with reference to FIGS. 65A and 65B, and FIG. 63. A colored insulation layer comprising an acrylic resin in which a white pigment such as alumina was dispersed was formed over the entire surface on the first substrate comprising a PET film with a thickness of 200 μm. A dark-black colored titanium carbide film was deposited as a first display electrode 4, and was patterned into a shape shown in the drawing by photolithography and dry etching.

Then, an epoxy resin was coated with a thickness of 0.3 μm, and subsequently an ITO film as a second display electrode was deposited by a magnetron sputtering method at low temperature. Then, a resist film was coated, and patterned into the shape as shown in FIG. 31. A reactive dry etching was finally applied using $CF_4$ and $O_2$ gases to form an assembly in which the second display electrode comprising ITO was formed on the step with an elevation of 0.3 μm. Then, an insulation layer 8 comprising an amorphous fluorinated resin was formed with a thickness of 200 nm.

After depositing ITO as the control electrode 5 on the second substrate 2 comprising a PET film at low temperature, the film was patterned into a shape shown in FIG. 63, and then an insulation film with a thickness of 200 nm comprising an amorphous fluorinated resin was formed on the entire surface. The dividing wall 10 was formed thereon. The dividing wall 10 was formed by an elevation of 70 μm by light exposure and wet development, after coating a photosensitive epoxy resin. An insulation liquid 7 and black-colored charged particles 6 were injected into the space within the dividing walls formed, Silicone oil was used for the insulation liquid 7. A mixture of polystyrene and carbon with a mean particle size of 1 μm was used for the black-colored charged particles 6 as in Example 6. The charged particles 6 were positively charged in the silicone oil. Subsequently, an adhesive pattern was formed on the bonding face between the first substrate 1 and the second substrate 2, and the first substrate 1 was placed on the dividing wall on the second substrate 2 followed by bonding by heating. A display device was completed by connecting to a voltage applying circuit (not shown).

The addressing method is described hereinafter.

The first display electrode was used for the scanning lines (S1 to S3), and the control electrode was used for the signal lines (I1 to I3). The second display electrode was fixed to the earth potential as a common electrode.

Figure 64A:
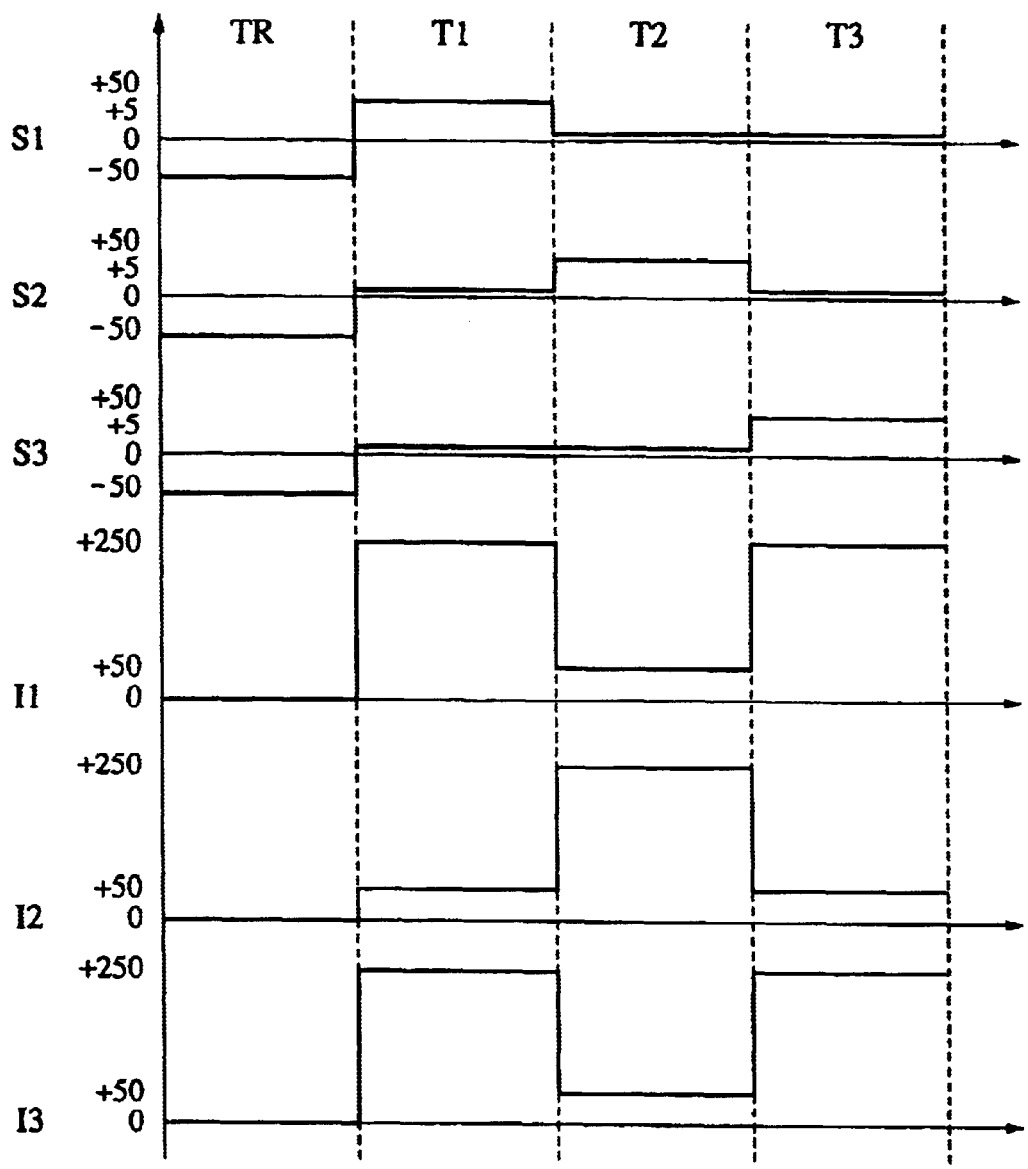
FIG. 64A shows an addressing time chart executed in Comparative Example 3.
Figure 64B:
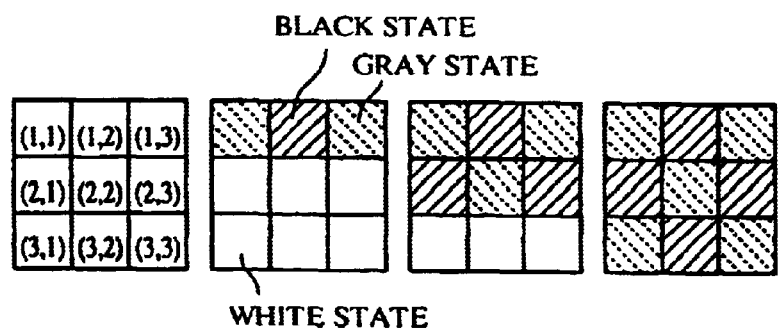
FIG. 64B shows a display chart in Comparative Example 3.

FIG. 64A shows the time chart of the addressing pulse applied on each scanning line and signal line, and FIG. 64B shows the change of display state in each period. The selected periods (TR, T1, T2 and T3) for one scanning line were set to 50 msec.

The entire screen was initially set to white display state by addressing, and then unidirectional writing was carried out for the selected pixels (1, 2), (2, 1), (2, 3) and (3, 2) corresponding to predetermined display pattern (white state display→black state display). Writing was carried out by the addressing method described in FIGS. 66 to 67, FIGS. 68A to 68C, and FIGS. 69D to 69G in this example. Detailed behavior of the charged particles is omitted, since it is the same as described in FIGS. 66 to 67, FIGS. 68A to 68C, and FIGS. 69D to 69G.

The addressing method is described hereinafter in accordance with the time chart. A voltage of Vd(−50V) is applied on all the scanning lines S1 to S3, and a voltage Vc(0V) was applied on all the signal lines I1 to I13 to reset all the pixels to white display state.

Figure 68A:
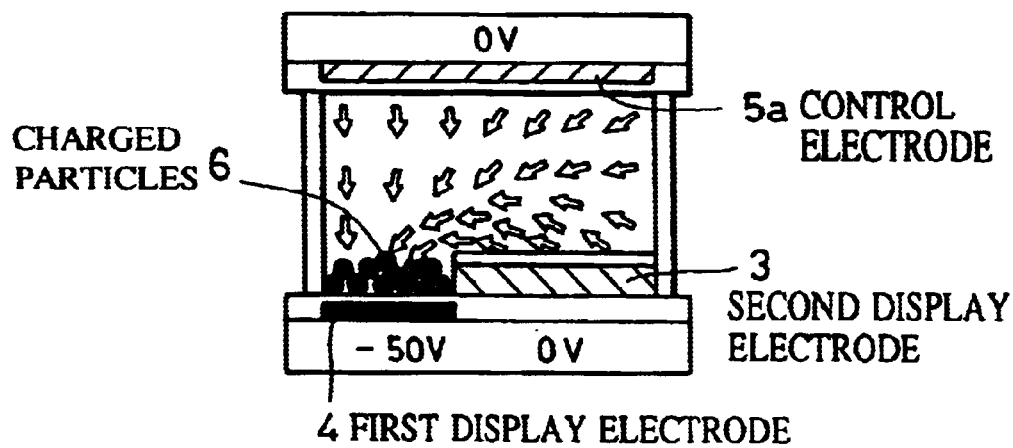
FIG. 68A shows a passive matrix addressing method of the conventional display device.
Figure 68B:
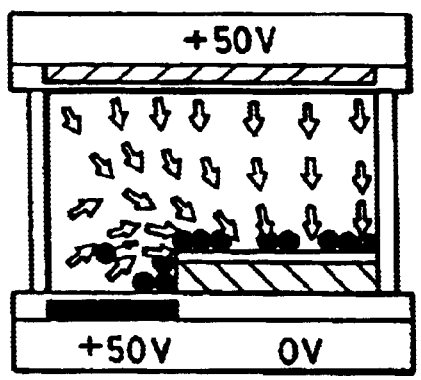
FIG. 68B shows a passive matrix addressing method of the conventional display device.
Figure 68C:
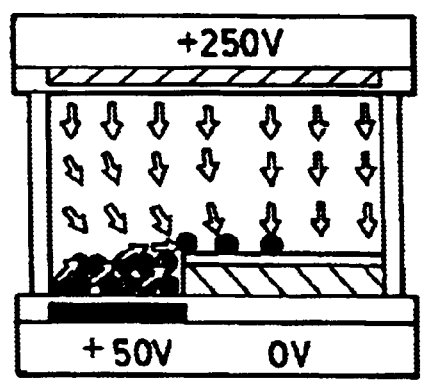
FIG. 68C shows a passive matrix addressing method of the conventional display device.
Figure 69D:
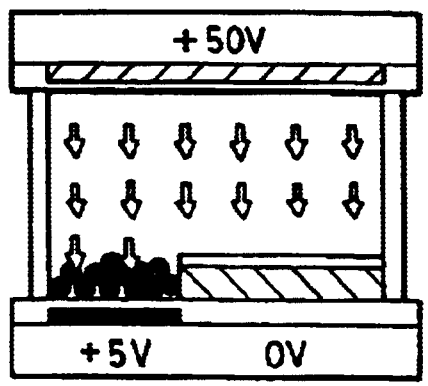
FIG. 69D shows a passive matrix addressing method of the display device shown in FIG. 43.
Figure 69E:
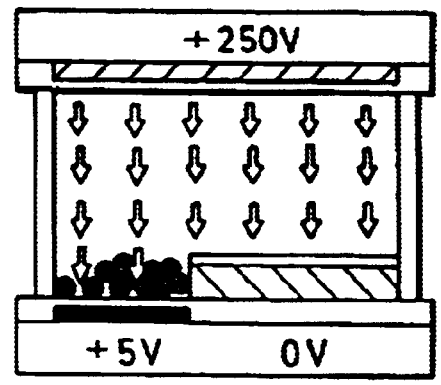
FIG. 69E shows a passive matrix addressing method of the display device shown in FIG. 43.
Figure 69F:
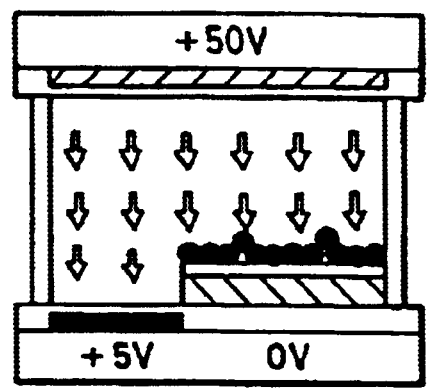
FIG. 69F shows a passive matrix addressing method of the display device shown in FIG. 43.
Figure 69G:
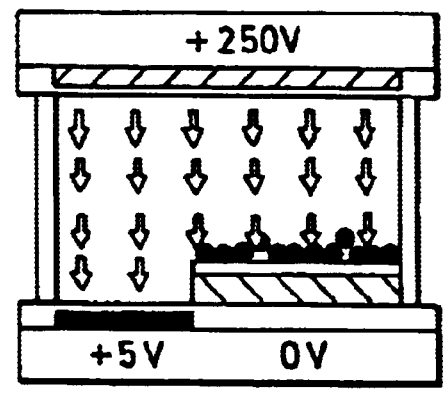
FIG. 69G shows a passive matrix addressing method of the display device shown in FIG. 43.
Figure 70A:
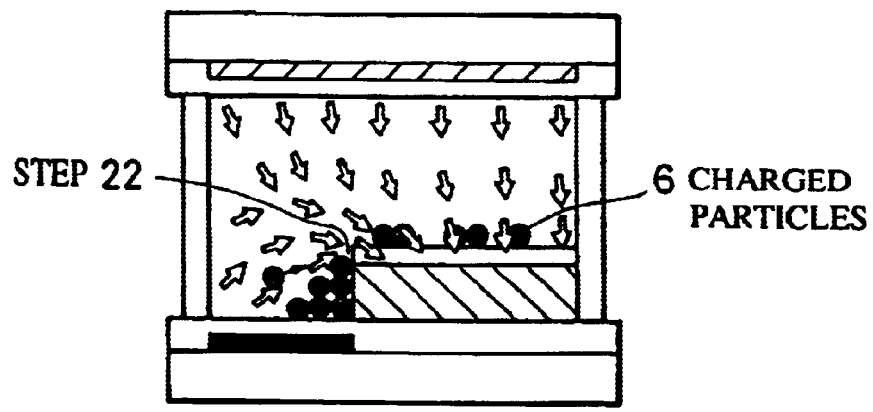
Figure 70B:
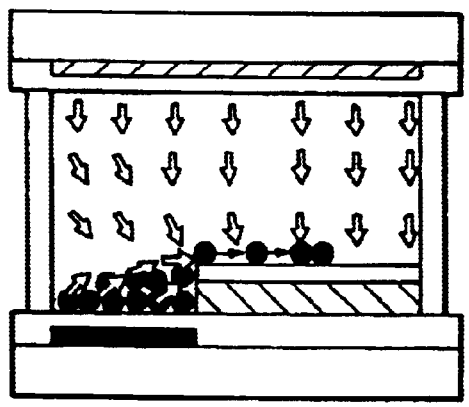
Figure 70C:
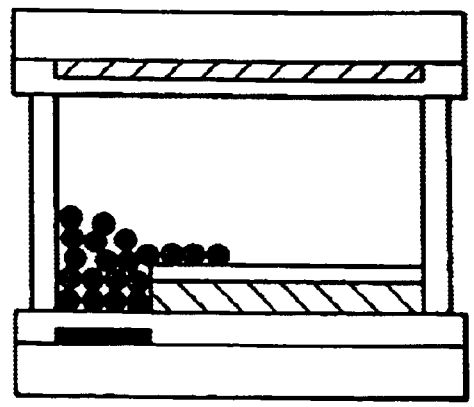

A voltage Vd(+50V) was applied on the selected scanning line S1, a voltage of vd(+5v) was applied on the un-selected lines S2 and S3, a voltage Vc(+50V) was applied on signal line I2 corresponding to the selected pixels (1, 1) and (1, 3), and a voltage Vc(+250V) was applied on the signal lines I1 and I3 corresponding to the un-selected pixels (1, 19) and (1, 3) at the period T1. As a result, only the selected pixel (1, 2) on the selected scanning line S1 was rewritten to the black display state, and the white display state was maintained in each pixel on the un-selected pixels (1, 1) and (1, 3), and in each pixel on the un-selected scanning lines S2 and S3. However, depression of the charged particles in the un-selected pixels (1, 1) and (1, 3) by the control voltage Vc(+250V) was so insufficient that a part of the charged particles had been transferred toward the second display electrode side as shown in FIG. 68C, resulting in a grayish display as shown in FIG. 64B.

Although the objective display pattern was obtained thereafter as a result of similar addressing in accordance with the selected pixel patterns at the period of T2 and T3, the white state display was also grayish as a whole to give a worst display contrast. The mean contrast between the white state display and black state display was about 3:1. While a control voltage of +250V was used in this comparative example, it was still insufficient and requires an increase.

While the present invention has been described with reference to what are presently considered to be the preferred embodiments, it is to be understood that the invention is not limited to the disclosed embodiments, on the contrary, the invention is intended to cover various modifications and equivalent arrangements included within the spirit and scope of the appended claims. The scope of the following claims is to be accorded the broadest interpretation so as to encompass all such modifications and equivalent structured and functions.

What is claimed is:

1. An electrophoretic display device comprising:
   a first substrate;
   a first display electrode and a second display electrode disposed on the first substrate;
   a second substrate disposed in opposed relation to the first substrate;
   voltage applying means for applying a desired voltage on each display electrode;
   a transparent insulation liquid filled between the first substrate and the second substrate; and
   a plurality of colored and charged fine particles dispersed in the insulation liquid, with display modes being switched by allowing the colored and charged particles to transfer between the first and second display electrodes,
   wherein a first control electrode disposed on the second substrate, and a second control electrode disposed between the first display electrode and the second display electrode on the first substrate, are provided for controlling transfer of the charged particles.

2. An electrophoretic display device according to claim 1, further comprising a barrier structure disposed between the first display electrode and the second display electrode, wherein the second control electrode is disposed at a periphery of the barrier structure.

3. An electrophoretic display device according to claim 2, wherein said barrier structure comprises a wall, and the second electrode is disposed at a tip of the barrier wall.

4. An electrophoretic display device according to claim 2, wherein said barrier structure comprises a step, and the second control electrode is disposed at an edge of the step.

5. An electrophoretic display device according to claim 4, wherein a shielding space in which the charged particles are able to enter and exit and which is invisible to an observer of the screen is provided under a face of one of the display electrodes adjoining to the step and located at the upper side of the step adjacent to the other display electrode.

6. A electrophoretic display device according to claim 1, wherein the voltage signal applied on each display electrode and on each control electrode for allowing the charged particles to transfer between the display electrodes is composite signal comprising a first period for allowing the charged particles to transfer the second control electrode, and second period for allowing the charged particles concentrated on the second control electrode to transfer to the objective display electrode.

7. A method for addressing an electrophoretic display device comprising a first substrate; a first display electrode and a second display electrode disposed on the first substrate; a second substrate disposed in opposed relation to the first substrate; means for applying a desired voltage on each electrode; a transparent insulation liquid filled between the first substrate and the second substrate; a plurality of colored and charged fine particles dispersed in the insulation liquid; a barrier structure disposed between the first display electrode and the second display electrode; a first control electrode disposed on the second substrate as an electrode for controlling transfer of the charged particles; and a second control electrode disposed at a periphery of the barrier structure of the first substrate, with display modes being switched by allowing the colored and charged particles to transfer between the first and second display electrode, said method comprising the steps of:
   allowing the charged particles to transfer from one of the display electrodes to the vicinity of the second control electrode in a first process; and
   allowing the charged particles to transfer from the second control electrode to the other display electrode side by jumping over the barrier structure in a second process in order to transfer the charged particles.

8. A method for addressing an electrophoretic display device according to claim 7, further comprising the step of:

applying a voltage to the first display electrode, second display electrode and control electrode so that
the first process satisfies the relation of;
(the potential of both display electrodes, and the potential of the first control electrode)>(the potential of the second control electrode); and
the second process satisfies the relation of;
(the potential of the display electrode where the charged particles reside, and the potential of the first control electrode)>(the potential of the second control electrode)>(the potential of the display electrode as a destination of transfer),
for the positively charged particles, and
the first process satisfies the relation of;
(the potential of both display electrodes, and the potential of the first control electrode)<(the potential of the second control electrode); and
the second process satisfies the relation of
(the potential of the display electrode where the charged particles reside, and the potential of the first control electrode)<(the potential of the second control electrode)<(the potential of the display electrode as a destination of transfer),
for the negatively charged particles,
in order to induce transfer of the charged particles comprising the two processes.

9. An electrophoretic display device, comprising:
a first substrate;
a first display electrode and a second display electrode disposed on the first substrate;
a second substrate disposed in opposed relation to the first substrate;
a control electrode disposed on the second substrate;
means for applying a desired voltage on each electrode;
a transparent insulation liquid filled between the first substrate and the second substrate; and
a plurality of colored and charged fine particles dispersed in the transparent insulation liquid, with display modes being switched by allowing the colored and charged particles to horizontally transfer between the first and second display electrodes,
wherein a barrier wall that substantially prohibits direct in-plane transfer of the charged particles at least toward one direction between the first display electrode and the second display electrode is provided between the first display electrode and the second display electrode.

10. An electrophoretic display device according to claim 9, wherein the barrier wall protrudes out of at least one face of the first display electrode and the second display electrode, and is constructed of a geometrical step having a height several to several ten times as the large particle size of the charged particles.

11. An electrophoretic display device according to claim 9, wherein the barrier wall is a barrier electrode applying an electrostatic repulsion force to the charged particles.

12. An electrophoretic display device according to claim 9, wherein the barrier wall is a charged assembly applying an electrostatic repulsion force to the charged particles.

13. An electrophoretic display device according to claim 9, wherein the barrier wall is a step and a shielding space in which the charged particles are able to enter and exit and which is invisible by an observer of the display screen is formed under a face of one of the display electrodes adjoining to the step and located at the upper side of the step adjacent to the other display electrode.

14. A method for addressing an electrophoretic display device comprising a first substrate; a first display electrode and a second display electrode disposed on the first substrate; a second substrate disposed in opposed relation to the first substrate; a control electrode disposed on the second substrate; means for applying a desired voltage on each electrode; a transparent insulation liquid filled between the first substrate and the second substrate; a plurality of colored and charged fine particles dispersed in the insulation liquid; and a barrier wall disposed between the first display electrode and the second display electrode for substantially prohibiting direct in-plane transfer of the charged particles at least toward one direction between the first display electrode and the second display electrode, with display modes being switched by allowing the colored and charged particles to transfer between the first and second display electrodes using the control electrode, wherein
the method for transferring the charged particles toward the direction substantially prohibited by the barrier wall is carried out by an indirect transfer comprising the steps of:
allowing the charged particles to transfer from one of the display electrodes to the control electrode side in a first process; and
succeeding the first process, allowing the charged particles to transfer from the control electrode side to the other display electrode side by jumping over the barrier wall in a second process.

15. A method for addressing an electrophoretic display device according to claim 14, further comprising the step of applying voltages on the first display electrode, second display electrode and control electrode so that a period satisfying the relation of (A) "the potential of the display electrode that is not a destination of transfer>the potential of the control electrode>the potential as a destination of transfer" for the positively charged particles is included, and so that a period satisfying the relation of (B) "the potential of the display electrode that is not a destination of transfer <the potential of the control electrode<the potential as a destination of transfer" for the negatively charged particles is included, in order to induce indirect transfer of the charged particles.

16. An electrophoretic display device, comprising:
a first substrate;
a first display electrode and a second display electrode disposed on the first substrate;
a second substrate disposed in opposed relation to the first substrate;
means for applying a desired voltage on each electrode;
a transparent insulation liquid filled between the first substrate and the second substrate; and
a plurality of colored and charged fine particles dispersed in the transparent insulation electrode, with display modes being switched by allowing the colored and charged particles between the first and second display electrodes,
wherein a control electrode is disposed between the first display electrode and the second display electrode on the first substrate, and a space between an upper face of the control electrode and a surface of the first substrate is larger than spaces between an upper face of the first display electrode and the surface of the first substrate, and between an upper face of the second display electrode and the surface of the first substrate.

17. An electrophoretic display device according to claim 16, wherein a structural barrier is disposed between the first display electrode and the second display electrode on the first substrate, and the control electrode is disposed above the structural barrier.

18. An electrophoretic display device according to claim 17, wherein the structural barrier is a step.

19. An electrophoretic display device according to claim 18, wherein a shielding space in which charged particles are able to enter and exit and which is invisible to an observer of the screen is provided under a face of one of the display electrodes adjoining to the step and located at an upper side of the step adjacent to the other display electrode.

20. An electrophoretic display device according to claim 17, wherein the structural barrier is a wall.

21. A method for addressing an electrophoretic display device comprising a first substrate; a first display electrode and a second display electrode disposed on the first substrate; a second substrate disposed in opposed relation to the first substrate; means for applying a desired voltage on each electrode; a transparent insulation liquid filled between the first substrate and the second substrate; a plurality of colored and charged fine particles dispersed in the transparent insulation liquid; and a structural barrier disposed at a boundary between the first display electrode and the second display electrode, with display modes being switched by allowing the colored and charged particles to transfer between the first and second display electrodes, and being able to control transfer of the colored and charged particles by a synergetic effect between a physical barrier effect by the structural barrier and an electrical barrier effect by a control electrode; said method comprising the steps of:

allowing the charged particles to transfer from one of the display electrodes to the vicinity of the control electrode in a first process; and succeeding the first process, allowing the charged particles to transfer from the control electrode to the other display electrode side by jumping over the structural barrier in a second process in order to transfer the charged particles.

22. A method for addressing an electrophoretic display device according to claim 21, further comprising the step of applying a voltage to the first display electrode, second display electrode and control electrode so that transfer of the positively charged particles involves the period satisfying the relation of;

(the potential of the display electrode that is not a destination of transfer)>(the potential of the control electrode)>(the potential of the display electrode as a destination of transfer), and transfer of the negatively charged particles involves the period satisfying the relation of;

(the potential of the display electrode that is not a destination of transfer)<(the potential of the control electrode)<(the potential of the display electrode as a destination of transfer), in order to induce transfer of the charged particles.

23. A method for addressing an electrophoretic display device according to claim 22, further comprising the step of applying a voltage to the first display electrode, second display electrode and control electrode so that the first process satisfies the relation of;

(the potential of both display electrodes)>(the potential of the control electrode), and the second process satisfies the relation of;

(the potential of the display electrode where the charged particles reside)>(the potential of the control electrode)>(the potential of the display electrode as a destination of transfer)

for transfer of the positively charged particles, and the first process satisfies the relation of:

(the potential of both display electrodes)<(the potential of the control electrode), and the second process satisfies the relation of;

(the potential of the display electrode where the charged particles reside)<(the potential of the control electrode)<(the potential of the display electrode as a destination of transfer), for transfer of the negatively charged particles, in order to induce transfer of the charged particles.

* * * * *

UNITED STATES PATENT AND TRADEMARK OFFICE
CERTIFICATE OF CORRECTION

PATENT NO.     : 6,639,580 B1
DATED          : October 28, 2003
INVENTOR(S)    : Etsuro Kishi et al.

It is certified that error appears in the above-identified patent and that said Letters Patent is hereby corrected as shown below:

Title page,
Item, [57], ABSTRACT,
Line 6, "fist" should read -- first --.

Column 1,
Line 63, "high" should read -- highly --.

Column 6,
Line 60, "period As" should read --period. As --.

Column 7,
Line 6, "charged" (second occurrence) should be deleted.

Column 10,
Line 29, "Preferable" should read -- preferable --.
Line 30, "In" should read -- in --.

Column 11,
Lines 10 and 40, "ample" should read -- example --.

Column 12,
Line 34, "Ample" should read -- example --.
Line 37, "ample" should read -- example --.

Column 19,
Line 11, "Tb2" should read -- Tb2. --.
Line 16, "Vd2." should read -- Vd2, --.

Column 24,
Line 62, "colun" should read -- column --.

Column 25,
Line 36, "sate" should read -- state --.

Column 27,
Line 12, "electrode. Insulation" should read -- electrode, insulation --.

UNITED STATES PATENT AND TRADEMARK OFFICE
CERTIFICATE OF CORRECTION

PATENT NO. : 6,639,580 B1
DATED : October 28, 2003
INVENTOR(S) : Etsuro Kishi et al.

It is certified that error appears in the above-identified patent and that said Letters Patent is hereby corrected as shown below:

Column 34,
Line 20, "surface of the" (second occurrence) should be deleted.

Column 39,
Line 3, "TO" should read -- T0 --.

Column 43,
Line 6, "fry" should read -- dry --.

Column 45,
Line 13, "state" (second occurrence) should be deleted.

Column 47,
Line 29, "vd(+5v)" should read -- Vd(+5v) --.

Signed and Sealed this

Third Day of August, 2004

JON W. DUDAS
*Acting Director of the United States Patent and Trademark Office*